(12) United States Patent
Dunican et al.

(10) Patent No.: US 12,533,095 B1
(45) Date of Patent: Jan. 27, 2026

(54) AIRWAY MUCUS SCORING SYSTEM

(71) Applicants: The Regents of the University of California, Oakland, CA (US); Wisconsin Alumni Research Foundation, Madison, WI (US); University of Iowa Research Foundation, Iowa City, IA (US); Washington University, St. Louis, MO (US)

(72) Inventors: Eleanor Dunican, San Francisco, CA (US); John Fahy, San Francisco, CA (US); Brett Elicker, San Francisco, CA (US); John Newell, Iowa City, IA (US); Scott Nagle, Madison, WI (US); Mark Schiebler, Madison, WI (US); David Gierada, St. Louis, MO (US)

(73) Assignees: The Regents of the University of California, Oakland, CA (US); Wisconsin Alumni Research Foundation, Madison, WI (US); University of Iowa Research Foundation, Iowa City, IA (US); Washington University, St. Louis, MO (US)

( * ) Notice: Subject to any disclaimer, the term of this patent is extended or adjusted under 35 U.S.C. 154(b) by 0 days.

(21) Appl. No.: 19/258,014

(22) Filed: Jul. 2, 2025

Related U.S. Application Data

(63) Continuation of application No. 16/301,167, filed as application No. PCT/US2017/032550 on May 12, 2017.

(Continued)

(51) Int. Cl.
*A61B 6/00* (2024.01)
*A61B 6/03* (2006.01)
*A61B 6/50* (2024.01)

(52) U.S. Cl.
CPC ............... *A61B 6/50* (2013.01); *A61B 6/032* (2013.01)

(58) Field of Classification Search
CPC ..................................... A61B 6/50
See application file for complete search history.

(56) References Cited

U.S. PATENT DOCUMENTS

2014/0242690 A1  8/2014  Alton et al.
2016/0060284 A1  3/2016  Oscarson et al.
2019/0290225 A1*  9/2019  Dunican ............. A61K 38/465

FOREIGN PATENT DOCUMENTS

WO  WO-2011/094518 A2  8/2011
WO  WO-2014/153009 A2  9/2014
WO  WO-2015/061441 A1  4/2015

OTHER PUBLICATIONS

Arslan, et al. (Jan. 2016, e-published Dec. 28, 2015). "Magnetic Resonance Imaging May Be a Valuable Radiation-Free Technique for Lung Pathologies in Patients with Primary Immunodeficiency," *J Clin Immunol* 36(1):66-72.

(Continued)

*Primary Examiner* — Joseph M Santos Rodriguez
(74) *Attorney, Agent, or Firm* — Mintz Levin Cohn Ferris Glovsky and Popeo, P.C.

(57) ABSTRACT

Provided herein are, inter alia, methods and systems for detecting mucus in the lungs of a subject. Aspects provide methods and systems for the diagnosis, prognosis, characterization, detection, and treatment of asthma, chronic obstructive pulmonary disease, and type 2 inflammation.

20 Claims, 35 Drawing Sheets

Specification includes a Sequence Listing.

Related U.S. Application Data

(60) Provisional application No. 62/336,376, filed on May 13, 2016.

(56) References Cited

OTHER PUBLICATIONS

Ayed, A.K. et al. (Aug. 2005, e-published Oct. 13, 2005). "Lung Resection in Children for Infectious Pulmonary Diseases," *Pediatr Surg Int* 21(8):604-608.
Aysola, R. et al. (Dec. 2010). "Demonstration of the heterogeneous distribution of asthma in the lungs using CT and hyperpolarized helium-3 MRI," *J Magn Reson Imaging* 32(6):1379-1387.
Bonser, L.R. et al. (Jun. 1, 2016). "Epithelial tethering of MUC5AC-rich mucus impairs mucociliary transport in asthma," *J Clin Invest* 126(6):2367-2371.
Boser, S.R. et al. (Oct. 1, 2005, e-published Jun. 23, 2005). "Fractal Geometry of Airway Remodeling in Human Asthma," *Am J Respir Crit Care Med* 172(7):817-823.
Busayarat, S. et al. (Jul. 2007). "Detection of Bronchopulmonary Segments on High-Resolution CT-Preliminary Results," Proceedings of the IEEE Symposium on Computer-Based Medical Systems, 6 pages.
Cardell, B.S. et al. (Dec. 1959). "Death in Asthmatics," *Thorax* 14(4):341-352.
Charalampidis (2015). "Pleura space anatomy," *J Thorac Dis* 7(Suppl 1):S27-S32.
Dunnill, M.S. (Jan. 1960). "The pathology of asthma, with special reference to changes in the bronchial mucosa," *J. Clin. Path.* 13(1):27-33.
Encyclopedia Brittanica, The Lungs, 7 pages.
Evans C.M. et al. (Feb. 17, 2015). "The polymeric mucin Muc5ac is required for allergic airway hyperreactivity," *Nat Commun* 6:6281.
Fahy, J.V. et al., (Dec. 2, 2010). "Airway mucus function and dysfunction," *N Engl J Med* 363(23):2233-2247.
Fahy, J.V. (Jan. 2015). "Type 2 inflammation in asthma—present in most, absent in many," *Nat Rev Immunol* 15(1):57-65.
Gomez-Cardona, D. et al. (Oct. 2015). "Influence of radiation dose and reconstruction algorithm in MDCT assessment of airway wall thickness: A phantom study," *Med Phys* 42(10):5919-5927.
Huber, H.L. et al. (Dec. 1922). "The pathology of bronchial asthma," *Archives of Internal Medicine* 30(6):689-760.
Innes, A.L. et al. (2009). "Ex Vivo Sputum Analysis Reveals Impairment of Protease-dependent Mucus Degradation by Plasma Proteins in Acute Asthma," *Am J Respir Crit Care Med* 180:203-210.
International Search Report mailed on Aug. 17, 2017, for PCT Application No. PCT/US2017/032550, filed May 12, 2017, 4 pages.
Kirby, M et al. (Jul. 2020). "CT Evidence of Airway Luminal Plugging in Copd: A New Plug for Targeted Treatment?" *Chest* 158(1):7-8.
Kuperman, D.A. et al. (Aug. 2002). "Direct effects of interleukin-13 on epithelial cells cause airway hyperreactivity and mucus overproduction in asthma," *Nat Med* 8(8):885-889.
Liu, X. et al. (Feb. 2012). "ROCK inhibitor and feeder cells induce the conditional reprogramming of epithelial cells," *Am J Pathol* 180(2):599-607.
Morozov, A. et al. (Jun. 2007, e-published Apr. 24, 2007). "High-attenuation Mucus Plugs on Mdct in a Child With Cystic Fibrosis: Potential Cause and Differential Diagnosis," *Pediatr Radiol* 37(6):592-595.
National Institute of Health "What Is Bronchiectasis?" last updated Mar. 24, 2022, 2 pages.
Odry, B.L. et al. (2007). "Automated detection of mucus plugs within bronchial tree in MSCT images," Medical Imaging 2007: Physiology, Function, and Structure from Medical Images, *Proceedings of SPIE* 6511:651110-1 through 651110-10.
Odry, B.L. et al. (Sep. 2010). "Automated CT scoring of airway diseases: preliminary results," *Acad Radiol* 17(9):1136-1145.
Okajima, Y. et al. (Jul. 2020). "Luminal Plugging on Chest CT Scan: Association With Lung Function, Quality of Life, and COPD Clinical Phenotypes," *Chest* 158(1):121-130.
Page, C. et al. (Aug. 2014, e-published Apr. 2, 2014). "Bifunctional drugs for the treatment of asthma and chronic obstructive pulmonary disease," *Eur Respir J* 44(2):475-482.
Papiris, S. et al. (Feb. 2002, e-published Nov. 22, 2001). "Clinical Review: Severe Asthma," *Critical Care* 6(1):30-44.
Peters, M.C. et al. (Feb. 2014). "Measures of gene expression in sputum cells can identify TH2-high and TH2-low subtypes of asthma," *J Allergy Clin Immunol* 133(2):388-394.
Roy, M.G. et al. (Jan. 16, 2014). "Muc5b is required for airway defence," *Nature* 505(7483)412-416.
Sadwoska (2006). "Role of N-Acetylcysteine in the Management of COPD," *Int J Chron Obstruct Pulmon Dis* 1(4):425-434.
Thornton, D.J. et al. (2008). "Structure and function of the polymeric mucins in airways mucus," *Annu Rev Physiol* 70:459-486.
Van Rikxoort, E.M. et al. (Apr. 2009, e-published Feb. 10, 2009). "Automatic Segmentation of Pulmonary Segments From Volumetric Chest CT Scans," *IEEE Trans Med Imaging* 28(4):621-630.
Vestbo, J. et al. (May 1996). "Association of chronic mucus hypersecretion with $FEV_1$ decline and chronic obstructive pulmonary disease morbidity," *Am J Respir Crit Care Med* 153(5):1530-1535.
Wenzel, S.E. et al. (Sep. 15, 2012, e-published Jul. 5, 2012). "Asthmatic Granulomatosis: a Novel Disease With Asthmatic and Granulomatous Features," *Am J Respir Crti Care Med* 186(6):501-507.
Written Opinion mailed on Aug. 17, 2017, for PCT Application No. PCT/US2017/032550, filed May 12, 2017, 7 pages.
Yuan, S. et al. (Feb. 25, 2015). "Oxidation increases mucin polymer cross-links to stiffen airway mucus gels," *Sci Transl Med* 7(276):276ra27.

\* cited by examiner

FIG. 1H
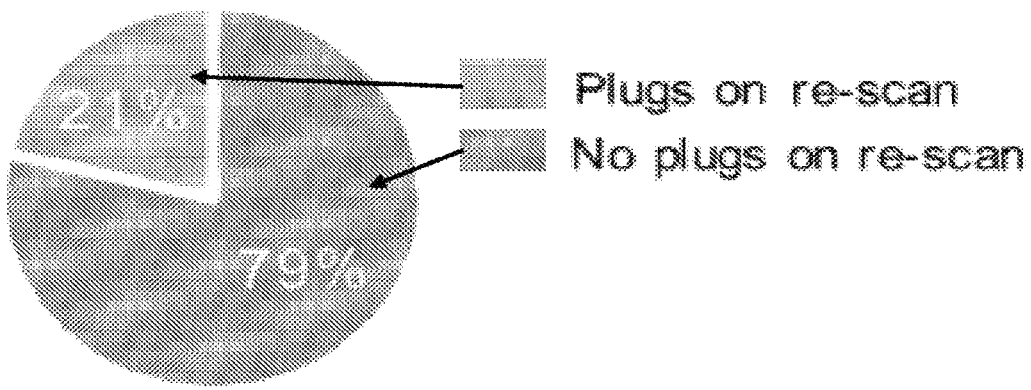
Segments with no plugs
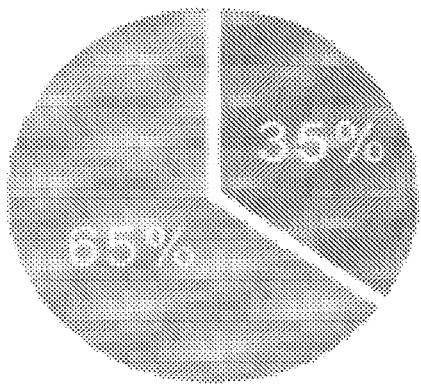
Segments with plugs

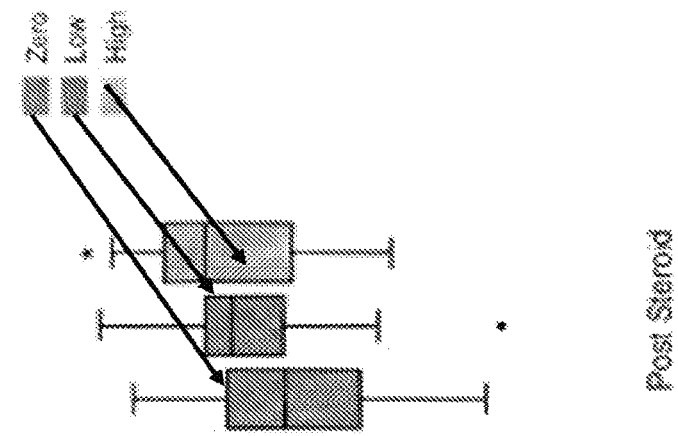
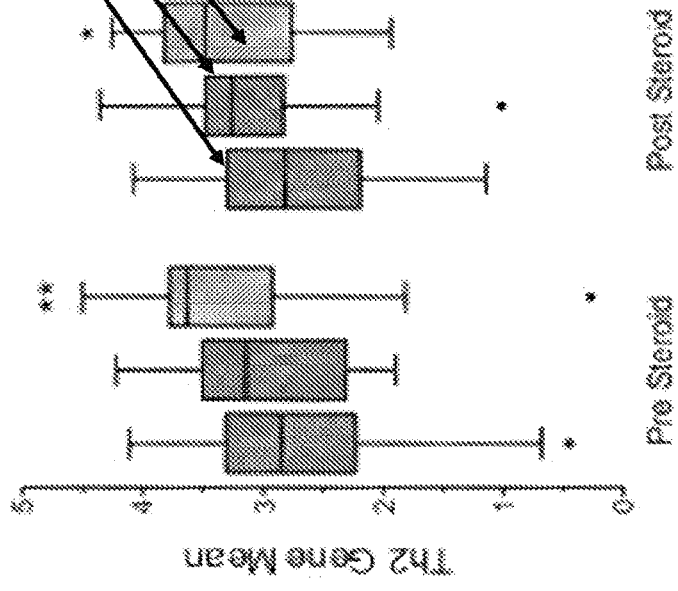
FIG. 4D
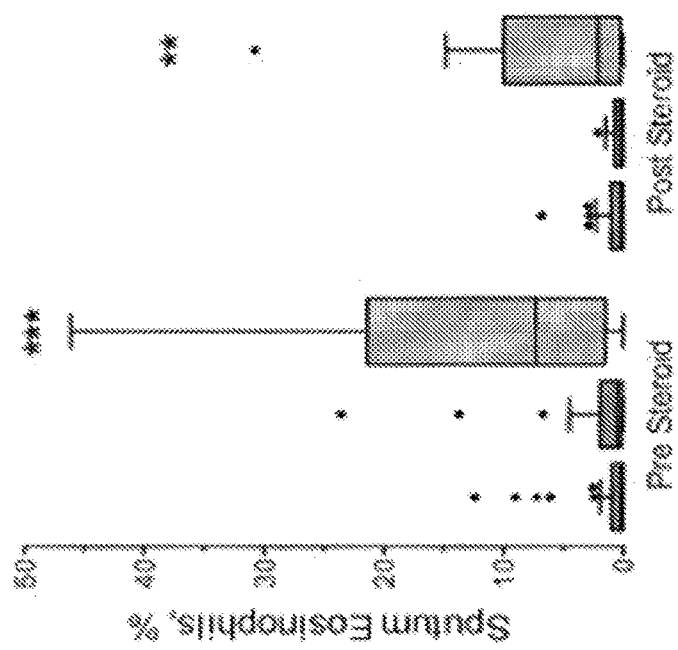
FIG. 4C

FIG. 7 (continued)

Scoring System

Mucus Impaction on CT

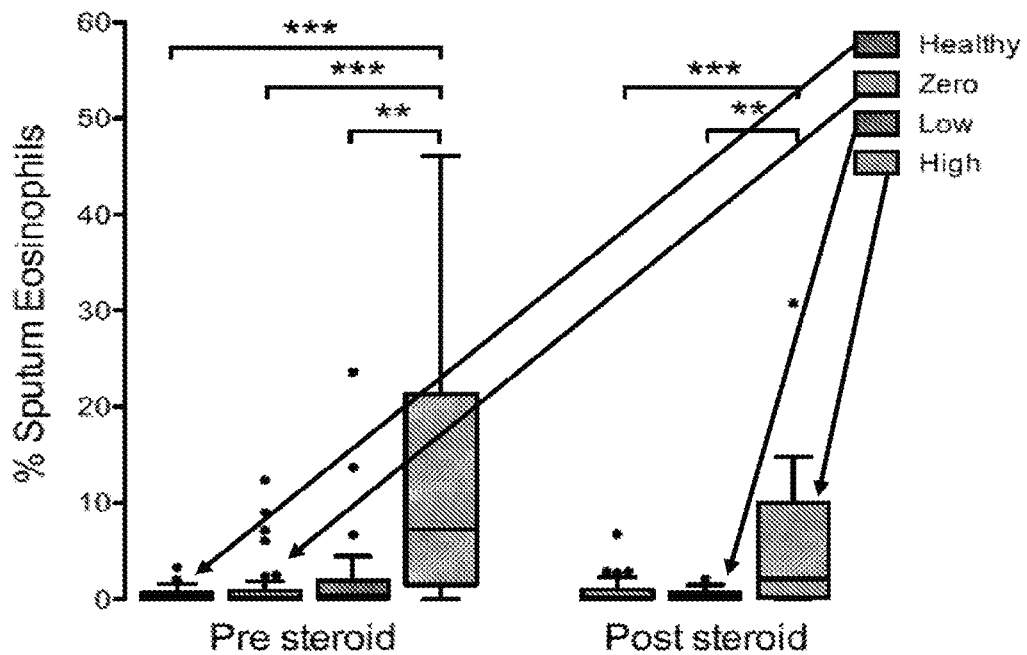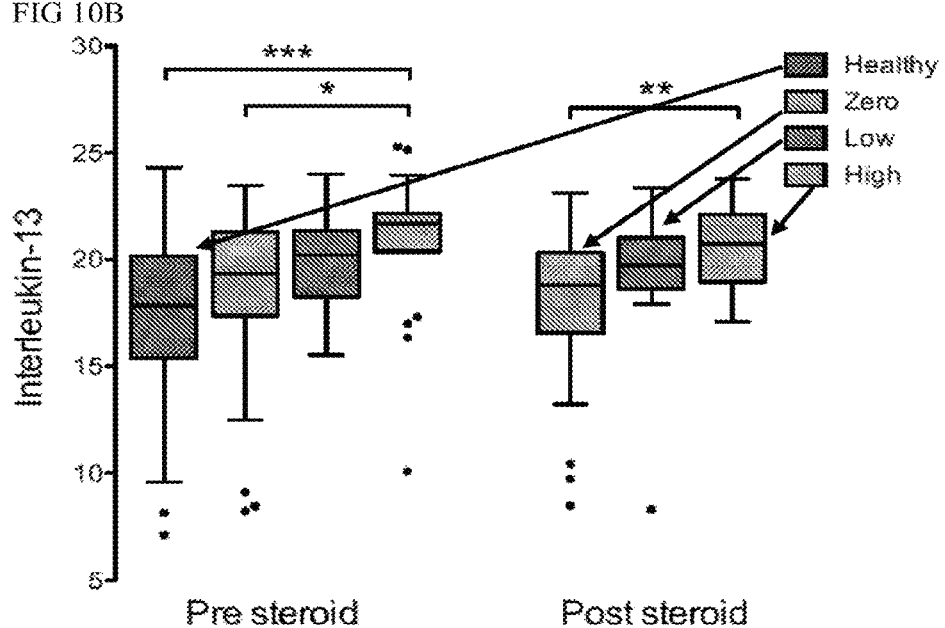

FIG. 11G
FIG. 11H
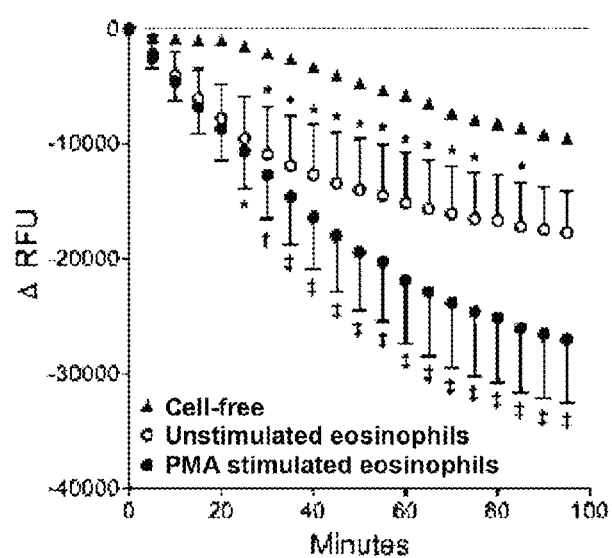
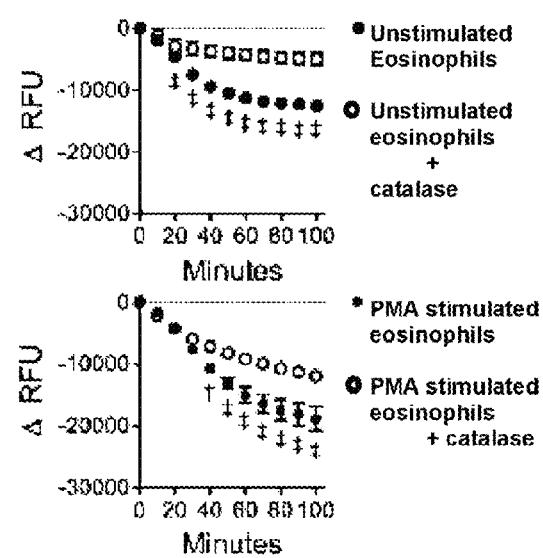

FIG. 17

CT Case Report Form

Please complete the survey below.
Thank you!

| | |
|---|---|
| Survey Start Date/Time | [____] 📅 Now M-D-Y H:M:S |
| Patient ID: (*NOTE) | [_____]<br>*SARP 3: enter 8 digit ID e.g. 30-841-005. SARP 1/2: enter 5 digit ID e.g. 8643P |
| CT date | [____] 📅 Today M-D-Y |

RIGHT UPPER LOBE segments

| | Mucus plugs absent | Mucus plug(s) present | |
|---|---|---|---|
| Apical | ○ | ○ | reset |
| Posterior | ○ | ○ | reset |
| Anterior | ○ | ○ | reset |
| Bronchiectasis | | ○ Absent<br>○ Present<br>Bronchoarterial ratio > 1.5 | reset |
| Comments | | [_____]<br>Expand | |

SEQUENCE LISTING

```
Sequence total quantity: 50
SEQ ID NO: 1            moltype = DNA  length = 26
FEATURE                 Location/Qualifiers
misc_feature            1..26
                        note = PPIA-outer forward
source                  1..26
                        mol_type = other DNA
                        organism = synthetic construct
SEQUENCE: 1
atgagaactt catcctaaag catacg                                          26

SEQ ID NO: 2            moltype = DNA  length = 22
FEATURE                 Location/Qualifiers
misc_feature            1..22
                        note = PPIA-outer reverse
source                  1..22
                        mol_type = other DNA
                        organism = synthetic construct
SEQUENCE: 2
ttggcagtgc agatgaaaaa ct                                              22

SEQ ID NO: 3            moltype = DNA  length = 19
FEATURE                 Location/Qualifiers
misc_feature            1..19
                        note = PPIA-inner forward
source                  1..19
                        mol_type = other DNA
                        organism = synthetic construct
SEQUENCE: 3
acgggtcctg gcatcttgt                                                  19

SEQ ID NO: 4            moltype = DNA  length = 24
FEATURE                 Location/Qualifiers
misc_feature            1..24
                        note = PPIA-probe
source                  1..24
                        mol_type = other DNA
                        organism = synthetic construct
SEQUENCE: 4
atggcaaatg ctggacccaa caca                                            24

SEQ ID NO: 5            moltype = DNA  length = 22
FEATURE                 Location/Qualifiers
```

```
misc_feature              1..22
                          note = PPIA-inner reverse
source                    1..22
                          mol_type = other DNA
                          organism = synthetic construct
SEQUENCE: 5
gcagatgaaa aactgggaac ca                                                  22

SEQ ID NO: 6              moltype = DNA  length = 22
FEATURE                   Location/Qualifiers
misc_feature              1..22
                          note = GAPDH-outer forward
source                    1..22
                          mol_type = other DNA
                          organism = synthetic construct
SEQUENCE: 6
caatgacccc ttcattgacc tc                                                  22

SEQ ID NO: 7              moltype = DNA  length = 22
FEATURE                   Location/Qualifiers
misc_feature              1..22
                          note = GAPDH-outer reverse
source                    1..22
                          mol_type = other DNA
                          organism = synthetic construct
SEQUENCE: 7
ctcgctcctg gaagatggtg at                                                  22

SEQ ID NO: 8              moltype = DNA  length = 21
FEATURE                   Location/Qualifiers
misc_feature              1..21
                          note = GAPDH-inner forward
source                    1..21
                          mol_type = other DNA
                          organism = synthetic construct
SEQUENCE: 8
gattccaccc atggcaaatt c                                                   21

SEQ ID NO: 9              moltype = DNA  length = 23
FEATURE                   Location/Qualifiers
misc_feature              1..23
                          note = GAPDH-probe
source                    1..23
                          mol_type = other DNA
                          organism = synthetic construct
SEQUENCE: 9
cgttctcagc cttgacggtg cca                                                 23

SEQ ID NO: 10             moltype = DNA  length = 22
FEATURE                   Location/Qualifiers
misc_feature              1..22
                          note = GAPDH-inner reverse
source                    1..22
                          mol_type = other DNA
                          organism = synthetic construct
SEQUENCE: 10
gggatttcca ttgatgacaa gc                                                  22

SEQ ID NO: 11             moltype = DNA  length = 24
FEATURE                   Location/Qualifiers
misc_feature              1..24
                          note = YWHAZ-outer forward
source                    1..24
                          mol_type = other DNA
                          organism = synthetic construct
SEQUENCE: 11
cttctgtctt gtcaccaacc attc                                                24

SEQ ID NO: 12             moltype = DNA  length = 24
FEATURE                   Location/Qualifiers
misc_feature              1..24
                          note = YWHAZ-outer reverse
source                    1..24
                          mol_type = other DNA
                          organism = synthetic construct
SEQUENCE: 12
caactaagga gagatttgct gcag                                                24

SEQ ID NO: 13             moltype = DNA  length = 19
```

```
FEATURE                 Location/Qualifiers
misc_feature            1..19
                        note = YWHAZ-inner forward
source                  1..19
                        mol_type = other DNA
                        organism = synthetic construct
SEQUENCE: 13
tggaaaaagg ccgcatgat                                                  19

SEQ ID NO: 14           moltype = DNA  length = 28
FEATURE                 Location/Qualifiers
misc_feature            1..28
                        note = YWHAZ-probe
source                  1..28
                        mol_type = other DNA
                        organism = synthetic construct
SEQUENCE: 14
tggctccact cagtgtctaa ggcaccct                                        28

SEQ ID NO: 15           moltype = DNA  length = 20
FEATURE                 Location/Qualifiers
misc_feature            1..20
                        note = YWHAZ-inner reverse
source                  1..20
                        mol_type = other DNA
                        organism = synthetic construct
SEQUENCE: 15
tctgtgggat gcaagcaaag                                                 20

SEQ ID NO: 16           moltype = DNA  length = 23
FEATURE                 Location/Qualifiers
misc_feature            1..23
                        note = PSMB2-outer forward
source                  1..23
                        mol_type = other DNA
                        organism = synthetic construct
SEQUENCE: 16
ccatatcatg tgaacctcct cct                                             23

SEQ ID NO: 17           moltype = DNA  length = 24
FEATURE                 Location/Qualifiers
misc_feature            1..24
                        note = PSMB2-outer reverse
source                  1..24
                        mol_type = other DNA
                        organism = synthetic construct
SEQUENCE: 17
gtcgaggata ctgagagtca ggaa                                            24

SEQ ID NO: 18           moltype = DNA  length = 20
FEATURE                 Location/Qualifiers
misc_feature            1..20
                        note = PSMB2-inner forward
source                  1..20
                        mol_type = other DNA
                        organism = synthetic construct
SEQUENCE: 18
tcctcctggc tggctatgat                                                 20

SEQ ID NO: 19           moltype = DNA  length = 22
FEATURE                 Location/Qualifiers
misc_feature            1..22
                        note = PSMB2-probe
source                  1..22
                        mol_type = other DNA
                        organism = synthetic construct
SEQUENCE: 19
acagcgctgg cccttcatgc tc                                              22

SEQ ID NO: 20           moltype = DNA  length = 20
FEATURE                 Location/Qualifiers
misc_feature            1..20
                        note = PSMB2-inner reverse
source                  1..20
                        mol_type = other DNA
                        organism = synthetic construct
SEQUENCE: 20
ggctgccagg tagtccatgt                                                 20
```

```
SEQ ID NO: 21              moltype = DNA   length = 20
FEATURE                    Location/Qualifiers
misc_feature               1..20
                           note = IL4-outer forward
source                     1..20
                           mol_type = other DNA
                           organism = synthetic construct
SEQUENCE: 21
gggtctcacc tcccaactgc                                                    20

SEQ ID NO: 22              moltype = DNA   length = 22
FEATURE                    Location/Qualifiers
misc_feature               1..22
                           note = IL4-outer reverse
source                     1..22
                           mol_type = other DNA
                           organism = synthetic construct
SEQUENCE: 22
tgtctgttac ggtcaactcg gt                                                 22

SEQ ID NO: 23              moltype = DNA   length = 21
FEATURE                    Location/Qualifiers
misc_feature               1..21
                           note = IL4-inner forward
source                     1..21
                           mol_type = other DNA
                           organism = synthetic construct
SEQUENCE: 23
gcttccccct ctgttcttcc t                                                  21

SEQ ID NO: 24              moltype = DNA   length = 26
FEATURE                    Location/Qualifiers
misc_feature               1..26
                           note = IL4-probe
source                     1..26
                           mol_type = other DNA
                           organism = synthetic construct
SEQUENCE: 24
tccacggaca caagtgcgat atcacc                                             26

SEQ ID NO: 25              moltype = DNA   length = 23
FEATURE                    Location/Qualifiers
misc_feature               1..23
                           note = IL4-inner reverse
source                     1..23
                           mol_type = other DNA
                           organism = synthetic construct
SEQUENCE: 25
gctctgtgag gctgttcaaa gtt                                                23

SEQ ID NO: 26              moltype = DNA   length = 20
FEATURE                    Location/Qualifiers
misc_feature               1..20
                           note = IL5-outer forward
source                     1..20
                           mol_type = other DNA
                           organism = synthetic construct
SEQUENCE: 26
gccatgagga tgcttctgca                                                    20

SEQ ID NO: 27              moltype = DNA   length = 26
FEATURE                    Location/Qualifiers
misc_feature               1..26
                           note = IL5-outer reverse
source                     1..26
                           mol_type = other DNA
                           organism = synthetic construct
SEQUENCE: 27
gaatcctcag agtctcattg gctatc                                             26

SEQ ID NO: 28              moltype = DNA   length = 20
FEATURE                    Location/Qualifiers
misc_feature               1..20
                           note = IL5-inner forward
source                     1..20
                           mol_type = other DNA
                           organism = synthetic construct
SEQUENCE: 28
agctgcctac gtgtatgcca                                                    20
```

```
SEQ ID NO: 29          moltype = DNA   length = 25
FEATURE                Location/Qualifiers
misc_feature           1..25
                       note = IL5-probe
source                 1..25
                       mol_type = other DNA
                       organism = synthetic construct
SEQUENCE: 29
ccccacagaa attcccacaa gtgca                                              25

SEQ ID NO: 30          moltype = DNA   length = 21
FEATURE                Location/Qualifiers
misc_feature           1..21
                       note = IL5-inner reverse
source                 1..21
                       mol_type = other DNA
                       organism = synthetic construct
SEQUENCE: 30
gtgccaaggt ctctttcacc a                                                  21

SEQ ID NO: 31          moltype = DNA   length = 20
FEATURE                Location/Qualifiers
misc_feature           1..20
                       note = IL13-outer forward
source                 1..20
                       mol_type = other DNA
                       organism = synthetic construct
SEQUENCE: 31
caacctgaca gctggcatgt                                                    20

SEQ ID NO: 32          moltype = DNA   length = 18
FEATURE                Location/Qualifiers
misc_feature           1..18
                       note = IL13-outer reverse
source                 1..18
                       mol_type = other DNA
                       organism = synthetic construct
SEQUENCE: 32
ccttgtgcgg gcagaatc                                                      18

SEQ ID NO: 33          moltype = DNA   length = 19
FEATURE                Location/Qualifiers
misc_feature           1..19
                       note = IL13-inner forward
source                 1..19
                       mol_type = other DNA
                       organism = synthetic construct
SEQUENCE: 33
gccctggaat ccctgatca                                                     19

SEQ ID NO: 34          moltype = DNA   length = 22
FEATURE                Location/Qualifiers
misc_feature           1..22
                       note = IL13-probe
source                 1..22
                       mol_type = other DNA
                       organism = synthetic construct
SEQUENCE: 34
tcgatggcac tgcagcctga ca                                                 22

SEQ ID NO: 35          moltype = DNA   length = 21
FEATURE                Location/Qualifiers
misc_feature           1..21
                       note = IL13-inner reverse
source                 1..21
                       mol_type = other DNA
                       organism = synthetic construct
SEQUENCE: 35
gctcagcatc ctctgggtct t                                                  21

SEQ ID NO: 36          moltype = DNA   length = 21
FEATURE                Location/Qualifiers
misc_feature           1..21
                       note = IL17-outer forward
source                 1..21
                       mol_type = other DNA
                       organism = synthetic construct
SEQUENCE: 36
```

```
actgctactg ctgctgagcc t                                                    21

SEQ ID NO: 37          moltype = DNA   length = 22
FEATURE                Location/Qualifiers
misc_feature           1..22
                       note = IL17-outer reverse
source                 1..22
                       mol_type = other DNA
                       organism = synthetic construct
SEQUENCE: 37
ggtgaggtgg atcggttgta gt                                                   22

SEQ ID NO: 38          moltype = DNA   length = 20
FEATURE                Location/Qualifiers
misc_feature           1..20
                       note = IL17-inner forward
source                 1..20
                       mol_type = other DNA
                       organism = synthetic construct
SEQUENCE: 38
caatcccacg aaatccagga                                                      20

SEQ ID NO: 39          moltype = DNA   length = 28
FEATURE                Location/Qualifiers
misc_feature           1..28
                       note = IL17-probe
source                 1..28
                       mol_type = other DNA
                       organism = synthetic construct
SEQUENCE: 39
cccaaattct gaggacaaga acttcccc                                             28

SEQ ID NO: 40          moltype = DNA   length = 22
FEATURE                Location/Qualifiers
misc_feature           1..22
                       note = IL17-inner reverse
source                 1..22
                       mol_type = other DNA
                       organism = synthetic construct
SEQUENCE: 40
ttcaggttga ccatcacagt cc                                                   22

SEQ ID NO: 41          moltype = DNA   length = 24
FEATURE                Location/Qualifiers
misc_feature           1..24
                       note = MUC5B-outer forward
source                 1..24
                       mol_type = other DNA
                       organism = synthetic construct
SEQUENCE: 41
tacatcttgg cccaggacta ctgt                                                 24

SEQ ID NO: 42          moltype = DNA   length = 23
FEATURE                Location/Qualifiers
misc_feature           1..23
                       note = MUC5B-outer reverse
source                 1..23
                       mol_type = other DNA
                       organism = synthetic construct
SEQUENCE: 42
aggatcagct cgtagctctc cac                                                  23

SEQ ID NO: 43          moltype = DNA   length = 20
FEATURE                Location/Qualifiers
misc_feature           1..20
                       note = MUC5B-inner forward
source                 1..20
                       mol_type = other DNA
                       organism = synthetic construct
SEQUENCE: 43
catcgtcacc gagaacatcc                                                      20

SEQ ID NO: 44          moltype = DNA   length = 21
FEATURE                Location/Qualifiers
misc_feature           1..21
                       note = MUC5B-probe
source                 1..21
                       mol_type = other DNA
                       organism = synthetic construct
```

```
SEQUENCE: 44
ctgtgggacc accggcacca c                                                    21

SEQ ID NO: 45            moltype = DNA  length = 20
FEATURE                  Location/Qualifiers
misc_feature             1..20
                         note = MUC5B-inner reverse
source                   1..20
                         mol_type = other DNA
                         organism = synthetic construct
SEQUENCE: 45
aagagcttga tggccttgga                                                      20

SEQ ID NO: 46            moltype = DNA  length = 18
FEATURE                  Location/Qualifiers
misc_feature             1..18
                         note = MUC5AC-outer forward
source                   1..18
                         mol_type = other DNA
                         organism = synthetic construct
SEQUENCE: 46
tgtggcggga aagacagc                                                        18

SEQ ID NO: 47            moltype = DNA  length = 23
FEATURE                  Location/Qualifiers
misc_feature             1..23
                         note = MUC5AC-outer reverse
source                   1..23
                         mol_type = other DNA
                         organism = synthetic construct
SEQUENCE: 47
ccttcccatg gcttagcttc agc                                                  23

SEQ ID NO: 48            moltype = DNA  length = 20
FEATURE                  Location/Qualifiers
misc_feature             1..20
                         note = MUC5AC-inner forward
source                   1..20
                         mol_type = other DNA
                         organism = synthetic construct
SEQUENCE: 48
cgtgttgtca ccgagaacgt                                                      20

SEQ ID NO: 49            moltype = DNA  length = 20
FEATURE                  Location/Qualifiers
misc_feature             1..20
                         note = MUC5AC-probe
source                   1..20
                         mol_type = other DNA
                         organism = synthetic construct
SEQUENCE: 49
ctgcggcacc acagggacca                                                      20

SEQ ID NO: 50            moltype = DNA  length = 20
FEATURE                  Location/Qualifiers
misc_feature             1..20
                         note = MUC5AC-inner reverse
source                   1..20
                         mol_type = other DNA
                         organism = synthetic construct
SEQUENCE: 50
atcttgatgg ccttggagca                                                      20
```

AIRWAY MUCUS SCORING SYSTEM

This application is a continuation of U.S. application Ser. No. 16/301,167, filed Nov. 13, 2018, which is a 371 application of PCT/US2017/032550, filed May 12, 2017, which claims the benefit of U.S. Provisional Application No. 62/336,376, filed May 13, 2016, which applications are incorporated herein by reference in their entireties.

STATEMENT AS TO RIGHTS TO INVENTIONS MADE UNDER FEDERALLY SPONSORED RESEARCH AND DEVELOPMENT

This invention was made with government support under grant nos. HL109257, U10 HL109146, and HL109168 awarded by the National Institutes of Health. The government has certain rights in the invention.

INCORPORATION-BY-REFERENCE OF SEQUENCE LISTING

The content of the text file named "2025 Jun. 11 Sequence_Listing_ST26 048536-587C01US.xml", which was created on Jun. 11, 2025, and is 64,177 bytes in size, is hereby incorporated by reference in its entirety.

BACKGROUND

Asthma and chronic obstructive pulmonary disease (COPD) are common lung diseases that cause a large public health burden. The treatments available for asthma and COPD are suboptimal and many patients have unmet treatment needs. The pathologic mechanisms in asthma and COPD include the accumulation of thick mucus in the airways (mucus "plugs") that restrict airflow. Detecting mucus plugs in the airways is difficult because they are not visible on chest x rays and they are frequently not associated with any symptoms of cough or sputum production. Because of the difficulty in identifying patients with mucus plugs in their lungs, it has been difficult to direct mucoactive treatments to this patient subgroup. The inability to easily identify patients with lung mucus plugs has also made it difficult to design clinical trials to test mucoactive drugs in lung disease.

Biomarkers are needed to direct treatment in asthma, but blood measures of inflammatory proteins have yielded limited results.

BRIEF SUMMARY

Provided herein, inter alia, are methods and compositions for the detection, diagnosis and treatment of asthma and COPD. Also provided herein are systems and methods for the detection, diagnosis and treatment of asthma and COPD. In embodiments, the methods and systems allow for consistent quantification of lung mucus plugging utilizing, for example, lung imaging thereby providing non-invasive, accurate diagnosis and personalized treatment strategies. In embodiments, the methods, systems, and compositions described herein utilize imaging of the lungs as a test to personalize treatment for patients with asthma or COPD who have airflow obstruction from mucus plugging.

In an aspect, provided herein is a method of treating a subject who has asthma or COPD. The method includes detecting an airway mucus occlusion in a lung segment of the subject; and administering to the subject a therapeutically effective amount of a mucolytic agent or a type 2 inflammation inhibitor, wherein the subject has an airway mucus occlusion in at least one lung segment.

In an aspect, provided herein is a method of treating a subject in need thereof. The method includes administering a therapeutically effective amount of a mucolytic agent or a type 2 inflammation inhibitor to the subject, wherein the subject has an airway mucus occlusion in at least four lung segments.

In an aspect, provided herein is a method of detecting type 2 inflammation in a subject. The method includes detecting an airway mucus occlusion in a lung segment of the subject; and identifying the subject as having type 2 inflammation if subject has an airway mucus occlusion in a lung segment.

In an aspect, provided herein is a diagnostic method comprising detecting an airway mucus occlusion in a lung segment of a subject.

In an aspect, provided herein is a method for identifying whether a subject is likely to respond or responsive to treatment with a mucolytic agent or a type 2 inflammation inhibitor. The method includes detecting an airway mucus occlusion in a lung segment of a subject; and identifying the subject as likely to respond or responsive to treatment with a mucolytic agent or a type 2 inflammation inhibitor if the subject has an airway mucus occlusion in a lung segment.

In an aspect, provided herein is a method for identifying whether a subject is unlikely to respond, incompletely responsive, or unresponsive to treatment with an anticholinergic agent, a bronchodilator, or a corticosteroid. The method includes detecting an airway mucus occlusion in a lung segment of a subject; and identifying the subject as unlikely to respond, incompletely responsive, or unresponsive to treatment with an anticholinergic agent, a bronchodilator, or a corticosteroid if the subject has an airway mucus occlusion in a lung segment.

In an aspect, provided herein is a system, comprising: a scanner configured to capture one or more lung images of a subject: at least one data processor; and at least one memory storing instructions which, when executed by the at least one data processor, result in operations comprising: determining, based at least on the one or more lung images, a quantification of mucus plugging for the subject; determining, based at least on the quantification of mucus plugging, a diagnosis for the subject, the diagnosis comprising a detection of an airway mucus occlusion in at least one lung segment of the subject; and identifying, based at least on the diagnosis, one or more treatments for the subject, the one or more treatments including a therapeutically effective amount of a mucolytic agent and/or a type 2 inflammation inhibitor.

In aspects, provided herein are methods of treating a subject with asthma or COPD. In embodiments, the method includes identifying extensive airway mucus plugging; and administering a therapeutically effective amount of a mucolytic agent or a type 2 inflammation inhibitor. In embodiments, the subject has extensive airway mucus plugging. In embodiments, identifying extensive airway mucus plugging includes performing a multidetector computed tomography (MDCT) scan. In embodiments, the MDCT scan is a low dose radiation MDCT. In embodiments, the method further includes applying iterative reconstruction (IR) to produce images from an MDCT scan. In embodiments, thin sections are used for IR. In embodiments, the sections are less than about 2 mm thick, e.g., equal or less than 1.5, 1.25, 1, 0.75, 0.5, 0.25, 0.25-1.25, 0.5-1.25, 0.75-1.25, 0.75-1.5, or 1-1.25 mm thick. In embodiments, the sections are equal to or less than 1.25 mm thick.

In aspects, the subject has complete mucus occlusion of an airway lumen. In embodiments, the subject has complete mucus occlusion of an airway lumen in at least one bronchopulmonary segment. In embodiments, the subject has complete mucus occlusion of an airway lumen in at least three bronchopulmonary segments. In embodiments, the subject has 20 lung segments, and there is a complete mucus occlusion in any 1 of, or any combination of 2, 3, 4, 5, 6, 7, 8, 9, 10, 11, 12, 13, 14, 15, 16, 17, 18, or 19 of, or all 20 of the following: the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apical segment of the upper lobe of the left lung, the posterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung. In embodiments, the subject has 19O lung segments, and there is a complete mucus occlusion in any 1 of, or any combination of 2, 3, 4, 5, 6, 7, 8, 9, 10, 11, 12, 13, 14, 15, 16, 17, or 18 of, or all 19 of the following: the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung. In embodiments, the subject has 18 lung segments, and there is a complete mucus occlusion in any 1 of, or any combination of 2, 3, 4, 5, 6, 7, 8, 9, 10, 11, 12, 13, 14, 15, 16, or 17 of, or all 18 of the following: the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anteromedial segment of the lower lobe of the left lung, the lateral segment of the lower lobe of the left lung, and/or the posterior segment of the lower lobe of the left lung. In some aspects, the bronchopulmonary segments include the right or left of any of the segments selected from the group consisting of the upper lobe apical segment, upper lobe posterior segment, the upper lobe anterior segment, the lateral/superior segment of the middle lobe, or the medial/inferior segment of the middle lobe, the superior segment of the lower lobe, the medial basal segment of the lower lobe, the anterior basal segment of the lower lobe, the lateral basal segment of the lower lobe, and/or the posterior basal segment of the lower lobe.

In embodiments, the asthma is chronic severe asthma. In embodiments, a subject is incompletely responsive to bronchodilators (e.g., the subject has incompletely or not responded to at least 1, 2, 3, 4, or 5 bronchodilators) and/or corticosteroids (e.g., the subject has incompletely or not responded to at least 1, 2, 3, 4, or 5 corticosteroids). In embodiments, a mucolytic agent is a thiol-based drug, a recombinant human DNAse, hypertonic saline, ambroxol, or an airway epithelial cell ion channel modulator. In embodiments, the thiol-based drug is n-acetylcysteine, carbocisteine, erdosteine, mecysteine, or a thiol saccharide.

Each of the aspects and embodiments described herein are capable of being used together, unless excluded either explicitly or clearly from the context of the embodiment or aspect.

BRIEF DESCRIPTION OF THE DRAWINGS

FIGS. 1A-1I: Development and distribution of the CT mucus score in asthma and healthy subjects. (FIG. 1A) Intraluminal mucus plug with branching seen in longitudinal section (coronal plane). Mucus is identified as a tubular opacification (white arrow) that bifurcates distal to a patent airway. (FIG. 1B) Intraluminal mucus plug with extensive branching seen in longitudinal section (white arrow) extending to the lung periphery (transverse plane). The mucus impaction is not associated with bronchial wall dilatation. (FIG. 1C) Intraluminal mucus plug seen in cross-section (transverse plane). Mucus is identified as rounded opacification (white arrow) that is visible on sequential MDCT slices. (FIG. 1D) Schematic representation showing how MDCT's were evaluated to generate the mucus score. Airways within the 2-cm peripheral zone on MDCT (arrow) or airways that were partially occluded were excluded from assessment. Mucus plugs were defined as complete occlusion of an airway. Each bronchopulmonary segment was assessed and scored for the presence or absence of ≥1 mucus plug(s) and the segment scores were summed to generate the mucus score. (FIG. 1E) Segment score in healthy patients and patients with asthma. (FIG. 1F) Frequency distribution of segment score in patients with asthma. The code above the x-axis defines three mucus groups: "Zero" indicates patients with a mucus score of 0 (zero-mucus group): the "Low" indicates patients with mucus scores between 0.5 and 3.5 (low-mucus group) and "High" indicates patients with mucus scores ≥4.0 (high-mucus group). (FIG. 1G) Sankey bar graph showing frequency of zero, low and high mucus score in 25 asthmatics in SARP-1/SARP-2 on the left and in the same asthmatics in SARP-3 on the right, and the proportional change in the mucus score from initial scan to rescan 2-9 years later. (FIG. 1H) Pie-chart of segments with no mucus plugging on baseline scan: 79% of these segments had no mucus plugging on re-scan. Pic, chart of segments with mucus plugging on baseline scan: 65% of these segments had mucus plugging on re-scan. (I) MDCTs showing a mucus plug occluding the airway (yellow arrow) of the right lower lobe in 2010 and a mucus plug occluding the same airway, visible more proximally (yellow arrow) and branching into the adjacent airway, in the same patient in 2013. *** Indicates p<0.001.

(FIG. 2A) Segment scores in asthma patients whose pre bronchodilator FEV1% predicted was >80%, 60-80%, and <60%. * Indicates significant difference compared to FEV1%>80%, p<0.001. The green dashed boxes represent the patients with a high mucus score. (FIG. 2B) High mucus score is associated with lower FEV1% predicted. FVC % predicted and FEV1/FVC predicted. * Indicates significant difference compared to zero mucus group, p<0.001. ** Indicates significant difference compared to zero mucus group, p<0.01.

(FIG. 3A) Sputum eosinophil % was higher in the high mucus group than the low and zero mucus groups. (FIG. 3B) Blood eosinophil counts were higher in the high and low mucus groups than the zero mucus group. (FIG. 3C) The "Th2 gene mean" (a composite metric of airway type-2 inflammation) in induced sputum cells was higher in the high mucus than the zero mucus group. (FIG. 3D) The ratio of MUC5AC to MUC5B gene expression was higher in the high mucus compared to the zero mucus group. * Indicates significant difference compared to zero mucus group, p<0.05.  Indicates significant difference compared to zero mucus group, p<0.01. * Indicates significant difference compared to zero mucus group, p<0.001.

FIG. 4A-4F: Airflow obstruction and sputum eosinophilia persist after bronchodilator (BD) treatment and steroid treatment in asthma patients with high mucus scores. (FIG. 4A) The absolute change in FEV1% after maximum BD is similar in the three mucus subgroups. The absolute change in FEV1% after intramuscular corticosteroid tends to be higher in the high mucus group than the zero mucus group. The absolute change in FEV1% after both maximum bronchodilation and intramuscular corticosteroid is significantly higher in the high mucus group than the zero mucus group (FIG. 4B) The FEV1% predicted in the subjects with a high mucus score was significantly lower than in subjects with a low mucus score pre-treatment. The FEV1% predicted in the subjects with a high mucus score remained significantly decreased post maximal bronchodilator (BD) reversibility treatment and post steroid (intramuscular triamcinolone acetonide) treatment. The FEV1% predicted in the subjects with a high mucus score remained significantly decreased post maximal BD and steroid treatment combined. (FIG. 4C) The sputum eosinophil percentage was higher in the high mucus group than the low and zero mucus groups both before and after corticosteroid treatment (data also shown in FIG. 10A). (FIG. 4D) The Th2 gene mean was higher in the high mucus group than the zero mucus group both before and after corticosteroid treatment.  Indicates significant difference compared to zero mucus group, p<0.001. * Indicates significant difference compared to zero mucus group, p<0.0001. (FIG. 4E) Bar graphs representing the proportion of patients with a high mucus score across three categories of FEV1% predicted at baseline (pre-treatment), post maximal BD reversibility, post steroid treatment and finally post maximal BD and steroid treatment combined. (FIG. 4F) Bar graphs representing the proportion of patients with an FEV1% predicted less than 80, across the three categories of mucus score at baseline (pre-treatment), post maximal BD reversibility, post steroid treatment and finally post maximal BD and steroid treatment combined.  Indicates significantly different to the zero-mucus group, p<0.01. * Indicates significantly different to the zero-mucus group, p<0.001.

(FIG. 8A) Distribution of Bronchiectasis Score in asthmatics. Each lobe was systematically examined for the presence or absence of bronchiectasis defined by a broncho-arterial ratio ≥1.5. Only 20% of asthmatics had bronchiectasis (score >0) on CT. All healthy subjects had a bronchiectasis score=0. (FIG. 8B) Distribution of mucus plugging within the lung. Mucus burden in each lobe is shown here as the number of segments with mucus plugging (i.e. the segment score) in a given lobe as a percentage of the total number of segments in that lobe. RUL=right upper lobe: RML=right middle lobe, RLL=right lower lobe, LUL=left upper lobe; LLL=left lower lobe. There was no significant difference in mucus plugging across the lung lobes.

FIG. 9A maps bronchopulmonary segments. FIG. 9B is a schematic of the scoring method. FIG. 9C provides example MDCT images identify mucus plugging.

FIGS. 10A-10D: High mucus score is associated with markers of type 2 inflammation. (FIG. 10A) Sputum eosinophil % is significantly increased in patients with a high mucus score and remains significantly increased in patients with a high mucus score following treatment with intramuscular steroid (triamcinolone acetonide). (FIG. 10B) Gene expression for interleukin 13 is significantly increased in patients with a high mucus score and remains significantly increased in patients with a high mucus score following treatment with intramuscular steroid. (FIG. 10C) Gene expression for interleukin 5 is significantly increased in patients with a high mucus score and remains significantly increased in patients with a high mucus score following treatment with intramuscular steroid. (FIG. 10D) The MUC5AC/MUC5B ratio is significantly increased in patients with high mucus scores. * Indicates p<0.05.  Indicates p<0.01. * Indicates p<0.001.

FIGS. 11A-H: Marked eosinophilia in a bronchopulmonary segment with mucus plugs. (FIG. 11A) A low dose MDCT showing an airway with mucus plug (arrow head) in anterior segment of the left upper lobe (LB3b). (FIG. 11B) Kwik-Diff stain (ThermoFisher) of cytospin from broncho-alveolar lavage from LB3b (20× magnification) showing mucin that is densely infiltrated with eosinophils. (FIG. 11C) Higher magnification image of the cytospin region from panel B. (FIG. 11D) A schematic representation of a transwell with airway epithelial cells in culture at air liquid interface (ALI). Eotaxin-3 being secreted apically into the mucus layer in response to IL-13 stimulation. (FIG. 11E) Bar graphs representing the apical concentration of Eotaxin-3 collected from airway epithelial cells grown at ALI stimulated with IL-13 or untreated (control) in each donor and the average of the donors. (FIG. 11F) A Schematic representation of the cysteine-linking assay showing two cysteine monomers labeled with BODIPY FL fluorophore, which fluoresces green when bound to a cysteine monomer but quenches when two cysteines are oxidized to a cysteine dimer. (FIG. 11G) Effect of eosinophils, isolated from peripheral venous blood, on cysteine crosslinking. BODIPY labeled cysteines undergo a minor amount of time-dependent oxidation and cross-linking in the absence of eosinophils, but cysteines exposed to eosinophils undergo much more oxidation and cross-linking, especially when the eosinophils are activated with phorbol-12-myristate-13-acetate (PMA). (FIG. 11H) Effect of eosinophils, isolated from peripheral venous blood, on cysteine-crosslinking in the absence and presence of catalase. Catalase attenuates the cysteine crosslinking seen in response to unstimulated and PMA stimulated eosinophils compared to control. Data in (FIG. 11E) represent 4 tracheal donors, in duplicate. (FIG. 11G) represent 3 asthmatic donors, in triplicate and (FIG. 11H) represent data from an individual asthmatic donor, in triplicate. The data are presented as means±SD. * Indicates $p<0.05$. † indicates $p<0.01$, and ‡ indicates $p<0.001$ for the statistical difference between experimental condition(s) and IL-13-free control in (FIG. 11E), cell-free control in (FIG. 11G) and catalase-free control in (FIG. 11H).

FIG. 17: Modified web-based data capture tool used for longitudinal measurements in a subset of the SARP cohort with repeat MDCT scans. The figure shows a screen capture of the web based survey form that was modified from the original data capture tool to measure mucus plugging at a segmental level for comparison within the same patient over time. The same scoring criteria were displayed at the top of the form and the radiologists entered the data into the data fields as shown here. The data capture shown here is for each segment of right upper lobe-additional fields were available in the tool for the segments in other lung lobes.

DETAILED DESCRIPTION OF THE INVENTION

Definitions

Figures 1A, 1B, 1C:
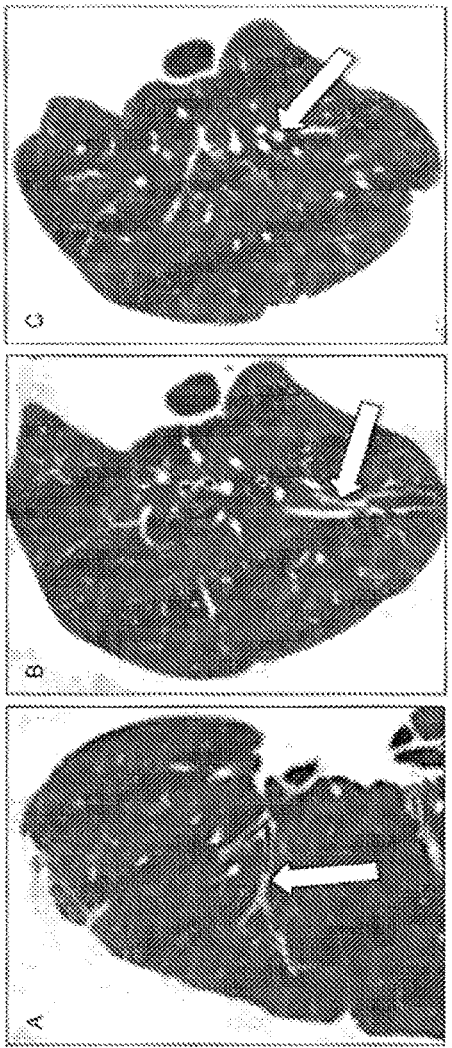

While various embodiments and aspects of the present invention are shown and described herein, it will be obvious to those skilled in the art that such embodiments and aspects are provided by way of example only. Numerous variations, changes, and substitutions will now occur to those skilled in the art without departing from the invention. It should be understood that various alternatives to the embodiments of the invention described herein may be employed in practicing the invention.

The section headings used herein are for organizational purposes only and are not to be construed as limiting the subject matter described. All documents, or portions of documents, cited in the application including, without limitation, patents, patent applications, articles, books, manuals, and treatises are hereby expressly incorporated by reference in their entirety for any purpose.

Unless defined otherwise herein, all technical and scientific terms used herein have the same meaning as commonly understood by one of ordinary skill in the art to which this invention pertains.

"Asthma" is used herein according to its plain, ordinary meaning and refers to a lung disease (typically a chronic lung disease) that inflames and narrows the airways. In embodiments, asthma includes reversible airflow obstruction and bronchospasms. Asthma can cause recurring periods of wheezing (a whistling sound when you breathe), chest tightness, shortness of breath, and/or coughing. The coughing often occurs at night or early in the morning. Additional examples of asthma symptoms include chest pain and a sensation of chest tightness. Severe asthma is differentiated from mild-moderate disease by age of onset, duration of disease, degree of airflow impairment, cellular inflammation, presence of sinusitis and history pneumonia.

"COPD" or "chronic obstructive pulmonary disease" is used herein according to its plain, ordinary meaning and refers to an inflammatory lung disease (often chronic inflammatory lung disease) that causes obstructed airflow from the lungs. COPD may be a progressive disease and symptoms may include breathing difficulty, wheezing, cough, chest discomfort, respiratory distress, tachypnea, cyanosis, use of accessory respiratory muscles, peripheral edema, hyperinflation, chronic wheezing, abnormal lung sounds, prolonged expiration, elevated jugular venous pulse, and sputum production. COPD can cause coughing that produces large amounts of mucus, wheezing, shortness of breath, chest tightness, and other symptoms. In embodiments, a subject has been affirmatively diagnosed as having COPD. In embodiments, a subject is suspected of having COPD. In embodiments, a subject has at least 1, 2, 3, or 4 grandparents, aunts, uncles, cousins, parents, or siblings who have COPD. In embodiments, a subject's COPD has been worsening. In embodiments, a subject has smoked cigarettes for at least about 1, 2, 3, 4, 5, 10, 15, 20, 25, or 30 years.

Asthma and COPD may have similar symptoms including inflammation and mucus within the lungs. In embodiments, identification of and quantification of mucus plugging within the lungs aids in diagnosis, determining prognosis and individually catering treatment protocols.

The term "subject" as used herein is interchangeable with individual or patient, and may refer to a subject to be treated, evaluated or assessed (e.g., diagnosed) using a method, composition, or system provided herein. In some embodiments, the subject is a mammal. In other embodiments, the mammal is a human. In some cases, the methods of the invention find use in experimental animals, in veterinary application, and in the development of animal models for disease, including, but not limited to, rodents including mice, rats, and hamsters, and primates. In embodiments, a subject or "subject in need thereof" is a living member of the animal kingdom suffering from or that may suffer from the indicated disorder. In embodiments, the subject is a member of a species comprising individuals who naturally suffer from the disease. In embodiments, the subject is a mammal. Non-limiting examples of mammals include rodents (e.g., mice and rats), primates (e.g., lemurs, bushbabies, monkeys, apes, and humans), rabbits, dogs (e.g., companion dogs, service dogs, or work dogs such as police dogs, military dogs, race dogs, or show dogs), horses (such as race horses and work horses), cats (e.g., domesticated cats), livestock (such as pigs, bovines, donkeys, mules, bison, goats, camels, and sheep), and deer. In embodiments, the subject is a human. In embodiments, the subject is a non-mammalian animal such as a turkey, a duck, or a chicken. In embodiments, a subject is a living organism suffering from or prone to a disease or condition that can be treated by administration of a composition or pharmaceutical composition as provided herein.

As used herein "extensive airway mucus plugging" refers to a large number of occluded airways (e.g. completely occluded airways) in one or more segments of the lungs. Identification of extensive airway mucus plugging may be determined by assessing the quantity of mucus in an airway within the lung of the subject. In embodiments, a subject has 18 lung segments. In embodiments, a subject has 19 lung segments. In embodiments, a subject has 20 lung segments. In embodiments, extensive airway mucus plugging can indicate complete occlusion of about 1, 2, 3, 4, 5, 6, 7, 8, 9, 10, 11, 12, 13, 14, 15, 16, 17, or 18 lung segments when a subject has a bronchopulmonary system that is divided into 18 segments. In embodiments, extensive airway mucus plugging can indicate complete occlusion of about 1, 2, 3, 4, 5, 6, 7, 8, 9, 10, 11, 12, 13, 14, 15, 16, 17, 18, or 19 lung segments when a subject has a bronchopulmonary system that is divided into 19 segments. In embodiments, extensive airway mucus plugging can indicate complete occlusion of about 1, 2, 3, 4, 5, 6, 7, 8, 9, 10, 11, 12, 13, 14, 15, 16, 17, 18, 19, or 20 lung segments when a subject has a bronchopulmonary system that is divided into 20 segments. In embodiments, extensive airway mucus plugging can indicate complete occlusion of about 5-10%, about 10-20%, about 20-30%, about 30-40%, about 40-50%, about 50-60%, about 60-70%, about 70-80%, about 80-90%, about 90-100%, or about 5%, 10%, 15%, 20%, 30%, 40%, 50%, 60%, 70%, 80%, 90%, or 95% of segments.

As used herein, "complete mucus occlusion of an airway lumen" indicates a complete opacification of an airway by mucus with or without bronchial dilatation as indicated by, e.g., lung imaging. In embodiments, mucus plugs can be detected (e.g. seen) in sections (such as longitudinal sections) as tubular structures with or without branching or in cross-section as rounded opacities.

As used herein "bronchopulmonary segment" and "lung segment" refer to segments of the lung and airway. Bronchopulmonary segments can segregate based on volumetric, functional, or anatomical distinctions. Bronchopulmonary segments can be distinguished between the right and left lungs and anterior or posterior side of the lungs. The trachea divides at the carina forming the left and right main stem bronchi which enter the lung substance to divide further. This initial division is into secondary or lobar bronchi, but subsequent divisions give rise to smaller and smaller bronchi and bronchioles until the smallest bronchioles connect to alveoli. In embodiments, each segment has its own pulmonary arterial branch and thus, the bronchopulmonary segment is a portion of lung supplied by its own bronchus and artery. In embodiments, each segment is functionally and anatomically discrete allowing a single segment to be surgically resected without affecting its neighboring segments. In embodiments, a subject with COPD has some ventilator communication between 2 or more segments. In embodiments, the bronchopulmonary segments are classified using the Boyden classification of bronchi, which is known in the art and provides a standard nomenclature used to describe bronchopulmonary segmental anatomy. See, e.g., Boyden, E. A. (1961) The nomenclature of the bronchopulmonary segments and their blood supply. Dis. Chest 39:1-6, the entire content of which is incorporated herein by reference. In embodiments, bronchopulmonary segmental anatomy describes the division of the lungs into segments based on the tertiary or segmental bronchi.

In embodiments, there are 20 total bronchopulmonary segments. In embodiments, each lung has 10 segments: the upper lobes contain 3 segments, the middle lobe/lingula 2 and the lower lobes 5. In embodiments, bilaterally, the upper lobes have apical, posterior and anterior segments and the lower lobes superior (apical) and 4 basal segments (anterior, medial, posterior and lateral). In embodiments in which there are 20 total bronchopulmonary segments, the segments include the following 20 segments: (1) the apical segment of the upper lobe of the right lung, (2) the posterior segment of the upper lobe of the right lung, (3) the anterior segment of the upper lobe of the right lung, (4) the lateral segment of the middle lobe of the right lung, (5) the medial segment of the middle lobe of the right lung, (6) the superior segment of the lower lobe of the right lung, (7) the medial segment of the lower lobe of the right lung, (8) the anterior segment of the lower lobe of the right lung, (9) the lateral segment of the lower lobe of the right lung, (10) the posterior segment of the lower lobe of the right lung, (11) the apical segment of the upper lobe of the left lung, (12) the posterior segment of the upper lobe of the left lung, (13) the anterior segment of the upper lobe of the left lung, (14) the superior lingular segment of the upper lobe of the left lung, (15) the inferior lingular segment of the upper lobe of the left lung, (16) the superior segment of the lower lobe of the left lung, (17) the anterior segment of the lower lobe of the left lung, (18) the medial segment of the lower lobe of the left lung, (19) the lateral segment of the lower lobe of the left lung, and (20) the posterior segment of the lower lobe of the left lung.

In embodiments, there are 19 total bronchopulmonary segments. In embodiments in which there are 19 total bronchopulmonary segments, the segments include the following 19 segments: (1) the apical segment of the upper lobe of the right lung, (2) the posterior segment of the upper lobe of the right lung, (3) the anterior segment of the upper lobe of the right lung, (4) the lateral segment of the middle lobe of the right lung, (5) the medial segment of the middle lobe of the right lung, (6) the superior segment of the lower lobe of the right lung, (7) the medial segment of the lower lobe of the right lung, (8) the anterior segment of the lower lobe of the right lung, (9) the lateral segment of the lower lobe of the right lung, (10) the posterior segment of the lower lobe of the right lung, (11) the apicoposterior segment of the upper lobe of the left lung, (12) the anterior segment of the upper lobe of the left lung, (13) the superior lingular segment of the upper lobe of the left lung, (14) the inferior lingular segment of the upper lobe of the left lung, (15) the superior segment of the lower lobe of the left lung, (16) the anterior segment of the lower lobe of the left lung, (17) the medial segment of the lower lobe of the left lung, (18) the lateral segment of the lower lobe of the left lung, and (19) the posterior segment of the lower lobe of the left lung.

In embodiments, there are 18 total bronchopulmonary segments. In embodiments in which there are 18 total bronchopulmonary segments, the segments include the following 18 segments: (1) the apical segment of the upper lobe of the right lung, (2) the posterior segment of the upper lobe of the right lung, (3) the anterior segment of the upper lobe of the right lung, (4) the lateral segment of the middle lobe of the right lung, (5) the medial segment of the middle lobe of the right lung, (6) the superior segment of the lower lobe of the right lung, (7) the medial segment of the lower lobe of the right lung, (8) the anterior segment of the lower lobe of the right lung, (9) the lateral segment of the lower lobe of the right lung, (10) the posterior segment of the lower lobe of the right lung, (11) the apicoposterior segment of the upper lobe of the left lung, (12) the anterior segment of the upper lobe of the left lung, (13) the superior lingular segment of the upper lobe of the left lung, (14) the inferior lingular segment of the upper lobe of the left lung, (15) the superior segment of the lower lobe of the left lung, (16) the anteromedial segment of the lower lobe of the left lung, (17) the lateral segment of the lower lobe of the left lung, and (18) the posterior segment of the lower lobe of the left lung.

Figure 9A:
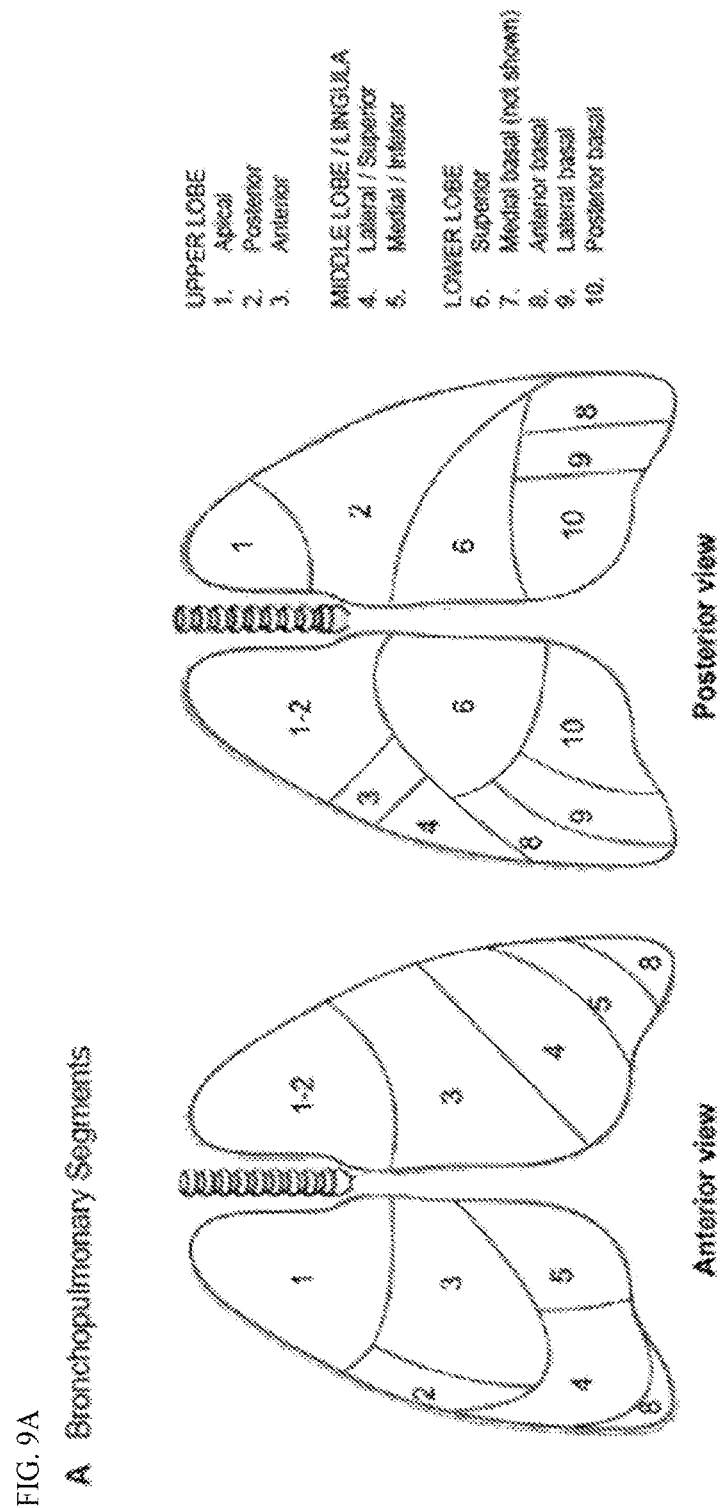
FIG. 9A-9C: Outline of method for determining Mucus Score.

In embodiments, there are 10 segments in the right lung and 8 segments in the left lung. In embodiments, there are 10 segments in the right lung and 8 segments in the left lung. In embodiments, there are 10 bronchopulmonary segments in the left lung and 10 bronchopulmonary segments in the right lung. In embodiments, one or more bronchopulmonary segments span the anterior and posterior of the lung. In embodiments, one or more bronchopulmonary segments are exclusive to the anterior or posterior of the lung. Examples of bronchopulmonary segments include the upper lobe apical segment, upper lobe posterior segment, the upper lobe anterior segment, the lateral/superior segment of the middle lobe, or the medial/inferior segment of the middle lobe, the superior segment of the lower lobe, the medial basal segment of the lower lobe, the anterior basal segment of the lower lobe, the lateral basal segment of the lower lobe, and the posterior basal segment of the lower lobe of each of the left and right lung. FIG. 9A indicates the location of bronchopulmonary segments in subjects with 20 lung segments.

As used herein, "multidetector computed tomography (MDCT) scan" is a method of computed tomography (CT) technology for diagnostic imaging. Multidetector computed tomography (MDCT) may also be referred to as multidetector CT, multidetector-row computed tomography, multidetector-row CT, multisection CT, multislice computed tomography, and multislice CT. MDCT scanning is a rapid, painless diagnostic procedure that combines the use of computers and, e.g., X-rays. In MDCT, a two-dimensional array of detector elements replaces the linear array of detector elements used in typical conventional and helical CT scanners. The two-dimensional detector array permits CT scanners to acquire multiple slices or sections simultaneously and greatly increase the speed of CT image acquisition.

In embodiments, a multiplanar reconstruction of a CT scan is created. In embodiments, the reconstruction is a multiplanar reconstruction (MPR). In embodiments, a volume is built by stacking axial slices from a CT scan. In embodiments, software then reformats slices through the volume in a different plane (e.g., orthogonal). In embodiments, a projection method such as maximum-intensity projection (MIP) or minimum-intensity projection (mIP/MinIP), may be used to build the reconstructed slices.

In light of the subject matter disclosed herein, persons skilled in the art will readily be able to apply the appropriate dose of radiation for MDCT. In embodiments, the dose may vary significantly (e.g., by 5%, 10%, 20%, 30%, 40%, 50% or more) from patient to patient. In embodiments, the dose of radiation is effective to reveal the presence of (e.g., produce an image of) one or more mucus plugs and/or airway lumens in a lung. In embodiments, no specific radiation dose is required. In embodiments, the dose is adjusted based on patient size. In non-limiting examples, the dose may comprise a mean effective dose (E) value of about 0.1-15 mSv, about 3-12 mSv, about 0.1-5.0 mSv, about 0.5-4.0 mSv, about 0.1-3.0 mSv, about 0.1-2.5 mSv, about 0.1-2.0 mSv, about 0.1-1.5 mSv, about 0.1-1.0 mSv, about 0.1-0.9 mSv, about 0.1-0.8 mSv, about 0.1-0.7 mSv, about 0.1-0.6 mSv, about 0.1-0.5 mSv, about 0.1-0.4 mSv, about 0.1-0.3 mSv, about 12 mSv, about 11 mSv, about 10 mSv, about 9 mSv, about 8 mSv, about 7 mSv, about 6 mSv, about 5 mSv, about 4 mSv, about 3 mSv, about 2 mSv, about 1 mSv, about 0.5 mSv, about 0.3 mSv, or about 0.2 mSv. In a non-limiting example, low dose radiation MDCT may be used. As used herein. "low dose radiation MDCT" refers to MDCT protocols that utilize a lower dose than standard radiographic images. Low dose radiation MDCT may comprise a mean effective dose (E) value of about 0.3-2 mSv, e.g., about 0.1 mSv, about 0.4 mSv, about 0.5 mSv, about 0.6 mSv, about 0.7 mSv, about 0.8 mSv, about 0.9 mSv, about 1 mSv, about 1.1 mSv, about 1.2 mSv, about 1.3 mSv, about 1.4 mSv, about 1.5 mSv, about 1.6 mSv, about 1.7 mSv, about 1.8 mSv, about 1.9 mSv, or 2 mSv.

Image reconstruction in MDCT can more complicated than that in single section CT. In embodiments, iterative reconstruction (IR) is used to produce images from MDCT scans. IR is a method to reconstruct 2-D and 3-D images from measured projections of an object. IR of MDCT images is discussed in Jingyan Xu et al., *J Am Coll Radiol.* 2009 April; 6 (4): 274-276. and Frédéric A. Miéville et al., *Eur. J. Med. Phys.* January 2013 Volume 29, Issue 1, Pages 99-110. included herein by reference in their entireties.

"Treatment," "treat," or "treating," as used herein covers any treatment of a disease or condition of an individual and includes, without limitation: (a) preventing the disease or condition from occurring in an individual which may be predisposed to the disease or condition but has not yet been diagnosed as having it; (b) inhibiting the disease or condition, e.g., arresting its development; (c) relieving and or ameliorating the disease or condition, e.g., causing regression of the disease or condition; or (d) curing the disease or condition, e.g., stopping its development or progression. In embodiments, the population of individuals treated by the methods of provided herein includes individuals suffering from the undesirable condition or disease, as well as individuals at risk for development of the condition or disease. In embodiments, "treating" is in reference to a subject with asthma or COPD.

As used herein, "therapeutically effective amount" refers to an amount which is effective in reducing, eliminating, treating, preventing or controlling a symptom (e.g., one or more symptoms) of a disease or condition (such as, COPD or asthma). The term "controlling" is intended to refer to all processes wherein there may be a slowing, interrupting, arresting, or stopping of the progression of a diseases and condition, but does not necessarily indicate a total elimination of all disease and condition symptoms, and is intended to include prophylactic treatment.

As used herein, the term "incompletely responsive" refers to a treatment which has shown no symptomatic improvement or symptomatic improvement but with at least some amount of one or more symptoms remaining. In embodiments, the treatment has shown no symptomatic improvement. In embodiments, the improvement is less than is typically observed in subjects whose symptoms improve after the treatment is administered. In embodiments, the improvement is suboptimal. Suboptimal symptomatic improvement may, for example, be short-lived, or may be to a degree insubstantial to provide a subject in need relief of pain or discomfort. In embodiments, an incomplete response is a lack of improvement or a suboptimal improvement of any 1 of, or any combination of 2 or more of, the following symptoms: shortness of breath, an abnormal lung sound (such as wheezing), cough, chest discomfort (e.g., chest pain or a sensation of chest tightness), tachypnea, cyanosis, use of accessory respiratory muscles, peripheral edema, hyperinflation, prolonged expiration, elevated jugular venous pulse, or sputum production.

As used herein, the term "mucolytic agent" refers to an agent (e.g. a pharmaceutical agent) that is used to dissolve or breakdown mucus. In embodiments, a mucolytic agent acts to reduce the viscosity of mucus so that it may be cleared from the respiratory tract. In embodiments, a mucolytic agent reduces the elasticity of mucus, such that the mucous may more readily be cleared from the respiratory tract. In embodiments, a mucolytic agent reduces both the viscosity and the elasticity of mucus. Example mucolytic agents include, but are not limited to, thiol-based drugs, recombinant human DNAse, hypertonic saline, ambroxol, or an airway epithelial cell ion channel modulator.

As used herein, "thiol-based drugs" or "thiol donors" are small molecule pharmaceuticals containing a thiol group. Mucolytic thiol-based drugs include, for example, n-acetylcysteine, Carbocisteine, Erdosteine, Mecysteine, or a thiol saccharide.

N-acetylcysteine is a mucolytic agent having the structure below:

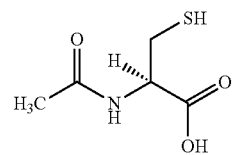

Carbocisteine is a mucolytic agent having the structure below:

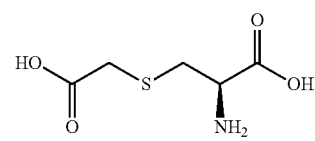 [SMILES: N[C@@H](CSCC(=O)O)C(=O)O]

Erdosteine is a mucolytic agent having the structure below:

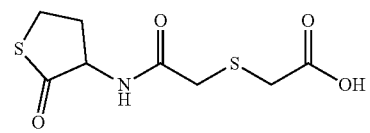 [SMILES: O=C(O)CSCC(=O)NC1CCSC1=O]

Mecysteine is a mucolytic agent having the structure below:

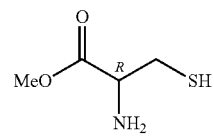

In embodiments, the mucolytic agent is a thiosaccharide. In embodiments, the mucolytic agent is a thiol saccharide. In embodiments, the mucolytic agent is a thioacetyl saccharide. The term "thiosaccharide" as used herein refers to a compound containing at least one tetrahydropyrane ring substituted with at least one thiol (—SH) containing moiety or at least one thioacetyl (—SAc) moiety (and optionally further substituted for example, with hydroxyl moieties or additional tetrahydropyrane rings tetrahydropyrane rings or tetrahydrofuran rings via ether linkers) or at least one tetrahydrofuran ring substituted with at least one thiol containing moiety (and optionally further substituted for example, with hydroxyl moieties or additional tetrahydropyrance rings or tetrahydrofuran rings via ether linkers). Thus, the term "thiol saccharide" refers to a thiosaccharide with at least one thiol (—SH) moiety, and the term "thioacetyl saccharide" refers to a thiosaccharide with at least one thioacetyl (—SAc) moiety. The tetrahydropyrane ring may be a pyranose ring or pyranoside ring in which one or more hydroxyl groups are replaced with a thiol containing moiety (referred to herein as a "thiol pyranose" or "thiol pyranoside", respectively). The tetrahydropyrane ring may be a pyranose ring or pyranoside ring in which one or more hydroxyl groups are replaced with a thioacetyl containing moiety (referred to herein as a "thioacetyl pyranose" or "thioacetyl pyranoside", respectively). The tetrahydrofuran ring may be a furanose ring or furanoside ring in which one or more hydroxyl groups are replaced with a thiol containing moiety (referred to herein as a "thiol pyranose" or "thiol pyranoside", respectively). The tetrahydrofuran ring may be a furanose ring or furanoside ring in which one or more hydroxyl groups are replaced with a thioacetyl containing moiety (referred to herein as a "thioacetyl pyranose" or "thioacetyl pyranoside", respectively). A "thiol monosaccharide" (e.g., thiol monopyranose, thiol monopyranoside, thiol monofuranose, thiol monofuranoside) as used herein refers to compound containing one tetrahydropyrane ring substituted with at least one thiol (—SH) containing moiety or one tetrahydrofuran ring substituted with at least one thiol (—SH) containing moiety. A "thioacetyl monosaccharide" (e.g., thioacetyl monopyranose, thioacetyl monopyranoside, thioacetyl monofuranose, thioacetyl monofuranoside) as used herein refers to compound containing one tetrahydropyrane ring substituted with at least one thioacetyl (—SAc) containing moiety or one tetrahydrofuran ring substituted with at least one thioacetyl (—SAc) containing moiety. A "thiol disaccharide" (e.g., thiol dipyranoside, thiol dipyranoside, thiol difuranose, thiol difuranoside) as used herein refers to a compound containing two tetrahydropyrane rings substituted with at least one thiol (—SH) containing moiety. A "thioacetyl disaccharide" (e.g., thioacetyl dipyranoside, thioacetyl dipyranoside, thioacetyl difuranose, thioacetyl difuranoside) as used herein refers to compound containing two tetrahydropyrane rings substituted with at least one thioacetyl (—SAc) containing moiety. A "thiol trisaccharide" (e.g., thiol tripyranoside, thiol tripyranoside, thiol trifuranose, thiol trifuranoside) as used herein refers to a compound containing three tetrahydropyrane rings substituted with at least one thiol (—SH) containing moiety. A "thioacetyl trisaccharide" (e.g., thioacetyl tripyranoside, thioacetyl tripyranoside, thioacetyl trifuranose, thioacetyl trifuranoside) as used herein refers to compound containing three tetrahydropyrane rings substituted with at least one thioacetyl (—SAc) containing moiety. A "thiol oligosaccharide" (e.g., thiol oligopyranoside, thiol oligopyranoside, thiol oligofuranose, thiol oligofuranoside) as used herein refers to a compound containing more than three tetrahydropyrane rings substituted with at least one thiol (—SH) containing moiety. A "thioacetyl oligosaccharide" (e.g., thioacetyl oligopyranoside, thioacetyl oligopyranoside, thioacetyl oligofuranose, thioacetyl oligofuranoside) as used herein refers to a compound containing more than three tetrahydropyrane rings substituted with at least one thioacetyl (—SAc) containing moiety. In embodiments, the thiosaccharide is a thiosaccharide (e.g., a thiol saccharide or a thioacetyl saccharide) as described in U.S. Patent Application Publication No. 2016/0060284, published Mar. 3, 2016, the entire contents of which are incorporated herein by reference. In embodiments, the thiolsaccharide has one of the following structures:

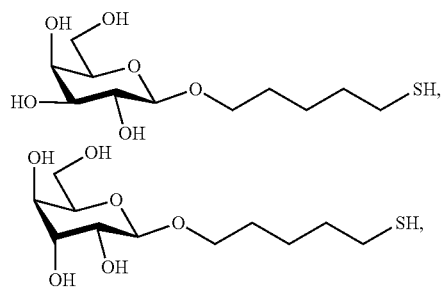

-continued

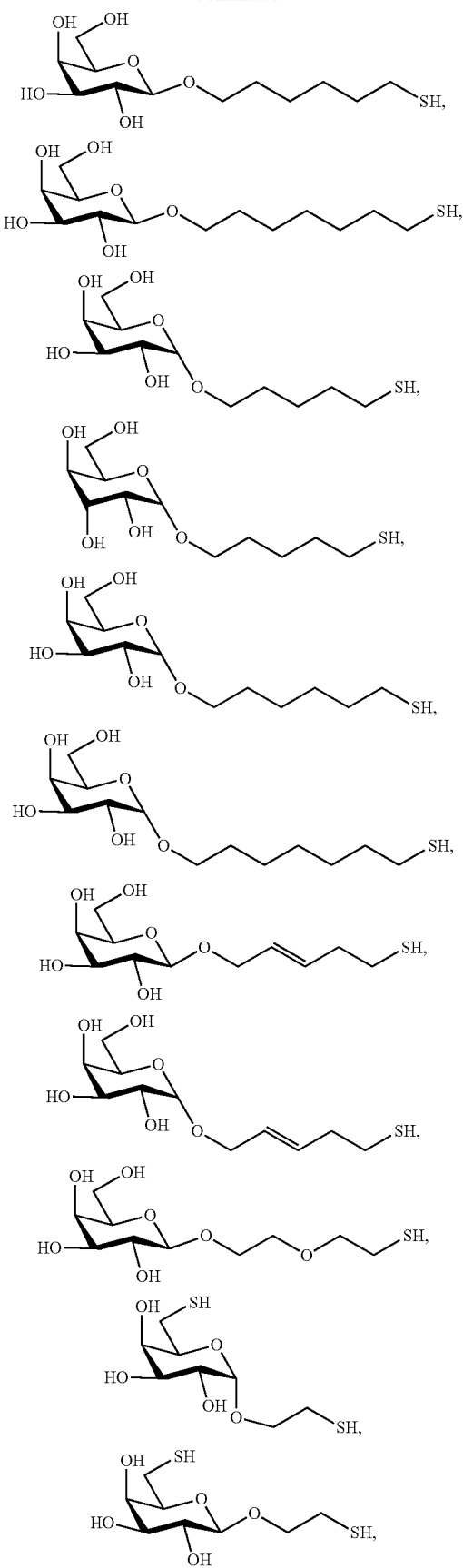

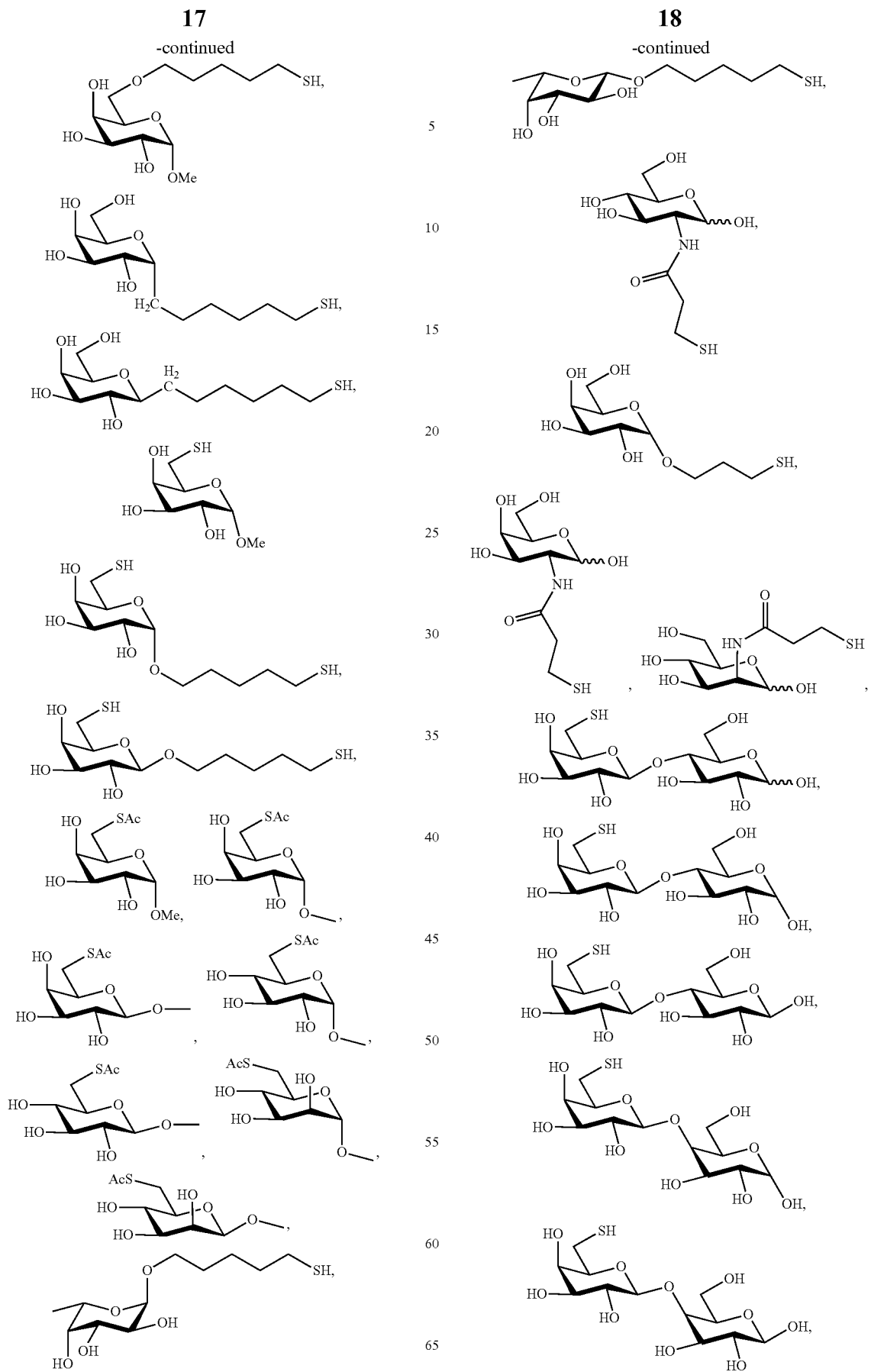

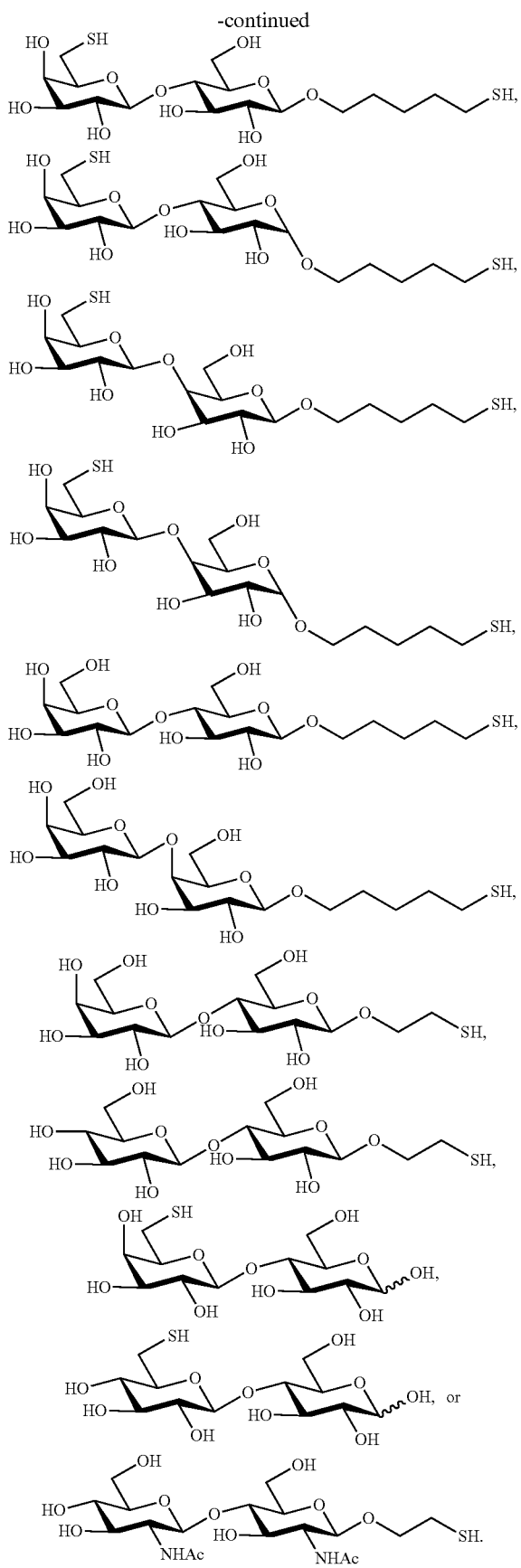

As used herein "thiol saccharides" or "thiol-modified carbohydrates" include for example, methyl 6-thio-6-deoxy-α-D-galactopyranoside (TDG) (shown below) and are further discussed in U.S. Patent Application Publication No. 2016/0060284, published Mar. 3, 2016 included by reference herein in its entirety.

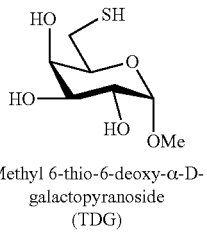

Methyl 6-thio-6-deoxy-α-D-
galactopyranoside
(TDG)

In embodiments, a human DNase (hDNase) such as recombinant human DNase (rhDNase) can be utilized to reduce the viscosity of mucus and sputum in lung disorders. Without wishing to be bound to any particular theory, it is believed that the viscosity of mucus or sputum may be increased by large quantities of DNA which can be alleviated by administration of recombinant human DNase. The term "hDNase" as used herein includes any of the recombinant or naturally-occurring forms of the hDNase or variants or homologs thereof that maintain DNase activity (e.g. within at least 50%, 80%, 90%, 95%, 96%, 97%, 98%, 99% or 100% activity compared to hDNase). In embodiments, the variants or homologs have at least 90%, 95%, 96%, 97%, 98%, 99% or 100% amino acid sequence identity across the whole sequence or a portion of the sequence (e.g. a 50, 100, 150 or 200 continuous amino acid portion) compared to a naturally occurring hDNase polypeptide. In embodiments, hDNase is the protein encoded by the sequence identified by the GenBank Accession No. M55983.1, or an isoform, a homolog or functional fragment thereof.

In embodiments, a hypertonic saline is a saline solution with a concentration of sodium chloride (NaCl) higher than physiologic (e.g. 0.9%). In embodiments, a hypertonic saline comprises a concentration of NaCl of about 1%, 1.5%, 2%, 2.5%, 3%, 3.5%, 4%, 4.5%, 5%, 0.9-3%, or 0.9-5% (w/v). In embodiments, a hypertonic saline can be utilized in the treatment of asthma or COPD. In embodiments, a hypertonic saline can be inhaled or administered by nebulizer.

Ambroxol is an example of a mucolytic agent with secretolytic and secretomotoric actions having the structure shown below. Ambroxol is the active ingredient of Mucosolvan®, Mucobrox®, Mucol®, Lasolvan®, Mucoangin®, Surbronc®, Ambolar®, and Lysopain®

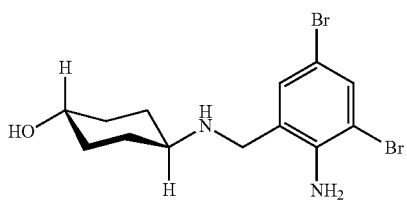

As used herein, an "airway epithelial cell ion channel modulator" is an agent (e.g. pharmaceutical agent) that modulates an ion channel in the airway epithelium. In embodiments, a modulated ion channel include cystic fibrosis transmembrane conductance regulator (CFTR). Non-limiting examples of modulators of CFTR include ivacaftor (Kalydeco®) and lumacaftor. In embodiments, these drugs can be used in a combination of ivacaftor and lumacaftor (Orkambi®).

As used herein, a "type 2 inflammation inhibitor" is an agent (e.g. a pharmaceutical agent) that target molecules within the type 2 inflammation pathway to inhibit the type 2 inflammation pathway. Non-limiting examples of type 2 inflammation inhibitors include inhibitors of IgE, IL-4, IL-5 and IL-13. In embodiments, a type 2 inflammation inhibitor is a prostaglandin $D_2$ receptor 2 antagonist. Non-limiting examples of type 2 inflammation inhibitors include Omalizumab, Mepolizumab, Benralizumab, Reslizumab, Lebrikizumab, GSK679586, Tralokinumab, Dupilumab, and Fevipiprant. Fevipiprant has the following structure:

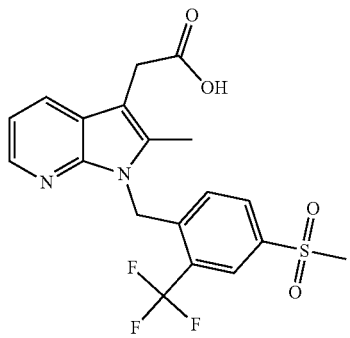

As used herein, the term "bronchodilator" refers to a substance that dilates the bronchi and bronchioles, decreasing resistance in the respiratory airway and increasing airflow to the lungs. Bronchodilators are used in the treatment of lung disorders, including COPD and asthma. In embodiments, a bronchodilator is long-acting. In embodiments, a bronchodilator is short-acting. Non-limiting examples of bronchodilators include albuterol (Proventil HFA®, ProAir®, Ventolin HFA®), levalbuterol (Xopenex®), ipratropium (Atrovent®), indacaterol (Arcapta®), umeclidinium (Incruse®), tiotropium (Spiriva®), olodaterol (Stiverdi®), formoterol (Foradil®), achidinium (Tudorza®), and salmeterol (Serevent®). In embodiments, a bronchodilator is used alone or and in combination with another medication (such as an anti-inflammatory medication).

As used herein, the term "anticholinergic agent" refers to a substance that blocks the activities of acetylcholine. In embodiments, an anticholinergic agent is a muscarinic antagonist with effects in the lung to dilate airway smooth muscle or decrease mucus secretion from mucus cells. Non-limiting examples of short acting muscarinic antagonist include atropine, glycopyrrolate, oxitropium, and ipratropium. Non-limiting examples of long acting muscarinic antagonists as include tiotropium, glycopyrronium bromide, umeclidinium, and aclidinium bromide. In embodiments, an anticholinergic agent prevents acetylcholine from binding to one or more muscarinic receptors. In embodiments, the muscarinic receptors are located on airway smooth muscle. In embodiments, an anticholinergic agent prevents airway smooth muscle contraction through muscarinic receptor blockade, thus acting as a bronchodilator. In embodiments, an anticholinergic agent may be used as a bronchodilator in the treatment of, e.g., asthma, chronic bronchitis, and/or chronic obstructive pulmonary disease (COPD). A general description of ipratropium and methods of production and use may be found in U.S. Pat. No. 6,299,861, which is incorporated by reference herein in its entirety and for all purposes. A general description of tiotropium and methods of production and use may be found in U.S. Pat. No. 5,610,163 and US20040132759 which are incorporated by reference herein in their entirety and for all purposes. A general description of aclidinium and methods of production and use may be found in US Patent application US20150093374 A1, which is incorporated by reference herein in its entirety and for all purposes. A general description of glycopyrronium and methods of production and use may be found in U.S. Pat. No. 6,307,060 B1, which is incorporated by reference herein in its entirety and for all purposes. Anticholinergic agents may be used in combination and in combination with other medications including anti-inflammatory medications and bronchodilators.

As used herein the term "corticosteroid" includes adrenal cortical steroids and derivatives thereof that possess local anti-inflammatory activity, particularly on the mucous membranes. These corticosteroids include for example, hydrocortisone, and cortisone. Inhaled corticosteroids are used in the treatment of asthma. Corticosteroid used in the treatment of COPD or asthma include beclomethasone (QVAR®), budesonide (Pulmicort®), ciclesonide (Alvesco®), flunisolide (Aerospan®), fluticasone (Flovent®), and mometasone (Asmanex Twisthaler®). In embodiments, a corticosteroids is used alone or and in combination with another medication (such as a bronchodilator).

In embodiments, a small molecule is a compound that is less than 2000 daltons in mass. In embodiments, the molecular mass of the small molecule is preferably less than 1000 daltons, more preferably less than 600 daltons, e.g., the compound is less than 500 daltons, 400 daltons, 300 daltons, 200 daltons, or 100 daltons.

The transitional term "comprising." which is synonymous with "including," "containing," or "characterized by," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

As used herein, the singular terms "a," "an," and "the" include the plural reference unless the context clearly indicates otherwise.

Implementations of the present disclosure can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital magnetic resonance image (MRI) capture devices and associated interpretation software, and the like.

In the descriptions herein and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth herein do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described herein can be directed to various combinations and subcombinations of the disclosed features and/or combinations and subcombinations of several further features disclosed herein. In addition, the logic flows depicted in the accompanying figures and/or described herein do not necessarily require the particular order shown, or sequential order, to achieve desirable results. Other implementations can be within the scope of the claims.

Diagnostic and Treatment Methods

In an aspect, provided herein is a diagnostic method comprising detecting an airway mucus occlusion in a lung segment of a subject.

In an aspect, provided herein is a method for identifying whether a subject is likely to respond or responsive to treatment with a mucolytic agent or a type 2 inflammation inhibitor. The method includes detecting an airway mucus occlusion in a lung segment of a subject; and identifying the subject as likely to respond or responsive to treatment with a mucolytic agent or a type 2 inflammation inhibitor if the subject has an airway mucus occlusion in a lung segment.

In an aspect, provided herein is a method for identifying whether a subject is unlikely to respond, incompletely responsive, or unresponsive to treatment with an anticholinergic agent, a bronchodilator, or a corticosteroid. The method includes detecting an airway mucus occlusion in a lung segment of a subject; and identifying the subject as unlikely to respond, incompletely responsive, or unresponsive to treatment with an anticholinergic agent, a bronchodilator, or a corticosteroid if the subject has an airway mucus occlusion in a lung segment.

In an aspect, provided herein is a method of detecting type 2 inflammation in a subject. The method includes detecting an airway mucus occlusion in a lung segment of the subject;

and identifying the subject as having type 2 inflammation if subject has an airway mucus occlusion in a lung segment.

In an aspect, provided herein is a method of treating a subject who has asthma or COPD. The method includes detecting an airway mucus occlusion in a lung segment of the subject; and administering to the subject a therapeutically effective amount of a mucolytic agent or a type 2 inflammation inhibitor, wherein the subject has an airway mucus occlusion in at least one lung segment.

In an aspect, provided herein is a method of treating a subject in need thereof. The method includes administering a therapeutically effective amount of a mucolytic agent or a type 2 inflammation inhibitor to the subject, wherein the subject has an airway mucus occlusion in at least four lung segments.

In an aspect, a method is provided for treating a subject with asthma or COPD. In embodiments, the method includes identifying airway mucus plugging in the subject. In embodiments, the method further includes administering a therapeutically effective amount of a mucolytic agent or a type 2 inflammation inhibitor. In embodiments, the subject has extensive airway mucus plugging.

In embodiments, an anticholinergic agent, a bronchodilator, or a corticosteroid is not administered to the subject. In embodiments, the subject has been administered an anticholinergic agent, a bronchodilator, or a corticosteroid and one or more symptoms of asthma or COPD have not improved after administration of the anticholinergic agent, bronchodilator, or corticosteroid. In embodiments, the subject is incompletely responsive to an anticholinergic agent, a bronchodilator, or a corticosteroid.

In embodiments, the airway mucus occlusion is an airway mucus plug.

In embodiments, detecting the airway mucus occlusion in a lung segment of the subject comprises performing multi-detector computed tomography (MDCT) scan.

In embodiments, the method further comprises applying iterative reconstruction (IR) to produce images from the low dose MDCT scan.

In embodiments, the airway mucus occlusion is farther than about 2 cm from a diaphragmatic pleura and/or a costal pleura in the subject.

In embodiments, the subject is a human subject.

In embodiments, the subject has 20 lung segments, and the lung segment is the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apical segment of the upper lobe of the left lung, the posterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, or the posterior segment of the lower lobe of the left lung.

In embodiments, the subject has 19 lung segments, and the lung segment is the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, or the posterior segment of the lower lobe of the left lung.

In embodiments, the subject has 18 lung segments and the lung segment is the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anteromedial segment of the lower lobe of the left lung, the lateral segment of the lower lobe of the left lung, or the posterior segment of the lower lobe of the left lung.

In embodiments, the lung segment is the right or left of any of the segments selected from the group consisting of the upper lobe apical segment, upper lobe posterior segment, the upper lobe anterior segment, the lateral/superior segment of the middle lobe, or the medial/inferior segment of the middle lobe, the superior segment of the lower lobe, the medial basal segment of the lower lobe, the anterior basal segment of the lower lobe, the lateral basal segment of the lower lobe, and the posterior basal segment of the lower lobe.

In embodiments, the subject has 18, 19, or 20 lung segments. In embodiments, the subject has 18 lung segments. In embodiments, the subject has 19 lung segments. In embodiments, the subject has 20 lung segments.

In embodiments, the subject has an airway mucus occlusion (such as an airway mucus plug) in at least 2, 3, 4, 5, 6, 7, 8, 9, 10, 11, 12, 13, 14, 15, 16, 17, 18, 19, or 20 lung segments. In embodiments, the subject has an airway mucus occlusion (such as an airway mucus plug) in at least 2 lung segments. In embodiments, the subject has an airway mucus occlusion (such as an airway mucus plug) in at least 3 lung segments. In embodiments, the subject has an airway mucus occlusion (such as an airway mucus plug) in at least 4 lung segments. In embodiments, the subject has an airway mucus occlusion (such as an airway mucus plug) in at least 5 lung segments. In embodiments, the subject has an airway mucus occlusion (such as an airway mucus plug) in at least 6 lung segments. In embodiments, the subject has an airway mucus occlusion (such as an airway mucus plug) in at least 7 lung segments. In embodiments, the subject has an airway mucus occlusion (such as an airway mucus plug) in at least 8 lung segments. In embodiments, the subject has an airway mucus occlusion (such as an airway mucus plug) in at least 9 lung segments. In embodiments, the subject has an airway mucus occlusion (such as an airway mucus plug) in at least 10 lung segments. In embodiments, the subject has an airway mucus occlusion (such as an airway mucus plug) in at least 11 lung segments. In embodiments, the subject has an airway mucus occlusion (such as an airway mucus plug) in at least 12 lung segments. In embodiments, the subject has an airway mucus occlusion (such as an airway mucus plug) in at least 13 lung segments. In embodiments, the subject has an airway mucus occlusion (such as an airway mucus plug) in at least 14 lung segments. In embodiments, the subject has an airway mucus occlusion (such as an airway mucus plug) in at least 15 lung segments. In embodiments, the subject has an airway mucus occlusion (such as an airway mucus plug) in at least 16 lung segments. In embodiments, the subject has an airway mucus occlusion (such as an airway mucus plug) in at least 17 lung segments. In embodiments, the subject has an airway mucus occlusion (such as an airway mucus plug) in at least 18 lung segments. In embodiments, the subject has an airway mucus occlusion (such as an airway mucus plug) in at least 19 lung segments. In embodiments, the subject has an airway mucus occlusion (such as an airway mucus plug) in at least 20 lung segments.

In embodiments, subject has an airway mucus occlusion in at least 4 lung segments.

In embodiments, each of the airway mucus occlusion is an airway mucus plug.

In embodiments, the subject has 20 lung segments, and the lung segments are any combination of 2, 3, 4, 5, 6, 7, 8, 9, 10, 11, 12, 13, 14, 15, 16, 17, 18, or 19 of, or all 20 of: the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apical segment of the upper lobe of the left lung, the posterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung.

In embodiments, the subject has 19 lung segments, and the lung segments are any combination of 2, 3, 4, 5, 6, 7, 8, 9, 10, 11, 12, 13, 14, 15, 16, 17, or 18 of, or all 19 of: the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung.

In embodiments, the subject has 18 lung segments, and the lung segments are any combination of 2, 3, 4, 5, 6, 7, 8, 9, 10, 11, 12, 13, 14, 15, 16, or 17 of, or all 18 of: the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anteromedial segment of the lower lobe of the left lung, the lateral segment of the lower lobe of the left lung, and/or the posterior segment of the lower lobe of the left lung.

In embodiments, the lung segments are the right or left of any of the segments selected from the group consisting of the upper lobe apical segment, upper lobe posterior segment, the upper lobe anterior segment, the lateral/superior segment of the middle lobe, or the medial/inferior segment of the middle lobe, the superior segment of the lower lobe, the medial basal segment of the lower lobe, the anterior basal segment of the lower lobe, the lateral basal segment of the lower lobe, and/or the posterior basal segment of the lower lobe.

In embodiments, the asthma is chronic severe asthma.

In embodiments, the subject is incompletely responsive to a bronchodilator or a corticosteroid.

In embodiments, the mucolytic agent is a thiol-based drug, a thiosaccharide, a DNase (such as a recombinant human DNAse), hypertonic saline, ambroxol, or an airway epithelial cell ion channel modulator.

In embodiments, the thiol-based drug is n-acetylcysteine, carbocisteine, erdosteine, mecysteine, or a thiosaccharide (such as a thiol saccharide or a thioacetyl saccharide).

In embodiments, the subject is not administered an anticholinergic agent, a bronchodilator, or a corticosteroid is not administered if 1 or more airway mucus plugs is detected. In embodiments, the subject is administered a mucolytic agent or a type 2 inflammation inhibitor if 1 or more airway mucus plugs is detected. In embodiments, the subject is not administered an anticholinergic agent, a bronchodilator, or a corticosteroid is not administered if 2 or more airway mucus plugs are detected. In embodiments, the subject is administered a mucolytic agent or a type 2 inflammation inhibitor if 2 or more airway mucus plugs are detected. In embodiments, the subject is not administered an anticholinergic agent, a bronchodilator, or a corticosteroid is not administered if 3 or more airway mucus plugs are detected. In embodiments, the subject is administered a mucolytic agent or a type 2 inflammation inhibitor if 3 or more airway mucus plugs are detected. In embodiments, the subject is not administered an anticholinergic agent, a bronchodilator, or a corticosteroid is not administered if 4 or more airway mucus plugs are detected. In embodiments, the subject is administered a mucolytic agent or a type 2 inflammation inhibitor if 4 or more airway mucus plugs are detected. In embodiments, the subject is not administered an anticholinergic agent, a bronchodilator, or a corticosteroid is not administered if 5 or more airway mucus plugs are detected. In embodiments, the subject is administered a mucolytic agent or a type 2 inflammation inhibitor if 5 or more airway mucus plugs are detected. In embodiments, the subject is not administered an anticholinergic agent, a bronchodilator, or a corticosteroid is not administered if 6 or more airway mucus plugs are detected. In embodiments, the subject is administered a mucolytic agent or a type 2 inflammation inhibitor if 6 or more airway mucus plugs are detected. In embodiments, the subject is not administered an anticholinergic agent, a bronchodilator, or a corticosteroid is not administered if 7 or more airway mucus plugs are detected. In embodiments, the subject is administered a mucolytic agent or a type 2 inflammation inhibitor if 7 or more airway mucus plugs are detected. In embodiments, the subject is not administered an anticholinergic agent, a bronchodilator, or a corticosteroid is not administered if 8 or more airway mucus plugs are detected. In embodiments, the subject is administered a mucolytic agent or a type 2 inflammation inhibitor if 8 or more airway mucus plugs are detected. In embodiments, the subject is not administered an anticholinergic agent, a bronchodilator, or a corticosteroid is not administered if 9 or more airway mucus plugs are detected. In embodiments, the subject is administered a mucolytic agent or a type 2 inflammation inhibitor if 9 or more airway mucus plugs are detected. In embodiments, the subject is not administered an anticholinergic agent, a bronchodilator, or a corticosteroid is not administered if 10 or more airway mucus plugs are detected. In embodiments, the subject is administered a mucolytic agent or a type 2 inflammation inhibitor if 10 or more airway mucus plugs are detected. In embodiments, the subject is not administered an anticholinergic agent, a bronchodilator, or a corticosteroid is not administered if 11 or more airway mucus plugs are detected. In embodiments, the subject is administered a mucolytic agent or a type 2 inflammation inhibitor if 11 or more airway mucus plugs are detected. In embodiments, the subject is not administered an anticholinergic agent, a bronchodilator, or a corticosteroid is not administered if 12 or more airway mucus plugs are detected. In embodiments, the subject is administered a mucolytic agent or a type 2 inflammation inhibitor if 12 or more airway mucus plugs are detected. In embodiments, the subject is not administered an anticholinergic agent, a bronchodilator, or a corticosteroid is not administered if 13 or more airway mucus plugs are detected. In embodiments, the subject is administered a mucolytic agent or a type 2 inflammation inhibitor if 13 or more airway mucus plugs are detected. In embodiments, the subject is not administered an anticholinergic agent, a bronchodilator, or a corticosteroid is not administered if 14 or more airway mucus plugs are detected. In embodiments, the subject is administered a mucolytic agent or a type 2 inflammation inhibitor if 14 or more airway mucus plugs are detected. In embodiments, the subject is not administered an anticholinergic agent, a bronchodilator, or a corticosteroid is not administered if 15 or more airway mucus plugs are detected. In embodiments, the subject is administered a mucolytic agent or a type 2 inflammation inhibitor if 15 or more airway mucus plugs are detected. In embodiments, the subject is not administered an anticholinergic agent, a bronchodilator, or a corticosteroid is not administered if 16 or more airway mucus plugs are detected. In embodiments, the subject is administered a mucolytic agent or a type 2 inflammation inhibitor if 16 or more airway mucus plugs are detected. In embodiments, the subject is not administered an anticholinergic agent, a bronchodilator, or a corticosteroid is not administered if 17 or more airway mucus plugs are detected. In embodiments, the subject is administered a mucolytic agent or a type 2 inflammation inhibitor if 17 or more airway mucus plugs are detected. In embodiments, the subject is not administered an anticholinergic agent, a bronchodilator, or a corticosteroid is not administered if 18 or more airway mucus plugs are detected. In embodiments, the subject is administered a mucolytic agent or a type 2 inflammation inhibitor if 18 or more airway mucus plugs are detected. In embodiments, the subject is not administered an anticholinergic agent, a bronchodilator, or a corticosteroid is not administered if 19 or more airway mucus plugs are detected. In embodiments, the subject is administered a mucolytic agent or a type 2 inflammation inhibitor if 19 or more airway mucus plugs are detected. In embodiments, the subject is not administered an anticholinergic agent, a bronchodilator, or a corticosteroid is not administered if 20 or more airway mucus plugs are detected. In embodiments, the subject is administered a mucolytic agent or a type 2 inflammation inhibitor if 20 or more airway mucus plugs are detected. In embodiments, the airway mucus plugs are in different lung segments.

In embodiments, identification of extensive airway mucus plugging is determined by assessing the quantity of mucus in an airway within the lung of the subject. The quantity of mucus may be measured using a variety of techniques. Useful techniques include quantification of lung images from a subject (e.g. a patient with asthma or COPD). In embodiments, based on the lung images, the quantity of mucus plugging may be assess in one or more sub-segmental lung airways. Mucus plugs are a complete opacification of an airway by mucus with or without bronchial dilatation. Mucus plugs can be seen in, e.g., longitudinal sections as tubular structures with or without branching or in cross-section as rounded opacities. In embodiments, a visual scoring system is utilize to assess the quantity of mucus in an airway within the lung of the subject. In embodiments, the visual scoring system is based on a lung scan image (i.e. an image based on a lung scan).

In embodiments, the lung scan may be performed using a non-invasive imaging procedure such as a computerized tomography (CT) scan. In embodiments, the CT scan is an ultralow-dose CT scan. In embodiments, lung images are captured using a computed tomography technology (e.g. Multidetector Computed Tomography (MDCT)).

In embodiments, the system and methods included herein provide detailed methodologies of quantifying mucus plugging by identifying occluded airways in segments of the lungs. In embodiments, the airways in each segment are systematically examined for the presence or absence of a mucus plug. In embodiments, a segment is given a score of 1 if an airway within the segment contains a mucus plug. In embodiments, partial occlusion of an airway is not scored. In embodiments, the scores of each segment are summed to give a score (e.g., the Dunican Score, also called the Dunican Mucus Score).

Figure 9B:
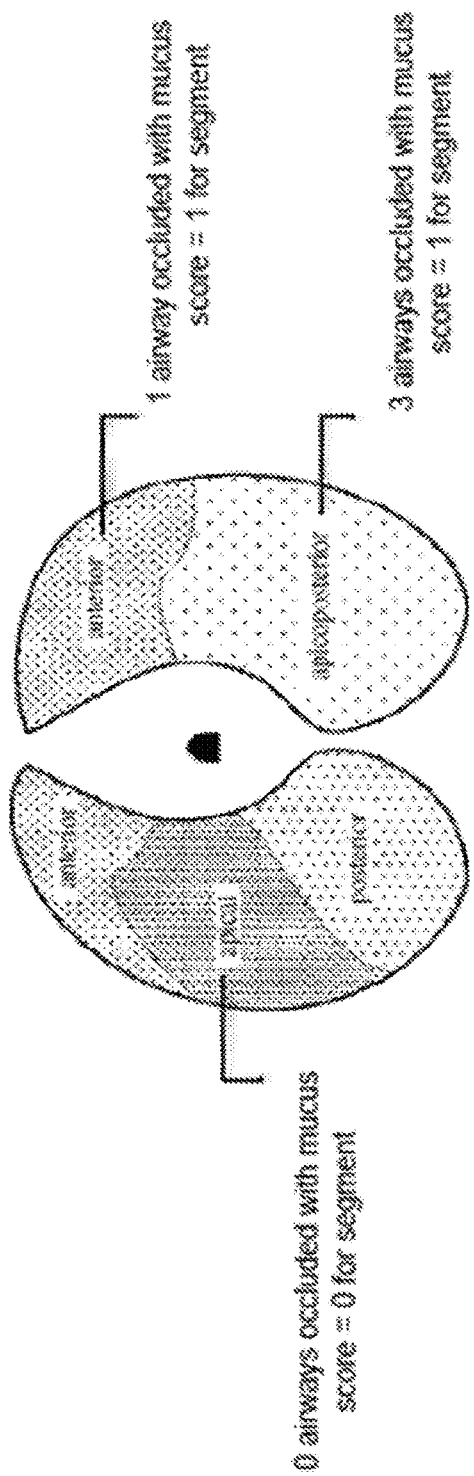
Figure 9C:
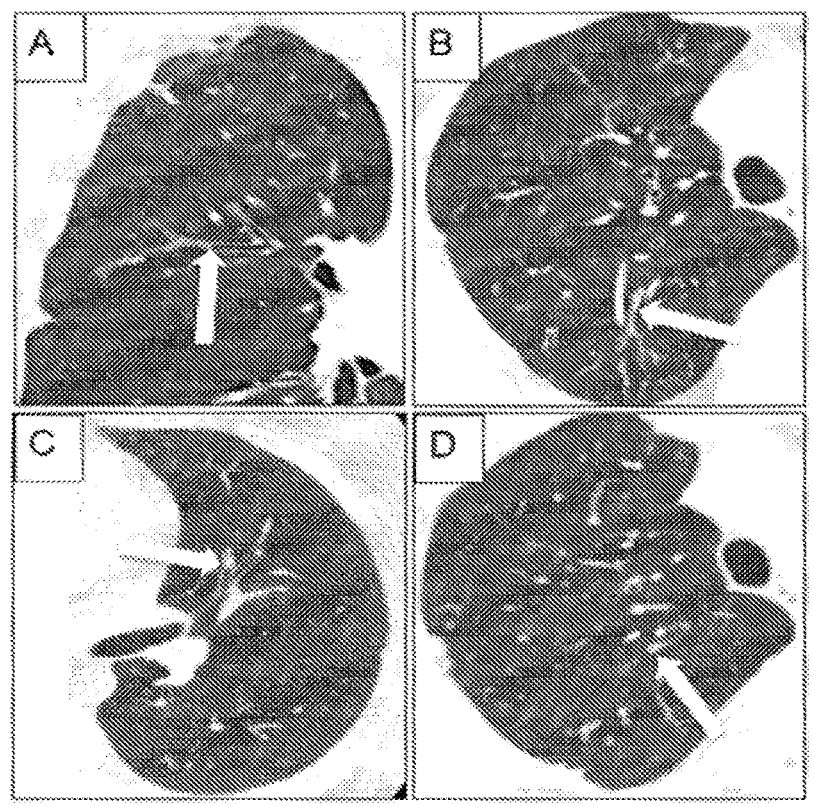

In embodiments, the scoring method can be used to quantify the number of mucus occluded airways in each of 18, 19, or 20 bronchopulmonary lung segments on MDCT lung scans (see, e.g., FIG. 9). In embodiments, the lung is divided anatomically into 18 segments, each with its own airway (that branches further) and blood vessel(s). In embodiments, the lung is divided anatomically into 19 segments, each with its own airway (that branches further)

and blood vessel(s). In embodiments, the lung is divided anatomically into 20 segments, each with its own airway (that branches further) and blood vessel(s). In embodiments, bronchopulmonary segments include the upper lobe apical segment, upper lobe posterior segment, upper lobe anterior segment, the lateral/superior segment of the middle lobe, the medial/inferior segment of the middle lobe, the superior segment of the lower lobe, the medial basal segment of the lower lobe, the anterior basal segment of the lower lobe, the lateral basal segment of the lower lobe, or the posterior basal segment of the lower lobe.

In embodiments, the scoring method measures the burden of intraluminal mucus on Multi Detector Computerized Tomography (MDCT) by quantifying the number of bronchopulmonary segments that are completely occluded with mucus. Using post bronchodilator CT lung images captured when the subject has inhaled to total lung capacity, the segments of each lobe are systematically examined for the presence (score 1) or absence (score 0) of mucus plugs. In embodiments, the segment scores of each lobe are summed to generate a total mucus score for both lungs ranging from 0 to 20 (for human subjects having 20 segments). In embodiments, the segment scores of each lobe are summed to generate a total mucus score for both lungs ranging from 0 to 19 (for human subjects having 19 segments). In embodiments, the segment scores of each lobe are summed to generate a total mucus score for both lungs ranging from 0 to 18 (for human subjects having 18 segments)

In embodiments, peripheral airways within about 2 cm (e.g., within 1.8, 1.9, 2, 2.1, or 2.2) of the diaphragmatic pleura and costal pleura (the latter extending from the midline anteriorly to the transverse process of the thoracic spine posteriorly) are excluded from evaluation as the small caliber of these peripheral airways makes occlusion by mucus difficult to ascertain. In embodiments, mucus plugs are defined as complete occlusion of an airway lumen by mucus. In embodiments, mucus plugs are identified as tubular structures with or without branching in longitudinal section or as rounded opacities in cross-section and differentiated from blood vessels by their position relative to adjacent bronchi and blood vessels. In embodiments, in cases where the plugs are difficult to differentiate from normal blood vessels, they are traced cephalad or caudad on adjacent lung slices to confirm their continuity with bronchi.

In embodiments, in applying the scoring methods of the present invention (score range: 0-20, or 0-19 or 1-18) to MDCT lung scans from patients with asthma and COPD, a subgroup with mucus scores >3 (e.g., at least 4) can be identified. These "mucus-high" patients are characterized by more severe airflow obstruction, high levels of airway and systemic type 2 inflammation, and relative resistance to usual asthma and COPD treatments. Notably, this "mucus-high" disease subtype is not revealed by mucus symptoms or by specific tests of lung function. Therefore, these asthma$^{mu\text{-}cus\text{-}high}$ and COPD$^{mucus\text{-}high}$ patient subgroups represent new disease phenotypes that require treatment interventions that specifically target mucus plugging of the airways.

In embodiments, the scoring method utilizes a simple 18, 19, or 20-point visual scoring system. The system was developed by application to MDCT scans from asthmatics and healthy controls. In embodiments, the scoring system assigns a score of 1 to any lung segment with an airway within it completely occluded with mucus. In embodiments, MDCT reveals mucus plugging in subsegmental airways in at least one of 18, 19, or 20 lung segments in asthmatics. In embodiments, a subject has a mucus plug in a subsegmental airway in at least one (e.g., 1, 2, 3, 4, 5, 6, 7, 8, 9, 10, 11, 12, 13, 14, 15, 16, 17, or 18) of 18, 19, or 20 lung segments. In embodiments, a subject has a mucus plug in a subsegmental airway in at least one (e.g., 1, 2, 3, 4, 5, 6, 7, 8, 9, 10, 11, 12, 13, 14, 15, 16, 17, or 18) of 18 lung segments. In embodiments, a subject has a mucus plug in a subsegmental airway in at least one (e.g., 1, 2, 3, 4, 5, 6, 7, 8, 9, 10, 11, 12, 13, 14, 15, 16, 17, 18, or 19) of 19 lung segments. In embodiments, a subject has a mucus plug in a subsegmental airway in at least one (e.g., 1, 2, 3, 4, 5, 6, 7, 8, 9, 10, 11, 12, 13, 14, 15, 16, 17, 18, 19, or 20) of 20 lung segments. In embodiments, a high mucus score (plugging in at least 4 segments) is indicative of asthma with severe airflow obstruction. In embodiments, a high mucus score is a biomarker indicating need for treatment with a mucolytic drug.

In embodiments, the presence of a mucus plug in a subsegmental airway is a marker of type 2 inflammation. In embodiments, a subject with type 2 inflammation is identified as likely to respond to (e.g., be treated by) a type 2 inflammation inhibitor. In embodiments, a subject with type 2 inflammation has a mucus plug in a subsegmental airway in at least one (e.g., 1, 2, 3, 4, 5, 6, 7, 8, 9, 10, 11, 12, 13, 14, 15, 16, 17, or 18) of 18, 19, or 20 lung segments. In embodiments, a subject with type 2 inflammation has a mucus plug in a subsegmental airway in at least one (e.g., 1, 2, 3, 4, 5, 6, 7, 8, 9, 10, 11, 12, 13, 14, 15, 16, 17, or 18) of 18 lung segments. In embodiments, a subject with type 2 inflammation has a mucus plug in a subsegmental airway in at least one (e.g., 1, 2, 3, 4, 5, 6, 7, 8, 9, 10, 11, 12, 13, 14, 15, 16, 17, 18, or 19) of 19 lung segments. In embodiments, a subject with type 2 inflammation has a mucus plug in a subsegmental airway in at least one (e.g., 1, 2, 3, 4, 5, 6, 7, 8, 9, 10, 11, 12, 13, 14, 15, 16, 17, 18, 19, or 20) of 20 lung segments. In embodiments, a high mucus score (plugging in at least 4 segments) is indicative of type 2 inflammation. In embodiments, a subject with type 2 inflammation in administered a type 2 inflammation inhibitor. In embodiments, the type 2 inflammation inhibitor is a prostaglandin $D_2$ receptor 2 antagonist. In embodiments, the type 2 inflammation inhibitor is Omalizumab, Mepolizumab, Benralizumab, Reslizumab, Lebrikizumab, GSK679586, Tralokinumab, Dupilumab, or Fevipiprant.

Imaging of the lungs has been previously utilized in the diagnosis of lung diseases. Previous methods of quantifying lung mucus occlusion, including the Bhalla scoring system, have not been robust in their applicability to multiple lung diseases. These prior scoring methods quantified mucus based on few lung lobes, or used arbitrary zones and often utilized lower resolution imaging. In embodiments, methods provided herein allow for consistent scoring utilizing low-radiation, high resolution imaging (e.g. Multidetector Computed Tomography (MDCT)). Additional assays for the detection and diagnosis of lung disorders include spirometry, flow assays, methacholine challenges, nitric oxide exhalation studies, chest x-ray, sputum eosinophil evaluation, and provocative testing with either exercise or cold-induced asthma. These tests can be used in addition to the methods provided herein for further diagnostic clarity. In embodiments, a method provided herein is part of a battery of diagnostic testing for a lung disorder such as COPD or asthma.

In an aspect, provided herein is a method of treating a subject who has asthma or COPD. The method includes detecting an airway mucus occlusion in a lung segment of the subject; and administering to the subject a therapeutically effective amount of a mucolytic agent or a type 2 inflammation inhibitor, wherein the subject has an airway mucus occlusion in at least one lung segment.

In an aspect, provided herein is a method of treating a subject in need thereof. The method includes administering a therapeutically effective amount of a mucolytic agent or a type 2 inflammation inhibitor to the subject, wherein the subject has an airway mucus occlusion in at least four lung segments.

In embodiments, methods provided herein may be used to identify patients with excessive airway mucus plugging. In embodiments, this disease subset can be better served by treatment particular to airway mucus plugging. In embodiments, treatments may include mucoactive drugs that hasten mucus clearance or drugs that suppress type 2 inflammation (an upstream cause of mucus plugs). Non-limiting categories of potentially useful mucoactive drugs include mucolytics that target the polymers that impart abnormal biophysical properties to airway mucus. In embodiments, mucolytics include thiol-based drugs such as N-acetylcysteine that lyse mucin polymers, and rhDNAse drugs that cleave DNA polymers. In embodiments, N-acetyl cysteine (NAC) can be used as a nebulized mucolytic treatment to improve airflow, as it liquefies asthma mucus. Other mucoactive drugs that improve mucociliary clearance include hypertonic saline and drugs that affect the function of airway epithelial cell ion channels. Non-limiting categories of type 2 inflammation inhibitors include small molecule and protein therapeutics that inhibit molecular members of the type 2 inflammation cascade (e.g. inhibitors of IL-4, IL-5, IL-13, IL-25, IL-33, and TSLP, as well as inhibitors of CRTH2 and Siglec-8). In embodiments, treatment may include a mucolytic agent such as a thiol-based drug (n-acetylcysteine, carbocisteine, erdosteine, mecysteine, or thiol saccharides), a DNase such as a recombinant human DNAse, hypertonic saline, ambroxol, or an airway epithelial cell ion channel modulator.

Device Assisted Identification of Mucus Plugging

In an aspect is provided an application to facilitate the generation of a mucus score for an individual with asthma or COPD by a clinical radiologist to aid in the proper and accurate assessment of airway mucus plugging on MDCT lung scans. In embodiments, an application (e.g., a computer or smart phone app) can provide training or an outline in the scoring of mucus plugs in MDCT images. In embodiments, an application can facilitate or record the generation of an accurate Mucus Score to specifically diagnose patients who have a high mucus subset of asthma or COPD.

Asthma and COPD Treatment System and Method

Figure 18:
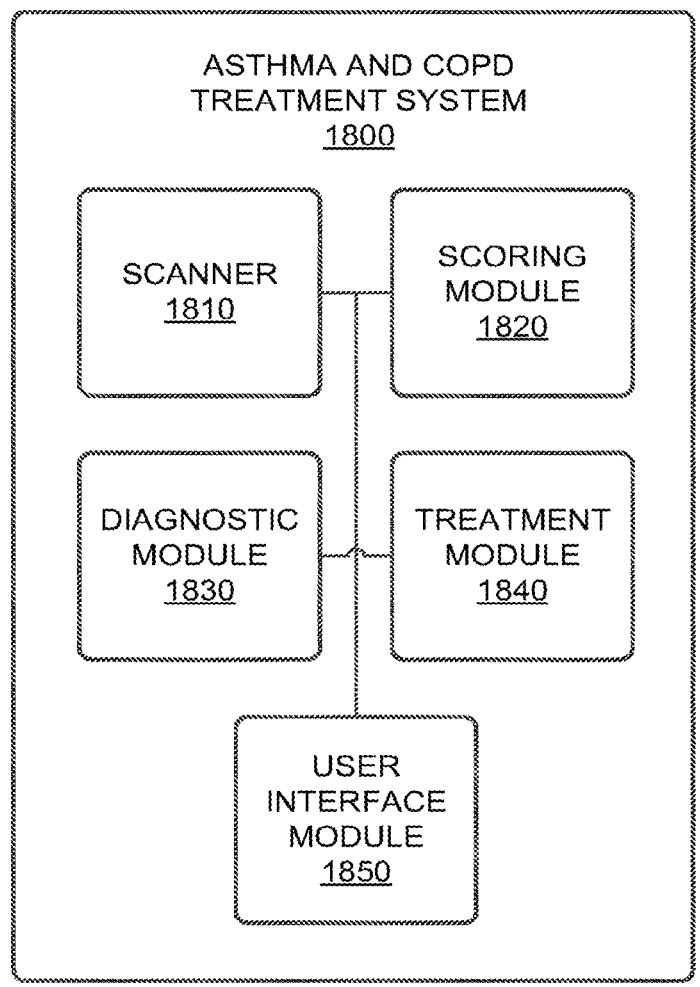
FIG. 18: Asthma and COPD treatment system. The figure shows a block diagram illustrating a system that is configured to treat asthma and COPD.

FIG. 18 depicts a block diagram illustrating an asthma and COPD treatment system 1800, in accordance with some example embodiments. Referring to FIG. 18, the asthma and COPD treatment system 1800 can be configured to diagnose and treat asthma and COPD. As shown in FIG. 1800, the asthma and COPD treatment system 1800 can include a scanner 1810, a scoring module 1820, a diagnostic module 1830, a treatment module 1840, and a user interface module 1850. It should be appreciated that the asthma and COPD treatment system 1800 can include additional and/or different modules than shown.

In some embodiments, the scanner 1810 can be configured to perform a non-invasive imaging procedure in order to capture, for example, one or more lung images. For example, the scanner 1810 can be a CT scanner and/or a MDCT scanner.

In some embodiments, the scoring module 1820 can be configured to quantify mucus plugging based on the images captured by the scanner 1810. The scoring module 1820 may quantify mucus plugging by at least identifying, in the images captured by the scanner 1810, occluded airways in one or more segments of the lungs. It should be appreciated that the lung may be divided anatomically into 18 segments, 19 segments, and/or 20 segments. As such, the scoring module 1820 can quantify mucus plugging by identifying occluded airways in each of 18 lung segments, 19 lung segments, and/or 20 lung segments. For example, the scoring module 1820 can identify occluded airways in an upper lobe apical segment, an upper lobe posterior segment, an upper lobe anterior segment, a lateral/superior segment of the middle lobe, a medial/inferior segment of the middle lobe, a superior segment of the lower lobe, a medial basal segment of the lower lobe, an anterior basal segment of the lower lobe, a lateral basal segment of the lower lobe, and/or a posterior basal segment of the lower lobe of a lung.

The scoring module 1820 can examine the airways in a lung segment for the presence and/or absence of a mucus plug in the lung segment. The scoring module 1820 may further determine an overall score that quantifies mucus plugging based on the presence and/or absence of mucus plugs in various lung segments. It should be appreciated that this overall score can be a Dunican Score and/or a Dunican Mucus Score. To determine the overall score for the subject, the scoring module 1820 can assign an individual score to each lung segment. For example, an individual score can be a binary value, such as a "1" or a "0," corresponding to the presence and/or absence of a mucus plug within a lung segment. The overall score can include a summation of the individual scores assigned to each lung segment. For instance, in a human subject having 20 lung segments, the overall score can range from 0 to 20. Alternately and/or additionally, in a human subject having 19 lung segments, the overall score can range from 0 to 19. Meanwhile, in a human subject having 18 lung segments, the overall score can range from 0 to 18.

In some embodiments, the diagnostic module 1830 may be configured to determine a diagnosis based on the overall score quantifying mucus plugging. For example, the diagnostic module 1830 can identify "mucus-high" subjects whose overall score exceeds a threshold value (e.g., 3). As noted earlier, "mucus-high" subjects exhibit more severe airflow obstruction, high levels of airway and systemic type 2 inflammation, and relative resistance to usual asthma and COPD treatments. Thus, the diagnostic module 1830 may identify these subjects as having new disease phenotypes that require treatment interventions that specifically target mucus plugging of the airways.

In some embodiments, the treatment module 1840 can be configured to determine one or more treatments for subjects identified (e.g., by the diagnostic module 1830) as "mucus-high" subjects. For example, the one or more treatments can include mucoactive drugs that hasten mucus clearance and/or drugs that suppress type 2 inflammation. Alternately and/or additionally, the one or more treatments can include a mucolytic agent such as a thiol-based drug (n-acetylcysteine, carbocisteine, erdosteine, mecysteine, or thiol saccharides), a DNase such as a recombinant human DNAse, hypertonic saline, ambroxol, or an airway epithelial cell ion channel modulator.

It should be appreciated that the treatment module 1840 may identify mucoactive drugs including, for example, mucolytics that target the polymers that impart abnormal biophysical properties to airway mucus. Such mucolytics can include thiol-based drugs such as N-acetylcysteine that lyse mucin polymers, and rhDNAse drugs that cleave DNA polymers. The N-acetyl cysteine (NAC) can be used as a nebulized mucolytic treatment to improve airflow, as it liquefies asthma mucus. Alternately and/or additionally, the treatment module 1840 can also identify mucoactive drugs that improve mucociliary clearance include hypertonic saline and drugs that affect the function of airway epithelial cell ion channels. Non-limiting categories of type 2 inflammation inhibitors include small molecule and protein therapeutics that inhibit molecular members of the type 2 inflammation cascade (e.g. inhibitors of IL-4, IL-5, IL-13, IL-25, IL-33, and TSLP, as well as inhibitors of CRTH2 and Siglec-8).

In some embodiments, the user interface module 1850 can be configured to generate one or more user interfaces, such as graphic user interfaces (GUIs), for interacting with the asthma and COPD treatment system 1800. For example, the user interface module 1850 can generate user interfaces configured for receiving inputs from a user such as, for example, a physician, a laboratory technician, and/or any other medical professional. Alternately and/or additionally, the user interface module 1850 can generate user interfaces for displaying outputs from the asthma and COPD treatment system 1800. These outputs may include, for example, the diagnosis determined by the diagnostic module 1830 and/or the treatments identified by the treatment module 1840.

Figure 19:
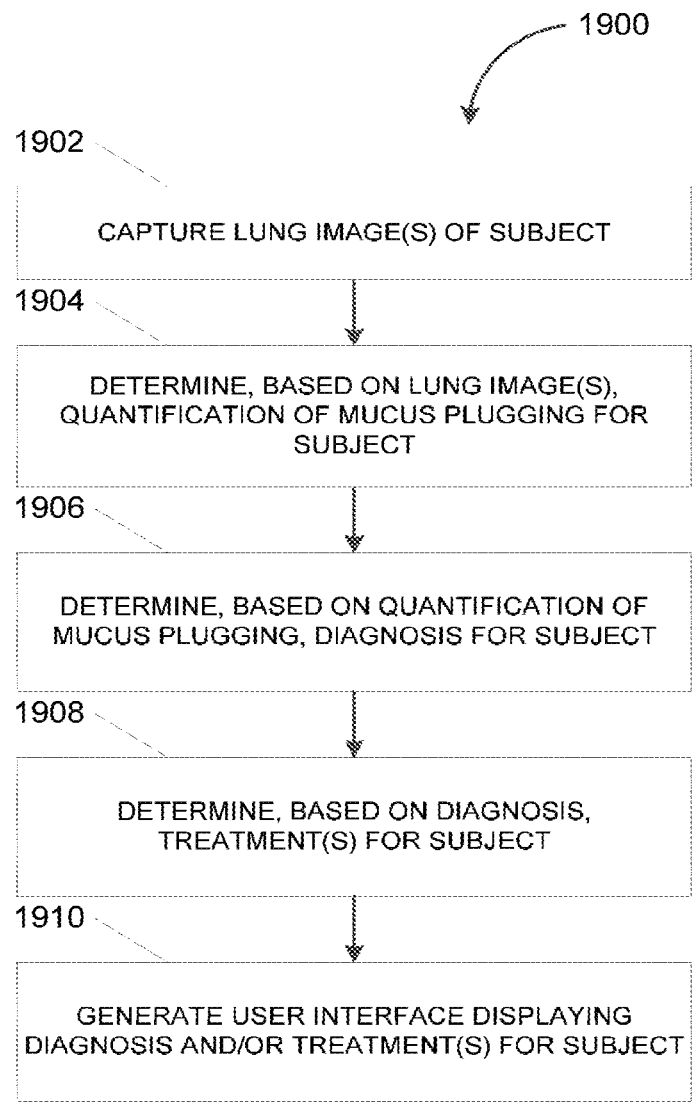
FIG. 19: Method for treating asthma and COPD. The figure shows a flowchart illustrating a process for treatment asthma and COPD that may be performed by an asthma and COPD treatment system.

FIG. 19 depicts a flowchart illustrating a process 1900 for treating asthma and COPD, in accordance with some example embodiments. Referring to FIGS. 18-19, the process 1900 may be performed by the asthma and COPD treatment system 1800.

The asthma and COPD treatment system 1800 can capture one or more lung images of a subject (1902). For example, the asthma and COPD treatment system 1800 (e.g., the scanner 1810) can perform a non-invasive imaging procedure, such as a CT scan and/or an MDCT scan, in order to capture the one or more lung images.

The asthma and COPD treatment system 1800 can determine, based on the one or more lung images, a quantification of mucus plugging for the subject (1904). For example, the asthma and COPD treatment system 1800 (e.g., the scoring module 1820) can quantify mucus plugging by at least identifying, in the one or more lung images, occluded airways in one or more segments of the lungs. In some embodiments, the asthma and COPD treatment system 1800 can examine the airways in each lung segment for the presence and/or absence of mucus plugs. Furthermore, the scoring module 1820 can determine an overall score that quantifies mucus plugging based on the presence and/or absence of mucus plugs in various lung segments. This overall score can be a summation of the individual scores assigned to each lung segment. As noted earlier, the individual score assigned to a lung segment may be a binary value (e.g., a 1 or a 0) indicative of whether a mucus plug is present or absent in that lung segment.

The asthma and COPD treatment system 1800 can determine, based on the quantification of mucus plugging, a diagnosis for the subject (1906). For example, in some embodiments, the asthma and COPD treatment system 1800 (e.g., the diagnostic module 1830) can diagnose a subject as being "mucus-high" when the overall score for the subject exceeds a threshold value (e.g., 3).

The asthma and COPD treatment system 1800 can determine, based on the diagnosis, one or more treatments for the subject (1908). For example, the asthma and COPD treatment system 1800 (e.g., the treatment module 1840) can identify treatments for a subject diagnosed as being "mucus-high." The treatments can include, for example, mucoactive drugs that hasten mucus clearance, drugs that suppress type 2 inflammation, mucolytic agents (e.g., a thiol-based drug), a DNase (e.g., recombinant human DNAse), hypertonic saline, ambroxol, and/or an airway epithelial cell ion channel modulator.

The asthma and COPD treatment system 1800 can generate a user interface displaying the diagnosis and/or the one or more treatments for the subject (1910). In some example embodiments, the asthma and COPD treatment system 1800 (e.g., the user interface module 1850) can generate one or more user interfaces (e.g., GUIs) for displaying the diagnosis and/or the treatments for the subject.

EMBODIMENTS

Embodiments include P1 to P12 following.

Embodiment P1. A method of treating a subject with asthma or COPD, the method comprising:
identifying extensive airway mucus plugging; and
administering a therapeutically effective amount of a mucolytic agent or a type 2 inflammation inhibitor, wherein said subject has extensive airway mucus plugging.

Embodiment P2. The method of embodiment 1, wherein identifying extensive airway mucus plugging comprises performing a multidetector computed tomography (MDCT) scan.

Embodiment P3. The method of embodiment 2, wherein said MDCT is a low dose radiation MDCT.

Embodiment P4. The method of embodiment 3, further comprising applying iterative reconstruction (IR) to produce images from said low dose MDCT scan.

Embodiment P5. The method of embodiment 1, wherein said subject has complete mucus occlusion of an airway lumen.

Embodiment P6. The method of embodiment 1, wherein said subject has complete mucus occlusion of an airway lumen in at least one bronchopulmonary segment.

Embodiment P7. The method of embodiment 1, wherein said subject has complete mucus occlusion of an airway lumen in at least three broncopulmonary segments.

Embodiment P8. The method of embodiment 6 or embodiment 7, wherein said bronchopulmonary segments include the right or left of any of the segments selected from the group consisting of the upper lobe apical segment, upper lobe posterior segment, the upper lobe anterior segment, the lateral/superior segment of the middle lobe, or the medial/inferior segment of the middle lobe, the superior segment of the lower lobe, the medial basal segment of the lower lobe, the anterior basal segment of the lower lobe, the lateral basal segment of the lower lobe, and the posterior basal segment of the lower lobe.

Embodiment P9. The method of embodiment 1, wherein said asthma is chronic severe asthma.

Embodiment P10. The method of embodiment 1, wherein said subject is incompletely responsive to bronchodilators and corticosteroids.

Embodiment P11. The method of embodiment 1, wherein the mucolytic agent is a thiol-based drug, a recombinant human DNAse, hypertonic saline, ambroxol, or an airway epithelial cell ion channel modulator.

Embodiment P12. The method of embodiment 11, wherein the thiol-based drug is n-acetylcysteine, carbocisteine, erdosteine, mecysteine, or a thiol saccharide.

ADDITIONAL EMBODIMENTS

Embodiments include E1 to E46 following.

Embodiment E1. A method of treating a subject who has asthma or chronic obstructive pulmonary disease (COPD), the method comprising:
  detecting an airway mucus occlusion in a lung segment of the subject; and
  administering to the subject a therapeutically effective amount of a mucolytic agent or a type 2 inflammation inhibitor, wherein the subject has an airway mucus occlusion in at least one lung segment.

Embodiment E2. The method of Embodiment E1, wherein an anticholinergic agent, a bronchodilator, or a corticosteroid is not administered to the subject.

Embodiment E3. The method of Embodiment E1, wherein the airway mucus occlusion is an airway mucus plug.

Embodiment E4. The method of any one of Embodiments E1 to E3, wherein detecting the airway mucus occlusion in a lung segment of the subject comprises performing multi-detector computed tomography (MDCT) scan.

Embodiment 5. The method of Embodiment E4, wherein the MDCT is a low dose radiation MDCT.

Embodiment 6. The method of Embodiment E5, further comprising applying iterative reconstruction (IR) to produce images from the low dose MDCT scan.

Embodiment 7. The method of any one of Embodiments E1 to E6, wherein the airway mucus occlusion is farther than about 2 cm from a diaphragmatic pleura and/or a costal pleura in the subject.

Embodiment E8. The method of any one of Embodiments E1 to E7, wherein the subject is a human subject.

Embodiment E9. The method of any one of Embodiments E1 to E8, wherein
  (a) the subject has 20 lung segments, and the lung segment is the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apical segment of the upper lobe of the left lung, the posterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, or the posterior segment of the lower lobe of the left lung;
  (b) the subject has 19 lung segments, and the lung segment is the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, or the posterior segment of the lower lobe of the left lung; or
  (c) the subject has 18 lung segments and the lung segment is the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anteromedial segment of the lower lobe of the left lung, the lateral segment of the lower lobe of the left lung, or the posterior segment of the lower lobe of the left lung.

Embodiment E10. The method of Embodiment E8 or E9, wherein the subject has 18, 19, or 20 lung segments.

Embodiment E11. The method of Embodiment E10, wherein the subject has an airway mucus occlusion in at least 2, 3, 4, 5, 6, 7, 8, 9, 10, 11, 12, 13, 14, 15, 16, 17, or 18 lung segments.

Embodiment E12. The method of Embodiment E11, wherein the subject has an airway mucus occlusion in at least 4 lung segments.

Embodiment E13. The method of Embodiment E11 or E12, wherein each of the airway mucus occlusion is an airway mucus plug.

Embodiment E14. The method of any one of Embodiments E10 to E13, wherein
  (a) the subject has 20 lung segments, and the lung segments are any combination of the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apical segment of the upper lobe of the left lung, the posterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung;
(b) the subject has 19 lung segments, and the lung segments are any combination of the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung; or
(c) the subject has 18 lung segments, and the lung segments are any combination of the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anteromedial segment of the lower lobe of the left lung, the lateral segment of the lower lobe of the left lung, and/or the posterior segment of the lower lobe of the left lung.

Embodiment E15. The method of any one of Embodiments E1 to E14, wherein the asthma is chronic severe asthma.

Embodiment E16. The method of any one of Embodiments E1 to E15, wherein the subject is incompletely responsive to a bronchodilator or a corticosteroid.

Embodiment E17. The method of any one of Embodiments E1 to E16, wherein the mucolytic agent is a thiol-based drug, a thiosaccharide, a recombinant human DNAse, hypertonic saline, ambroxol, or an airway epithelial cell ion channel modulator.

Embodiment E18. The method of Embodiment E17, wherein the thiol-based drug is n-acetylcysteine, carbocisteine, erdosteine, mecysteine, or a thiol saccharide.

Embodiment E19. A method of treating a subject in need thereof, the method comprising administering a therapeutically effective amount of a mucolytic agent or a type 2 inflammation inhibitor to the subject, wherein the subject has an airway mucus occlusion in at least four lung segments.

Embodiment E20. The method of Embodiment E19, wherein the subject has asthma or COPD.

Embodiment E21. A method of detecting type 2 inflammation in a subject, the method comprising:
detecting an airway mucus occlusion in a lung segment of the subject; and
identifying the subject as having type 2 inflammation if subject has an airway mucus occlusion in a lung segment.

Embodiment E22. The method of Embodiment E21, further comprising administering a therapeutically effective amount of a type 2 inflammation inhibitor to the subject.

Embodiment E23. A diagnostic method comprising detecting an airway mucus occlusion in a lung segment of a subject.

Embodiment E24. A method for identifying whether a subject is likely to respond or responsive to treatment with a mucolytic agent or a type 2 inflammation inhibitor, the method comprising:
detecting an airway mucus occlusion in a lung segment of a subject; and
identifying the subject as likely to respond or responsive to treatment with a mucolytic agent or a type 2 inflammation inhibitor if the subject has an airway mucus occlusion in a lung segment.

Embodiment E25. A method for identifying whether a subject is unlikely to respond, incompletely responsive, or unresponsive to treatment with an anticholinergic agent, a bronchodilator, or a corticosteroid, the method comprising:
detecting an airway mucus occlusion in a lung segment of a subject; and
identifying the subject as unlikely to respond, incompletely responsive, or unresponsive to treatment with an anticholinergic agent, a bronchodilator, or a corticosteroid if the subject has an airway mucus occlusion in a lung segment.

Embodiment E26. The method of any one of Embodiments E21 to E25, wherein the subject has asthma or COPD.

Embodiment E27. The method of any one of Embodiments E19 to E26, wherein the airway mucus occlusion is an airway mucus plug.

Embodiment E28. The method of any one of Embodiments E19 to E27, wherein detecting an airway mucus occlusion in a lung segment of the subject comprises performing a multidetector computed tomography (MDCT) scan.

Embodiment E29. The method of Embodiment E30, wherein the MDCT is a low dose radiation MDCT.

Embodiment E30. The method of Embodiment E29, further comprising applying iterative reconstruction (IR) to produce images from the low dose MDCT scan.

Embodiment E31. The method of any one of Embodiments E23 to E30, wherein the airway mucus occlusion is farther than about 2 cm from a diaphragmatic pleura and/or a costal pleura in the subject.

Embodiment E32. A system, comprising:
a scanner configured to capture one or more lung images of a subject;
at least one data processor; and
at least one memory storing instructions which, when executed by the at least one data processor, result in operations comprising:
determining, based at least on the one or more lung images, a quantification of mucus plugging for the subject;
determining, based at least on the quantification of mucus plugging, a diagnosis for the subject, the diagnosis comprising a detection of an airway mucus occlusion in at least one lung segment of the subject; and identifying, based at least on the diagnosis, one or more treatments for the subject, the one or more treatments including a therapeutically effective amount of a mucolytic agent and/or a type 2 inflammation inhibitor.

Embodiment E33. The system of Embodiment E32, wherein an anticholinergic agent, a bronchodilator, and a corticosteroid are excluded from the one or more treatments.

Embodiment E34. The system of Embodiment E32, wherein the airway mucus occlusion comprises an airway mucus plug.

Embodiment E35. The system of any one of Embodiments E32 to E34, wherein the scanner is configured to perform a multidetector computed tomography (MDCT) scan of the subject.

Embodiment E36. The system of Embodiment E35, wherein the MDCT scan comprises a low dose radiation MDCT scan.

Embodiment E37. The system of Embodiment E36, wherein an iterative reconstruction (IR) is applied to produce the one or more lung images from the low dose MDCT scan.

Embodiment E38. The system of any one of Embodiments E32 to E37, wherein the airway mucus occlusion is farther than about 2 centimeters (cm) from a diaphragmatic pleura and/or a costal pleura in the subject.

Embodiment E39. The system of any of Embodiments E32 to E38, wherein the subject is a human subject.

Embodiment E40. The system of any of Embodiments E32 to E39, wherein (a) the subject has 20 lung segments, and the at least one lung segment is any one of or any combination of the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apical segment of the upper lobe of the left lung, the posterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung;

(b) the subject has 19 lung segments, and the at least one lung segment is any one of or any combination the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anterior segment of the lower lobe of the left lung, the medial segment of the lower lobe of the left lung, the lateral segment of the lower lobe of the left lung, and/or the posterior segment of the lower lobe of the left lung; or (c) the subject has 18 lung segments, and the at least one lung segment is any one of or any combination of the apical segment of the upper lobe of the right lung, the posterior segment of the upper lobe of the right lung, the anterior segment of the upper lobe of the right lung, the lateral segment of the middle lobe of the right lung, the medial segment of the middle lobe of the right lung, the superior segment of the lower lobe of the right lung, the medial segment of the lower lobe of the right lung, the anterior segment of the lower lobe of the right lung, the lateral segment of the lower lobe of the right lung, the posterior segment of the lower lobe of the right lung, the apicoposterior segment of the upper lobe of the left lung, the anterior segment of the upper lobe of the left lung, the superior lingular segment of the upper lobe of the left lung, the inferior lingular segment of the upper lobe of the left lung, the superior segment of the lower lobe of the left lung, the anteromedial segment of the lower lobe of the left lung, the lateral segment of the lower lobe of the left lung, and/or the posterior segment of the lower lobe of the left lung.

Embodiment E41. The system of Embodiment E39 or E40, wherein the at least one lung segment comprises one of 18, 19, or 20 lung segments.

Embodiment E42. The system of Embodiment E41, wherein the airway mucus occlusion is present in at least 2, 3, 4, 5, 6, 7, 8, 9, 10, 11, 12, 13, 14, 15, 16, 17, or 18 lung segments.

Embodiment E43. The system of Embodiment E42, wherein the airway mucus occlusion is present in at least 4 lung segments.

Embodiment E44. The system of any one of Embodiments E32 to E43, wherein the mucolytic agent is a thiol-based drug, a thiosaccharide, a recombinant human DNAse, hypertonic saline, ambroxol, or an airway epithelial cell ion channel modulator.

Embodiment E45. The system of Embodiment E44, wherein the thiol-based drug is n-acetylcysteine, carbocisteine, erdosteine, mecysteine, or a thiol saccharide.

Embodiment E46. The system of any of Embodiments E32 to E45, wherein the diagnosis includes that the subject is unlikely to respond, incompletely responsive, or unresponsive to treatment with an anticholinergic agent, a bronchodilator, or a corticosteroid.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

EXAMPLES

Example 1: Link Between Eosinophilia and Mucus Plugs in the Pathogenesis of Airflow Obstruction in Severe Asthma The role of mucus plugs in mechanisms of airflow obstruction in chronic severe asthma is uncertain. This example relates to a mucus plug scoring system in multi-detector computed tomography (MDCT) lung images to quantify mucus plugs in asthmatics with and without airflow obstruction. The data show that mucus plugs occur commonly in multiple bronchopulmonary segments and persist for many years, often in the same bronchopulmonary segment. Asthmatics with a high mucus score are characterized by severe airflow obstruction, marked sputum eosinophilia, and increases in sputum cell gene expression for IL-5, IL-13, and cysteine-rich MUC5AC mucin. Lavage of a bronchopulmonary segment with mucus plugs shows intense infiltration of mucus with eosinophils, and ex-vivo studies show that IL-13 activates airway epithelial cells to secrete eotaxin-3 into the apical mucus layer and that eosinophils can oxidize and cross-link cysteines. Without being bound by any scientific theory, mucus plugs are a plausible mechanism of airflow obstruction in chronic severe asthma and form as a consequence of type 2 cytokine activity that causes upregulation of MUC5AC and infiltration of airway mucus with eosinophils. It is proposed that MDCT lung images represent a biomarker of airway type 2 inflammation and mucus plugging in asthma.

Despite the prominence of mucus plugs in the pathophysiology of airflow obstruction in acute severe (fatal) asthma (Huber & Koessler. Arch Intern Med 30, 689-760 (1922); Dunnill. M. S. J Clin Pathol 13, 27-33 (1960)), the role of mucus plugs in the pathophysiology of airflow obstruction in chronic severe asthma is poorly understood. This limited understanding is a barrier to rational treatment of airflow obstruction in severe asthma, because mucus plugs represent a tractable treatment target if they can be shown to be a significant cause of obstruction.

Understanding the role of mucus plugs as a mechanism of airflow obstruction in chronic severe asthma has been held back by methodologic difficulties. To date, imaging studies have not systematically examined the airways in patients with asthma for intraluminal mucus, and studies that have documented the relationship between mucus pathology and airflow have relied on chronic cough and sputum production, a symptom complex known as chronic mucus hypersecretion (CMH) (Vestbo et al., Am J Respir Crit Care Med 153, 1530-1535 (1996); Ulrik et al., Respir Med 99, 1576-1582 (2005)). Reliance on CMH symptoms to identify patients with airway mucus plugs is problematic, because CMH symptoms are often absent in patients with chronic obstructive pulmonary disease who have pathologically proven mucus plugs (Burgel & Martin. European respiratory review: an official journal of the European Respiratory Society 19, 94-96 (2010)).

Pathology studies in small numbers of patients with non-fatal asthma reveal airway mucus plugs (Boser et al., Am J Respir Crit Care Med 172, 817-823 (2005)), but the relationship between these plugs and airflow obstruction is unclear. Blood and airway eosinophilia are strongly correlated with airflow obstruction in asthma (Fabbri et al., Am J Respir Crit Care Med 167, 418-424 (2003); Bumbacea et al., Eur Respir J 24, 122-128 (2004)), but the relationship between eosinophils and mucus plugs is unknown. In addition, it is known from in vitro studies of airway epithelial cells that interleukin 13 (IL-13) alters the expression of gel-forming mucins (MUC5AC and MUC5B) (Kuperman et al., Nat Med 8, 885-889 (2002); Lachowicz-Scroggins et al., AJRCCM In Press) and causes tethering of MUC5AC-rich mucus to airway epithelial cells (Bonser et al., J Clin Invest 126, 2367-2371 (2016)), but the role of IL-13 and MUC5AC in the pathophysiology of mucus plugs in vivo in asthma has not been studied to our knowledge.

Without being bound by any scientific theory, it was hypothesized that type 2 inflammation promotes formation of airway mucus plugs in asthma to cause airflow obstruction. To test this hypothesis, a novel scoring system was developed to quantify mucus plugs in multidetector computed tomography (MDCT) scans of the lungs. This MDCT-based scoring system was used to determine the relationship between mucus plugs and airflow obstruction, links between mucus plugs, airway eosinophilia, and the airway expression of type 2 cytokines and gel-forming mucins were explored.

Materials and Methods

Figure 5:
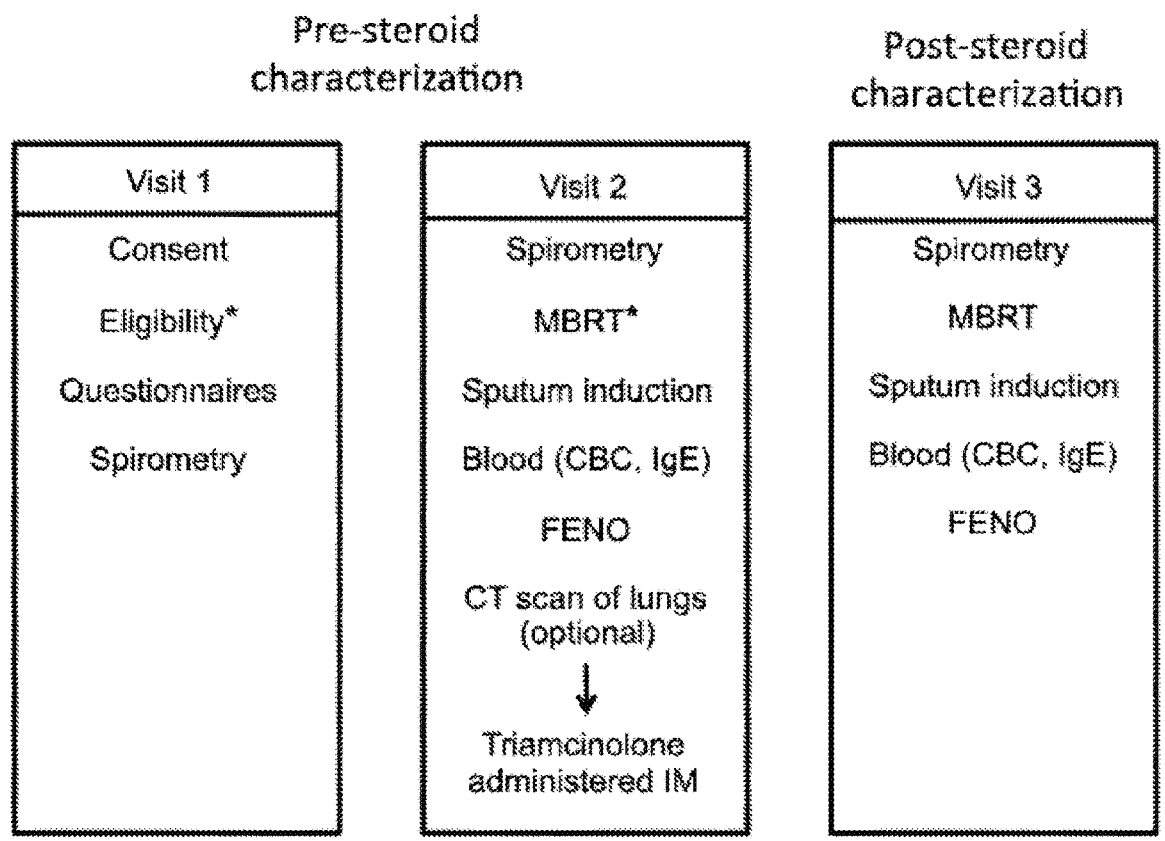
FIG. 5: Visit procedures for patient characterization at baseline in SARP. Eligibility was determined by maximum bronchodilator reversibility test (MBRT) or methacholine challenge on visit 1. If MBRT was performed more than 6 weeks before visit 2 it was repeated at visit 2. Visit 3 was 18±3 days after visit 2.

Subjects: Subjects. Adult asthma patients were recruited as part of the Severe Asthma Research Program 3 (SARP-3) cohort. The SARP-3 protocol includes three baseline visits in which asthma patients undergo detailed characterization, including sputum questionnaires, maximum bronchodilator reversibility tests, a systemic corticosteroid responsiveness test, and an optional multi-detector computed tomography (MDCT) scan of the lungs (FIG. 5). Data reported here are from patients that had MDCT scans as part of their baseline characterization. CT was not repeated after steroid injection. Healthy subjects for MDCT scans were recruited at a single center (Washington University in St Louis), and subjects for sputum cell analyses were recruited from all SARP-3 centers (Table 4). Twenty-five asthma patients who had MDCT scans as part of the SARP-3 protocol also had MDCT scans available from their participation in SARP-1 or SARP-2 protocols. These patients were enrolled at 3 sites: University of Pittsburgh. University of Wisconsin, and Washington University in St. Louis (Table 9).

Systemic Corticosteroid Responsiveness Test (SCRT): Patients were given an intramuscular injection of triamcinolone acetonide (40 mg) following complete characterization on visit 2. Repeat characterization post steroid injection (excluding MDCT), was carried out on visit 3 (2-4 weeks later) (FIG. 5).

Treatment response to bronchodilators and systemic corticosteroids: Maximum Bronchodilator Reversibility tests (MBRT's) were performed on baseline visits 2 and 3. MBRT was determined by measuring spirometry before and after 360-720 meg of albuterol sulfate delivered by metered-dose inhaler. Patients also underwent a systemic corticosteroid response test (SCRT), which involved an intramuscular injection of triamcinolone acetonide (40 mg) on visit 2 and repeat characterization including MBRT and blood draw on visit 3 (2-4 weeks later).

Computerized Tomography of the Lung: Patients underwent MDCT scans of the lungs on visit 2 following maximal bronchodilation according to a standard protocol monitored by a SARP imaging center at the University of Iowa with institutional review board approval. De-identified digital scan data, obtained at total lung capacity, were distributed to the radiologists for scoring. Evaluation for mucus was performed using a standard window width of 1200 HU and level of −600 HU in scans taken at total lung capacity (Bankier et al., Radiology 199, 831-836 (1996)). Additional details are provided herein and in Tables 1 and 2. Quantitative measures of airway wall thickness and lumen area were generated using Apollo 1.2 (VIDA diagnostics; Iowa City, IA), as described herein.

Figure 16:
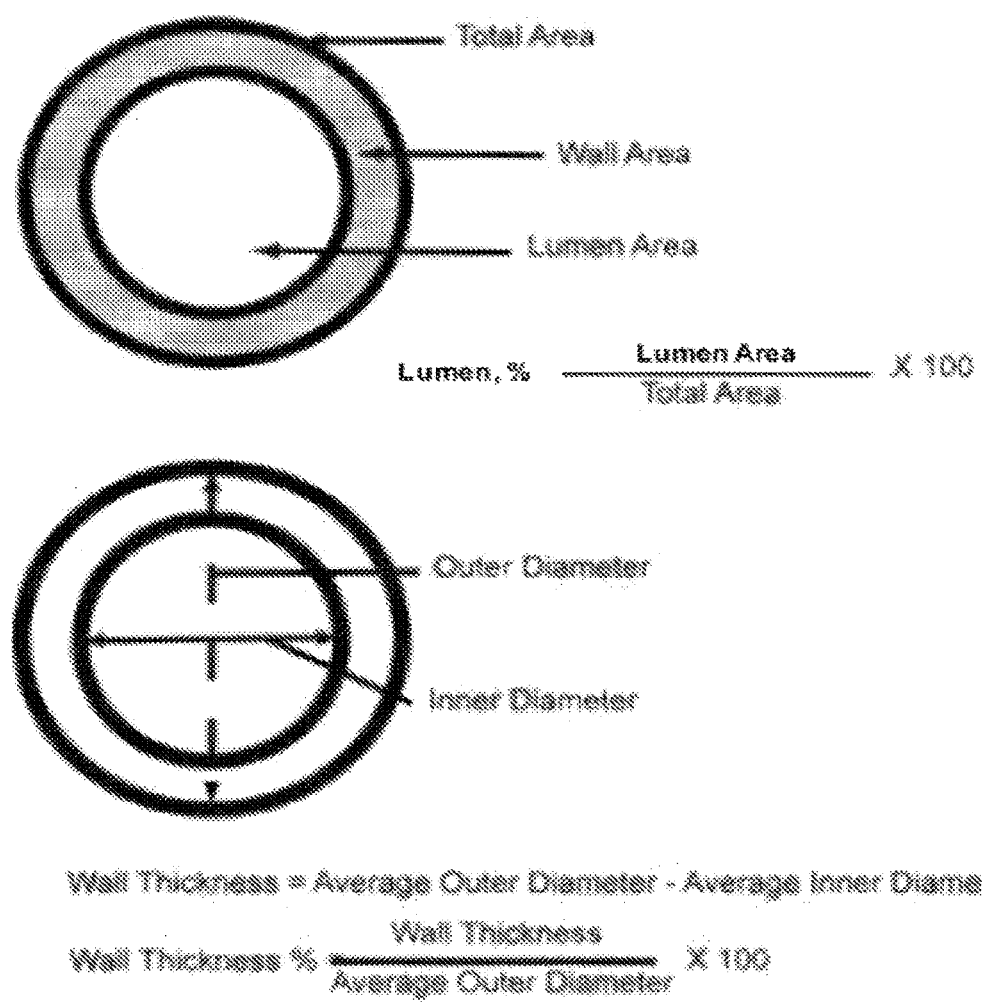
FIG. 16: Airway measures by MDCT scan. The specific MDCT scan measurements used included airway wall thickness (WT), percentage of WT (WT %), luminal area (LA) and percentage of LA (LA %).

Automated CT analysis: Quantitative airway morphology was measured from MDCT scans using automated, quantitative software that was designed to reliably label and segment the first five to six airway generations, and to allow the accurate measurement of airway walls and lumen diameters obtained perpendicular to the long axis of each airway (Apollo 1.2; VIDA Diagnostics; Iowa City, IA). Airway measurements of RB1, RB4, RB10, LB1, LB4, LB10 (4th generation) were made at each centerline voxel and were averaged over the middle third of the segment. The specific MDCT scan measurements used included airway wall thickness (WT), percentage of WT (WT %), wall area (WA), percentage of WA (WA %), luminal area (LA) and percentage of LA (LA %) (FIG. 16). The calculations are as follows: WT: average outer diameter-average inner diameter; WT %: (WT/average outer diameter)×100; WA: total area (TA)−LA; WA %: (WA/TA)×100; and LA %: (LA/TA)×100. WA %, LA % and WT % were used in analysis, as these account for differences in airway size. Airway measurements of RB1, RB4, RB10, LB1, LB4, LB10 were averaged to give a summary estimate for each patient. WT % was reported in results but all 3 measurements gave similar results.

Flexible bronchoscopy and bronchoalveolar lavage: A low-dose CT scan was performed one week before bronchoscopy and assessed jointly by both the radiologist and the bronchoscopist. One segment with a mucus plug and one segment without mucus plug were chosen for sampling. Segments with and without mucus plugs were chosen from contralateral lungs. Bronchoscopy was performed under conscious sedation. Bronchoalveolar lavage fluid (BALF) was collected first from the site with mucus, followed by the site without mucus. The bronchoscope was flushed with normal saline between plugged and non-plugged segment sampling. In processing the BALF, no straining of fluid through gauze or wire mesh was performed, in order to minimize loss of cells. Fluid was centrifuged at 450×g (10 min at 4° C.) to recover cell pellet. The cell pellet was re-suspended in 2 ml PBS and kept on ice. Total and differential cell counts were then quantified using the same methods used in sputum processing.

Apical secretion of Eotaxin-3 (CCL26): Human airway epithelial cells (AECs) were isolated from tracheas collected from cadaveric lung donors from the California Donor Network as a part of a separate study (Gordon et al., Proc Natl Acad Sci USA. 113, 8765-8770. doi: 8710.1073/pnas.1601914113. Epub 160191216 Jul. 1601914118. (2016)). Cells were expanded in 5% FCS in DMEM/F12 supplemented with a rho kinase inhibitor (Y-27632 SellekChem) to promote proliferation (Liu et al., Am J Pathol. 180, 599-607. doi: 510.1016/j.ajpath.2011.1010.1036. Epub 211 Dec. 1018. (2012)). Once cells reached 90% confluency flasks were washed and cells trypsinized with TrypLE (Gibco). Subconfluent cells were plated to submerged transwell inserts, using the modified Schlegel culture conditions previously described (Chu et al., Gene Ther. 22, 822-829. doi: 810.1038/gt.2015.1053. Epub 2015 July 1032. (2015)). Once cells reached confluence, the cultures were taken to air-liquid interface (ALI) in PnuemaCult Maintenance media (StemCell Technologies) and maintained for 21-days. At day 21, cells were treated with 10 ng/ml recombinant human IL-13 (R&D systems) in the basolateral media for 4 days. To measure eotaxins secreted at the apical surface of ALI cultures. 300 µL warmed PBS was added to the surface of the cells. Cells were washed daily and PBS washes were taken from 4 different trachea donors cultured in duplicate. The cells were allowed to rest for 30 minutes at 37° C. and PBS was removed, mixed with 1:100 HALT protease inhibitor mix (ThermoFisher) and stored −20° C. until assayed using Duoset ELISA for human CCL26 (R&D systems).

Eosinophil Isolation and stimulation of respiratory burst: Eosinophils were purified from the peripheral blood of 4 atopic asthmatic subjects (age 48±23 years). Each subject donated 100 mL of blood on one or more occasions. All subjects signed consent forms and usage was approved by the UCSF Committee on Human Research. Eosinophils were isolated from whole blood using a three-step method in which we first pelleted the cells, followed by water lysis to remove red blood cells and finally eosinophils were purified using immunomagnetic beads (Human Eosinophil Isolation kit. Miltenyi Biotec). Briefly, whole blood was collected in EDTA (purple-top) tubs and pelleted at 1500 g for 15 minutes at 4° C. The plasma on top was removed and cell pellet retained for two cycles of water lysis. Water lysis of red blood cells was scaled up based on methods previously described (Samoszuk, Am J Hematol 81, 552-553 (2006)). Isolated leucocytes were washed in PBS (Gibco) pH 7.2 containing 2 mM EDTA and 0.5% low-IgG BSA (Gemini) and passed through a 70 µm nylon filter to remove debris Cells were incubated with biotin-antibody cocktail for 10 minutes at 4° C. followed by incubation with anti-biotin microbeads for 15 additional minutes. Eosinophils were purified from labeled granulocytes by passing the solution over a separation column in a magnetic sorting field. Eosinophil purity of ≥99.8% was confirmed by cytospin and staining with Diff-Quik (ThermoFisher Scientific). Eosinophils were resuspended in Iscove's Modified Dulbecco's Medium (IMDM) (Gibco)+10% fetal calf serum (FCS) (Gibco), to adensity of 1×106 cells/mL. Eosinophils were then allowed to rest at 37° C. in non-treated 6-well plates (Corning Costar) for at least 20 min before phorbol-12-myristate-13-acetate (PMA) (Sigma) stimulation. Prior to stimulation, cells were pelleted at 300 g for 5 minutes at 4° C. and the media was fully aspirated. Cells were resuspended in 1 ml of Tyrode's salts (Sigma), pelleted again at 300 g for 5 min and the buffer was fully aspirated to remove any residual FCS. The cells were resuspended in Tyrode's salts +/−PMA as detailed below.

Cysteine cross-linking assay: To explore cystine formation generated by eosinophil stimulation, BODIPY FL L-cysteine was generated from 800 mM BODIPY FL L-Cystine (ThermoFisher Scientific) in Tyrode's Salts by reduction with one quarter volume packed TCEP-Gel (ThermoFisher Scientific) for 1 hour at 25° C. The reaction yields an 8 to 10-fold increase in fluorescence at 490 nm/520 nm Ex/Em. This reagent was diluted in 100 µl Tyrode's Salts to 4 µM with and without PMA (100 ng) in 96 well round bottom non-treated black polystyrene plates (Corning Costar). The decrease in fluorescence at 490 nm/520 nm Ex/Em was monitored over 2 hours at 37° C. on a Synergy H1 plate reader (BioTek Instruments) with the addition of 50,000 peripheral blood eosinophils in 100 µl Tyrode's Salts. The plates were sealed with optical adhesive film (Applied Biosystems) to prevent evaporation. The quenching of BODIPY fluorescence by eosinophil stimulation was shown to reverse to starting values by addition of DTT to the wells at the end of incubation, indicating that this effect was due to reformation of cystine, and not destruction or bleaching of the fluorophore.

MDCT Scoring System:

Mucus plugs: These were defined as complete occlusion of an airway lumen by mucus, with or without bronchial dilatation. When parallel to the scan plane, mucus plugs were recognized as tubular densities with or without branching. When oriented obliquely or perpendicularly to the scan plane, they were identified as oval or rounded opacities seen on sequential slices and differentiated from blood vessels by their continuity with non-impacted portions of the bronchial lumen and their position relative to adjacent blood vessels. The segments of each lobe were systematically examined for the presence or absence of mucus plugs and given a score of 1 or 0 accordingly. The segment scores of each lobe were summed to generate a total mucus score for both lungs, yielding a mucus score ranging from 0-20 (in subjects with 20 segments). Peripheral airways within 2 cm of the diaphragmatic pleura and costal pleura were excluded from evaluation as the small caliber of these peripheral airways makes occlusion by mucus difficult to ascertain. Further details about the mucus score, including its development and validation, are provided in herein and in FIGS. 7 and 8.

Bronchiectasis: Each of the five lung lobes was systematically examined for the presence or absence of bronchiectasis defined as a bronchial arterial ratio >1.5: this yielded a bronchiectasis score ranging from 0 to 5.

The CTs were independently reviewed and scored by five radiologists with sub-specialty training in thoracic radiology using the method described above. Each scan was randomly assigned to 2 of 5 radiologists for scoring. The average score of both raters was used to calculate the CT mucus score for each subject. This generated a continuous score ranging from 0 to 20 increasing in increments of 0.5.

Induced Sputum: Sputum induction was done on visits 2 and 3. For safety, induced sputum was only collected from patients whose FEV1 was >50% predicted after albuterol pretreatment (360 µg). Total and differential cell counts were quantified in a central laboratory (Wake Forest University) using methods previously described[5,6]. Gene expression for type 2 cytokines [interleukin (IL)-4, IL-5, and IL-13] and for airway gel-forming mucins (MUC5AC, MUC5B) were measured in RNA isolated from induced sputum cell pellets using real-time Taqman-based quantitative PCR (qPCR) 7 as described herein (including Table 3). RNA isolation and qPCR were done in a central laboratory (University of California at San Francisco).

Questionnaires: Questionnaires were completed by asthma patients at study entry. Chronic mucus hypersecretion was defined using the ATS/WHO definition of chronic bronchitis, which assesses chronic cough and sputum production in the preceding 2 years[8]. The specific question used was: "Have you had cough and sputum production on most days for at least 3 months a year for at least 2 consecutive years?." These questionnaires are further described herein.

Figure 7:
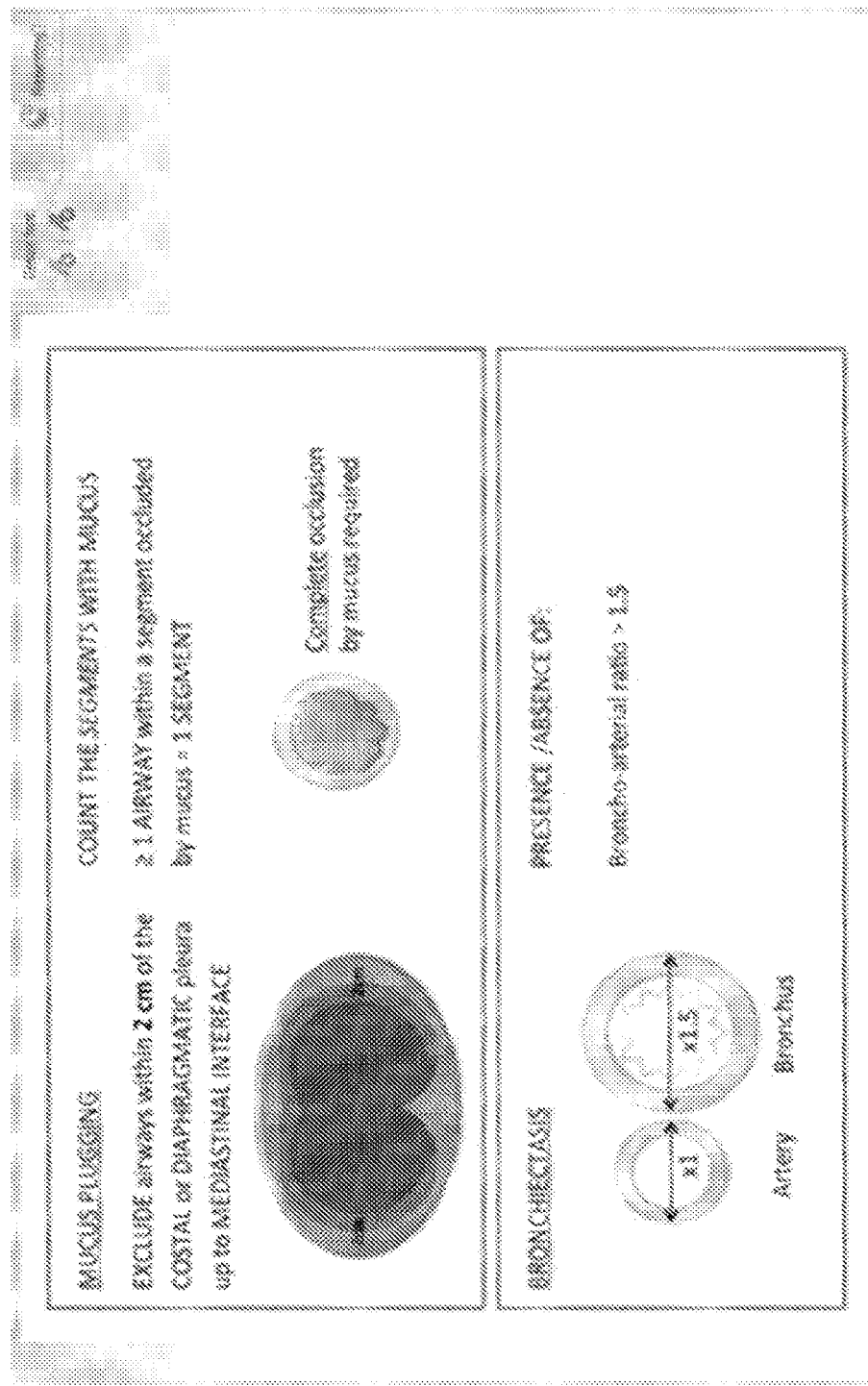
FIG. 7: Exemplary web-based data capture tool. The figure shows a screen capture of the web-based survey form. The scoring criteria are displayed at the top of the form and the radiologists entered the data into the data fields shown at the bottom of the form. The data capture shown in for the right upper lobe—additional filed were available in the tool for other lung lobes.

Statistical Analysis: Each scan was scored by two raters randomly drawn from the group of five raters and agreement between raters was estimated using the intraclass correlation coefficient (ICC) (FIG. 7). One-way random effects analysis of variance was used to calculate the ICC with subject as the random effect in the model. Within rater agreement was calculated in a random subset of 14 scans that were read twice by the same radiologists. Categorical variables are presented as frequencies with percentages and evaluated using the chi-square test. Continuous variables are presented as means±1 SD or medians with quartiles. One-way analysis of variance was used for multiple group comparison followed by a Bonferroni correction. Kruskal-Wallis one-way analysis of variance was used for non-parametric multiple group comparison. Correlation between variables was evaluated using Spearman's correlation. Multivariable analyses were calculated using linear regression models (with 95% confidence intervals) for continuous outcomes. Statistical significance was accepted for 2 sided p values of <0.05. Statistical analysis was carried out using Stata 13.1 (StataCorp College Station TX).

Study Design

SARP is a 3-year longitudinal cohort study. Asthma patients and healthy controls were recruited as part of the Severe Asthma Research Program (SARP)-3 cohort across 7 centers. The clinical centers in the network were Brigham and Women's Hospital. The University of California at San Francisco, the University of Pittsburgh. The University of Virginia, the University of Wisconsin. Wake Forrest School of Medicine, and Washington University in St Louis (with co-investigators at the University of Iowa). All centers used the same characterization procedures and all assessments adhered to standardized protocols and techniques ensuring uniformity of data and adherence to safety precautions. The protocol includes three baseline visits in which asthma patients undergo detailed characterization, including sputum questionnaires, maximum bronchodilator reversibility tests, a systemic corticosteroid responsiveness test, and an optional multi-detector computed tomography (MDCT) scan of the lungs (FIG. 5). Data reported here are from patients that had MDCT's as part of their characterization. Healthy subjects for MDCT scans were recruited at a single center (Washington University in St Louis) and for sputum cell analyses were recruited from all SARP-3 centers.

SARP Asthma Patients: 387 adult asthma patients were recruited to the Severe Asthma Research Program (SARP) from Nov. 1, 2012 to Oct. 1, 2014 by eleven clinical research centers across the United States. The SARP protocol included 2-3 baseline characterization visits in which all subjects underwent detailed characterization and provided samples of venous blood and induced sputum. In addition. 146 of the 387 subjects underwent lung multidetector computerized tomography (MDCT) of their lungs (Table 4). Among 146 asthma patients who had MDCT scans as part of the SARP-3 protocol, 25 patients also had MDCT lung scans available from their participation n SARP-1 or SARP-2 protocols. These patients were enrolled at 3 sites (University of Pittsburgh. University of Wisconsin and Washington University) and scans were performed 2-9 years prior to the SARP-3 MDCT scans (Table 9).

Inclusion criteria for SARP mandated that at least 60% of patients meet the American Thoracic Society/European Respiratory Society (ATS/ERS) definition for severe asthma[27]. This was defined as "asthma which requires treatment with either continuous or near continuous systemic corticosteroids or high-dose ICS, plus a second controller medication or systemic steroids to prevent it from becoming uncontrolled or which remains uncontrolled despite this therapy." For analysis, subjects were stratified into mild, moderate, or severe asthma, according to the criteria developed by SARP and outlined in FIG. 9.

All patients were non-smokers (<10 pack-years of tobacco use if >30 y of age: <5 pack-years if <30 y of age) and were required to have evidence of bronchial hyperresponsiveness (defined as a PC20 methacholine <16 mg/mL) or reversible airflow obstruction, as evidenced by an increase in FEV1 of ≥12% following albuterol inhalation (up to 720 µg) and/or ipratropium bromide inhalation (136 mcg).

Patients were excluded if they were pregnant or breast-feeding during the initial characterization period, had a history of premature birth (<35 weeks gestation), or had a diagnosis of any other chronic pulmonary disorder, which, in the opinion of the investigator, contributed significantly to the patient's respiratory symptoms.

Patients completed comprehensive phenotypic characterization, including a physician-directed history. Asthma Control Test, spirometry, maximum bronchodilator reversibility (see below), complete blood count with cell differential, induced sputum cell counts, serum IgE measurements, and FeNO measurement. In addition, subjects completed extensive questionnaires that characterized asthma symptoms, sputum symptoms, quality of life, medication use, and health care utilization (FIG. 5). All subjects signed informed consents approved by their local institutional review boards.

Healthy Subjects: Adult healthy subjects were recruited at Washington University in St Louis (Table 4). Inclusion criteria were as follows: non-smokers (<10 pack-years of tobacco use if >30 y of age; <5 pack-years if <30 y of age), and normal lung function (pre-bronchodilator FEV/FVC >0.70 and <12% increase in FEV1 following 4 puffs of albuterol). Subjects were excluded if they were pregnant or breastfeeding, or had a diagnosis of any lung disease.

Procedures for withholding asthma and allergy medications: Subjects were asked to hold their bronchodilator medications prior to spirometry testing. The medication holds for SARP were as follows; short-acting beta agonists—4 hours: short-acting anticholinergics—6 hours: LABA—12 hours: LAMA—24 hours; and leukotriene modifiers—24 hours.

Maximum bronchodilator reversibility test (MBRT): Subjects were asked to hold their bronchodilator medications prior to spirometry testing. Following baseline spirometry, 4 puffs of albuterol (360 mcg) were administered. Spirometry was then repeated 15 minutes later. If the change in FEV1 from the spirometry maneuver performed after 4 puffs was greater than 5%, an additional 2 puffs of albuterol (180 mcg) were then administered and spirometry was repeated again 15 minutes later. If the change in FEV1 after 6 puffs was greater than 5%, an additional 2 puffs of albuterol were administered with repeat spirometry after an additional 15 minutes. If the change was less than 5% after 4 or 6 puffs of albuterol, the procedure was stopped and the last maneuver was taken to be the highest achievable measure. No more than 8 puffs of albuterol were administered as part of the MBRT procedure. MBRT was measured on baseline visits 2 and 3 (FIG. 5).

Multi Detector Computerized Tomography (MDCT) Protocol: MDCT was performed within 2 hours following maximal bronchodilation according to a standard protocol monitored by a SARP imaging center at the University of Iowa with institutional review board approval. The same scanning protocol was used in both asthma patients and healthy controls. Before beginning the MDCT scan, patients were carefully coached using standardized breathing instructions administered by the technologist and images of the lungs at Total Lung Capacity (TLC) were obtained from a single breath-hold at full inspiration. Sections were obtained at 0.5 mm intervals and slice thickness was 0.625-0.75 mm based on scanner model. The MDCT parameters for each scanner model used are listed in Table 1. BMI (3 categories), lung volume (e.g. TLC) and scanner model were used to determine the CTDIvol and subsequently the effective mAs or mA settings appropriate for each subject (Table 1). Scanners at each center were regularly calibrated with a phantom (COPDgene® Phantom Model CCT162, The Phantom Laboratory—www.phantomlab.com/other-catphans/) and all scans were evaluated for protocol adherence by the SARP Imaging Center at the University of Iowa. De-identified image data (in standard digital format) were distributed to the radiologists for scoring. To blind the readers to the disease status of the subject, healthy subjects were given a SARP identification number and the scan date of the healthy scans were shifted forward 3 years to match the scanning period of the asthmatic scans. Evaluation for mucus was performed on scans taken at total lung capacity using a standard window width of 1200 HU and level of −600 HU (Bankier et al., Radiology 199, 831-836 (1996)).

Development, Validation, and Application of the MDCT Mucus Score

Figure 6:
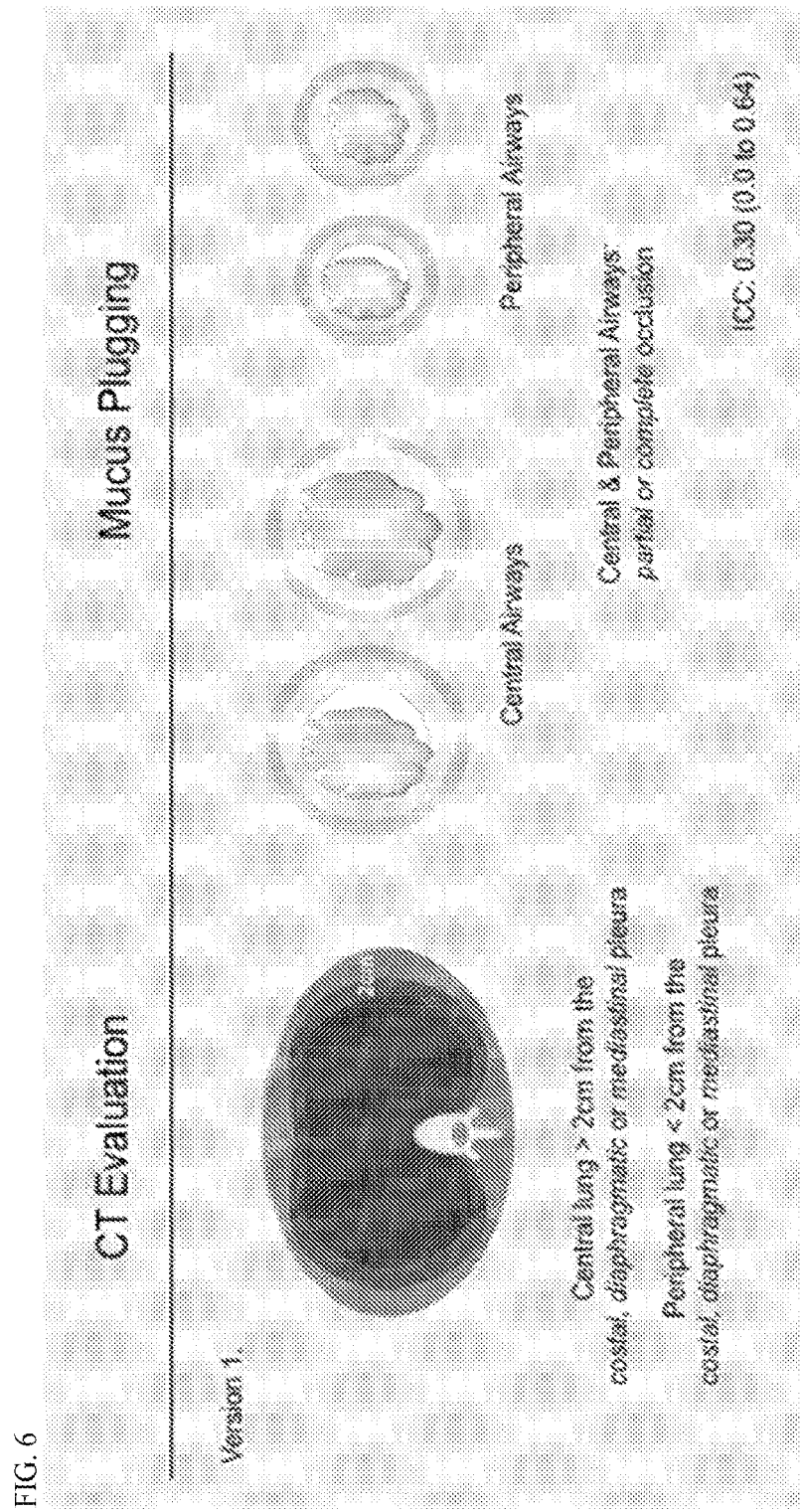
FIG. 6: Development of the CT mucus score. The CT mucus score was developed sequentially in 3 versions by consensus. Version 1 scored both the central and peripheral airways and both partial and complete airway occlusion by mucus. Version 2 excluded the peripheral lung and required partial or complete occlusion of segmental bronchi or complete occlusion of sub-segmental bronchi. Version 3 excluded the peripheral lung to the mediastinal interface and required complete occlusion of segmental and sub-segmental bronchi. Version 3 was the scoring system used in this study. ICC refers to the intraclass correlation coefficient.
Figure 6:
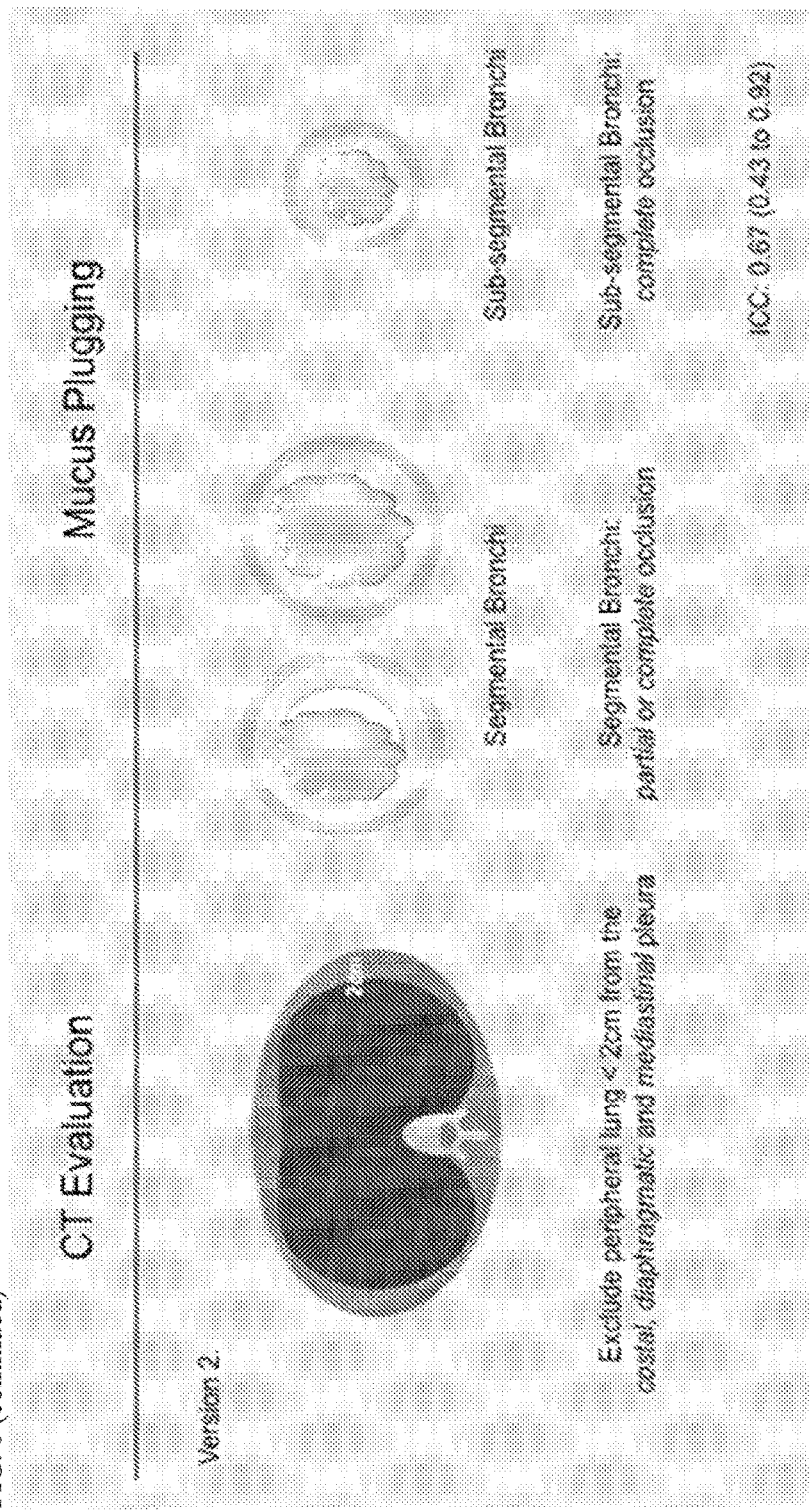
Figure 6:
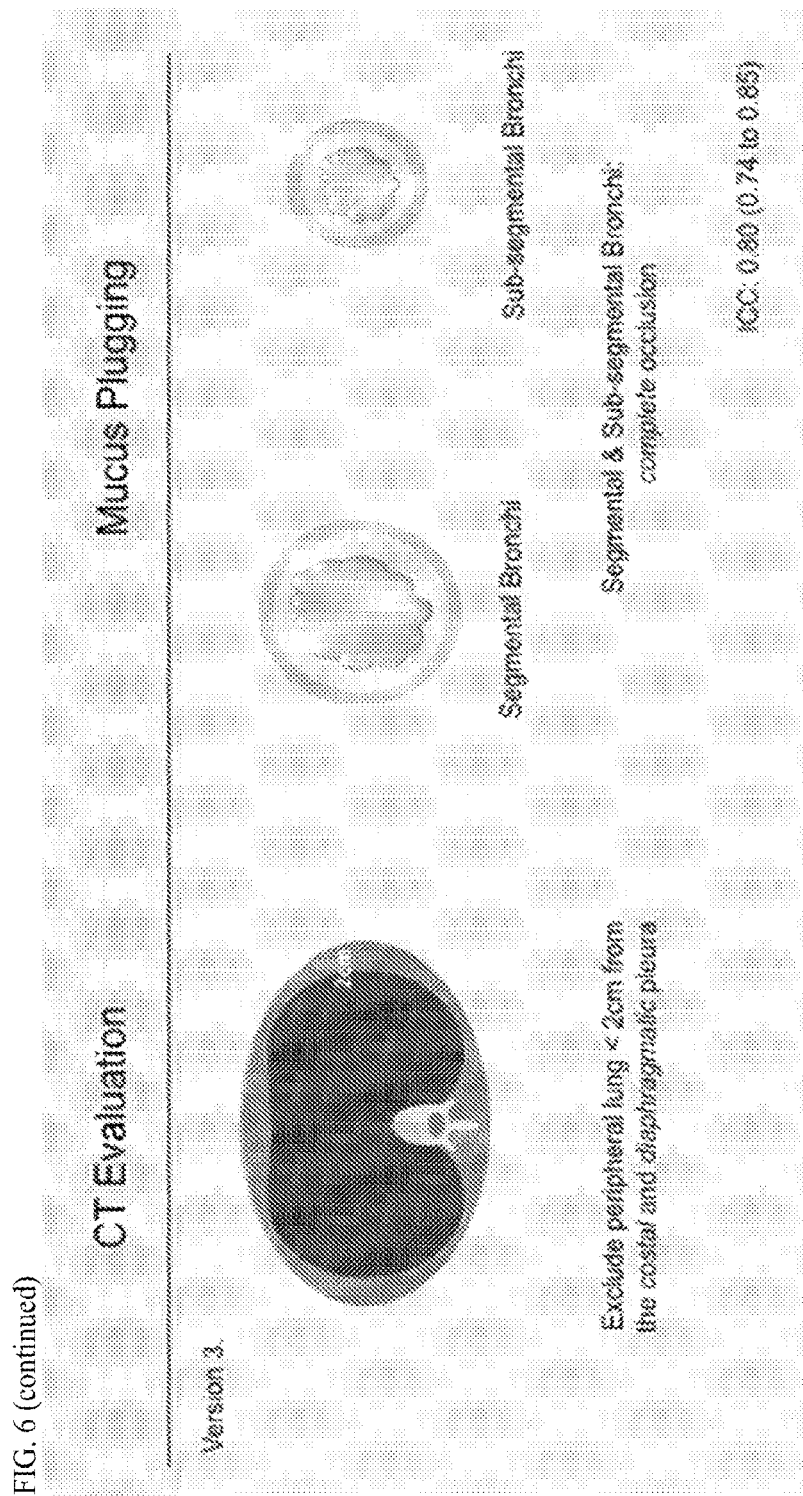

A scoring system to quantify mucus plugs in lung images generated using multi-detector computerized tomography was developed. The scoring system was based on bronchopulmonary segmental anatomy. Each bronchopulmonary segment was given a score of 1 (mucus plug present) or 0 (mucus plug absent). The segment scores of each lobe were summed to generate a total mucus score for both lungs, yielding a mucus score ranging from 0-20 (in subjects having 20 segments). The score was initially tested and refined using 10 scans from severe asthmatics recruited at UCSF for SARP. The initial version of the score (Version 1) was modified twice to yield the final version (Version 3) as shown in FIG. 6 and further explained below.

Version 1: The initial mucus score counted mucus plugs in both central and peripheral lung regions and defined a mucus plug as either partial or complete occlusion of an airway by mucus. Peripheral lung was defined as the portion of lung within 2 cm of the mediastinal, costal or diaphragmatic pleura. The Intra-class Correlation Coefficient (ICC) for agreement between 5 radiologists independently scoring 10 scans was 0.3 (95% CI 0.0 to 0.64). This ICC data was reviewed by the mucus score team, and the relatively poor inter-rater agreement was judged to result from inconsistent reads arising from two factors; (i) scoring mucus plugs in the outer 2 cm of the lungs where airways are small and mucus plugs can be hard to identify reliably and consistently: (ii) inconsistency among radiologists in scoring mucus plugs in airways partially occluded by mucus.

Version 2: This version was revised by consensus in two ways (see FIG. 6):
Mucus plugs were not evaluated in airways in the outer 2 cm of the lungs.
Mucus plugs were defined as complete or partial occlusion of a segmental bronchus or complete occlusion of a sub-segmental bronchus.

The revised score was applied to the 10 scans by 5 radiologists and the Intra-class Correlation Coefficient (ICC) for agreement between the 5 raters was 0.67 (95% CI 0.43 to 0.92). This data was reviewed and discussed by the mucus score team. Based on this review and discussion, additional modifications were suggested for a version 3 mucus score (below).

Version 3: This version was revised by consensus in three ways (See FIG. 6):
Mucus plugs were defined as complete occlusion of a bronchus, irrespective of generation.
Mucus plugs were defined as complete occlusion of a bronchus, irrespective of generation. When parallel to the scan plane, mucus plugs were recognized as tubular densities with or without branching. When oriented obliquely or perpendicularly to the scan plane, they were identified as oval or rounded opacities seen on sequential slices and differentiated from blood vessels by their continuity with non-impacted portions of the bronchial lumen and their position relative to adjacent blood vessels.

The 2 cm peripheral exclusion zone was confined to the costal and diaphragmatic pleura so as not to exclude the larger airways adjacent to the mediastinum.

A 2 cm peripheral exclusion zone confined to the costal and diaphragmatic pleura was excluded from evaluation as the small caliber of these peripheral airways makes occlusion by mucus difficult to ascertain. The 2 cm peripheral zone adjacent to the mediastinal pleura was not excluded from evaluation owing to the larger airways adjacent to the mediastinum.

Use of a standard window width of 1200 HU and level-600 HU for bronchial wall evaluation.

Version 3 of the mucus score was agreed as the final version to be used in the study (See FIG. 6), and it was implemented as described below.

Application and Validation of the CT Mucus Score:

Before application of the scoring system to the SARP cohort, a teleconference was held which included a slide presentation with detailed description of the final scoring system followed by a 1-hour consensus reading session using a training-set of 3 CT scans. Five radiologists with sub-specialty training in thoracic radiology scored the MDCT's. To generate the mucus score, two radiologists were randomly assigned to independently score each scan. Each radiologist was provided with their individual set of scans in digital format. The radiologists entered the mucus score data in real-time into a secure online survey (Research Electronic Data Capture) (FIG. 17). The average score of both raters was used to calculate the CT mucus score for each subject. This generated a continuous score ranging from 0 to 20 increasing in increments of 0.5. The validity of the mucus score was tested by analyzing for inter-rater bias followed by inter-rater and intra-rater agreement. Bias between raters, where one rater consistently over- or under-scores relative to the other rater, was tested using paired analyses. No significant bias and was found between any of the pairs of raters (p>0.05). Once absence of bias was confirmed, inter-rater agreement of the CT mucus score could be assessed by intraclass correlation coefficient (ICC). An initial check of inter-rater agreement was made after half of the scans were scored, with a plan to recalibrate any rater(s) with outlying scores to the group mean. The ICC at interim analysis was 0.69 and retraining was provided in one instance. At the end of the study, the ICC for agreement between readers was 0.80 (95% CI 0.74 to 0.85) for all 171 scans and 0.79 (95% CI 0.72 to 0.85) for the 146 asthma scans alone. In addition, the intra-rater agreement for a random subset of 14 scans (3 healthy, 11 asthma) that was scored twice by each of the five radiologists was 0.99 (95% CI 0.99 to 1.00).

The mucus score for any one patient was the average of the mucus scores from two readers (raters). To generate the score, each scan was randomly assigned to 2 of 5 raters, and each rater was provided with their individual set of 58 scans in digital format. The raters entered the mucus score data in real-time into a secure online survey (Research Electronic Data Capture) (FIG. 7).

Inter-rater reliability was assessed after half of the scans were scored with a plan to recalibrate any rater(s) with outlying scores to the group mean. Inter-rater agreement at interim analysis was 0.69 and retraining was provided in one instance. Ultimately, the ICC for intra-rater agreement for all 176 asthma scans was 0.80 (95% CI 0.74 to 0.85) (FIG. 6). In addition, the inter-rater agreement for a random subset of 14 scans (3 healthy, 11 asthma) that was scored twice by each of the five radiologists was 0.99 (95% CI 0.99 to 1.00).

Induced Sputum: Sputum induction was performed on visits 2 and 3 (FIG. 5). For safety, induced sputum was only performed in patients with an FEV1 was >50% predicted after albuterol pretreatment (360 μg). Induced sputum was processed and analyzed in two SARP centers. The Wake Forest University center generated the sputum cell differential counts for SARP, and the University of California at San Francisco center extracted the RNA and measured gene expression for IL-4, IL-5, IL-13, MUC5AC, MUC5B and housekeeping genes for SARP.

Total and differential cell counts were quantified in SARP subjects using methods previously described[28, 29]. Gene expression of IL-4, IL-5, IL-13, MUC5AC and MUC5B was measured from RNA isolated from induced sputum cell pellets from 77 asthma subjects using previously described methods of real-time Taqman-based quantitative PCR (qPCR) 30). The details of the specific design of the primers and probes are shown in Table 3.

Sputum Quality Systems:

Cell counts: Sputum samples were deemed of sufficient quality if squamous cell count was <80%.

qPCR: Only sputum samples with adequate cell counts were analyzed for qPCR. RNA quality was measured with the Agilent 2100 bioanalyzer (Biogen. Weston. Mass), which performs electrophoretic separations according to molecular weight. The RNA integrity number (RIN) was measured for each samples[31,32] and only samples whose RIN value was >5 were considered adequate for gene expression profiling[30].

Sputum and Cough Questions: Three questions were included in questionnaires that were completed by asthma patients at study entry. These three questions were:

Question 1 (chronic bronchitis): Chronic bronchitis was defined using the ATS/WHO definition, which assesses chronic cough and sputum production in the preceding 2 years 32. The specific question used was: "Have you had cough and sputum production on most days for at least 3 months a year for at least 2 consecutive years". The answer options were: Yes, No, or Don't Know. The subjects that answered "Don't know" were recoded as "no".

Question 2 (Phlegm): The specific question used was: "How often do you cough up phlegm from your chest?" The answer options were: Never, Daily, Weekly, or Monthly. The data was analyzed as a dichotomous variable and was therefore recoded into "no history of sputum expectoration"="Never" and "history of sputum expectoration"="Daily. Weekly or Monthly".

Question 3 (cough): The specific question used was: "How often do you have a non-productive cough (coughing without bringing up phlegm)?" The answer options were: Never, Daily, Weekly, or Monthly. The data was analyzed as a dichotomous variable and was therefore recoded into "no history of non-productive cough"="Never" and "history of non-productive cough"="Daily. Weekly or Monthly".

Some patients did not have data for the sputum and cough questions, for the following reasons: Initially, the chronic bronchitis and phlegm questions were sub-questions of another question "Have you ever had bronchitis?" Patients who answered "no" to this question were directed to skip the chronic bronchitis and phlegm questions. This skip logic was removed in October 2013, and these became independent questions going forward. For this reason data for "chronic bronchitis" and "phlegm" is missing in 25 patients (17.1%). The question about "cough" was added in October 2013, and this late addition to the protocol meant that there is missing data in 64 patients (43.8%).

Asthma Control Test (ACT): This is a validated self-administered tool for identifying poorly controlled asthma[33, 34]. ACT assesses the frequency of shortness of breath and general asthma symptoms, use of rescue medications, the effect of asthma on daily functioning, and overall self-assessment of asthma control in the previous 4 weeks rated using a 5-point scale. The score ranges from 5 (poor control) to 25 (complete control of asthma. An ACT <20 indicates poor control.

Bronchoscopy: A low dose CT scan was performed a week before the scheduled bronchoscopy and assessed by a radiologist, trained in the mucus score, for presence and absence of mucus plugging. One segment with a mucus plug and one segment without mucus plug were chosen to be sampled.

1) Collection of BAL: BAL was collected first from the site with mucus, followed by the site without mucus. The technique used involved wedging the flexible bronchoscope into the chosen sub-segmental bronchus, instilling sterile saline solution, and retrieving as much fluid as possible back through the channel using suction. Fluid was instilled using hand pressure on a syringe, and the fluid will be recovered into the same syringe using hand suction. BAL consisted of 100 mL total instillate, split into two 50 mL aliquots. The standard technique was instillation and recovery of 1 aliquot, followed by instillation and recovery of the second. The return from these syringes was pooled. The bronchoscope was flushed with normal saline between segments.

2) Processing of BAL: No straining of fluid through gauze or wire mesh was performed, in order to minimize loss of cells. Fluid was centrifuged at 450×g (10 min at 4° C.) to recover cell pellet. The cell pellet was re-suspended in 2 ml PBS and kept on ice. Total and differential cell counts were then quantified using the same methods used in sputum processing.

Results
Human Subjects

MDCT scans of 146 adults with asthma and 22 healthy controls in the NHLBI Severe Asthma Research Program (SARP) were analyzed (Table 4). Among the 146 patients with asthma, 68.5% qualified as severe using ATS/ERS criteria (Chung et al., Eur Respir J 43, 343-373 (2014)), and the pre-bronchodilator FEV1 was less than 80% predicted in 85 patients (58%) and less than 60% predicted in 35 patients (24%) (Table 14).

Figure 1D:
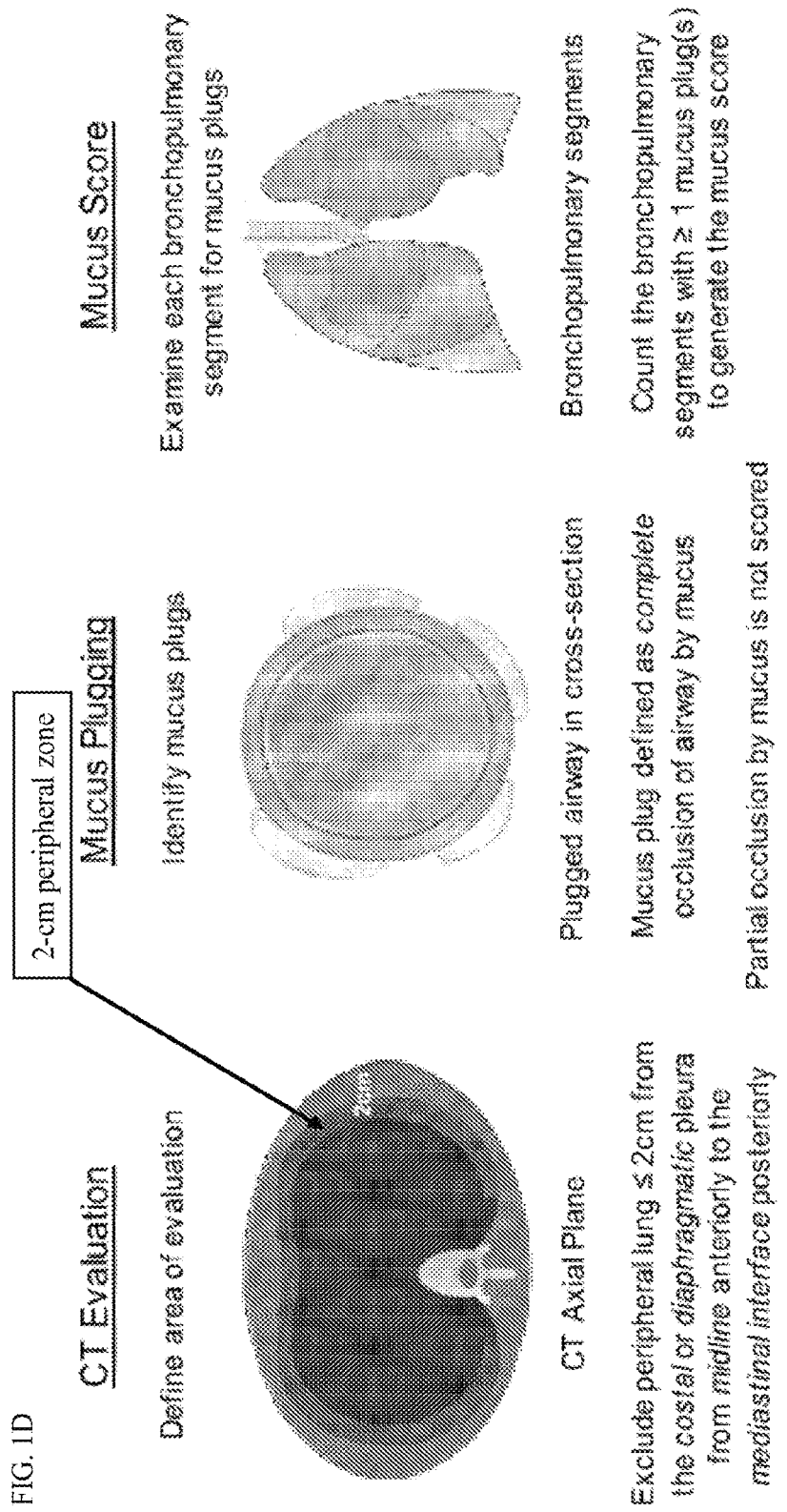
Figure 1E:
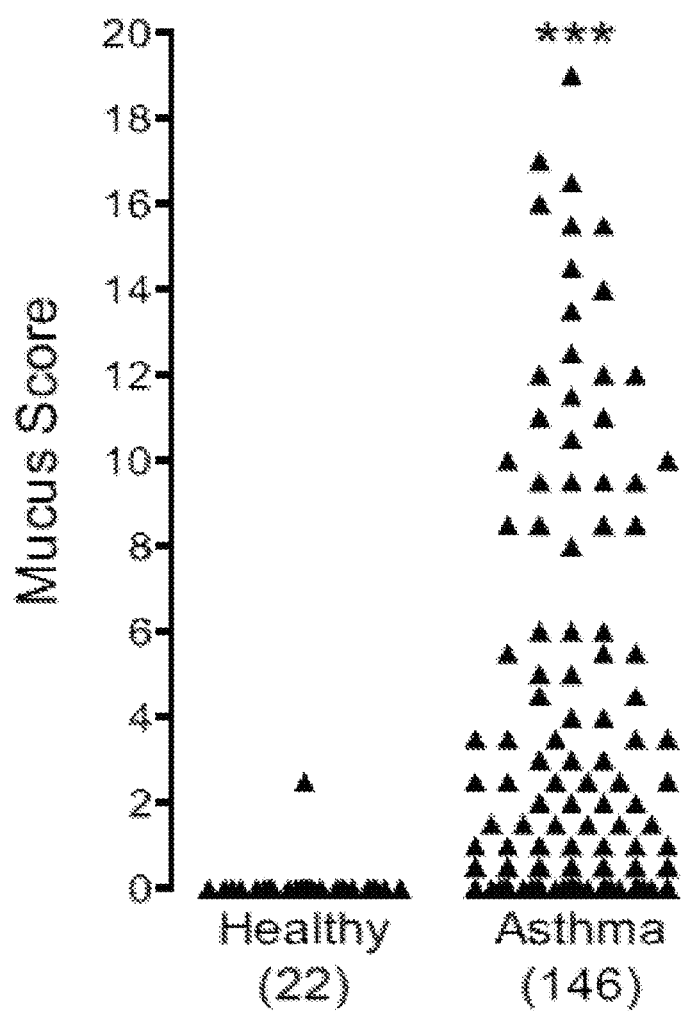
Figure 1F:
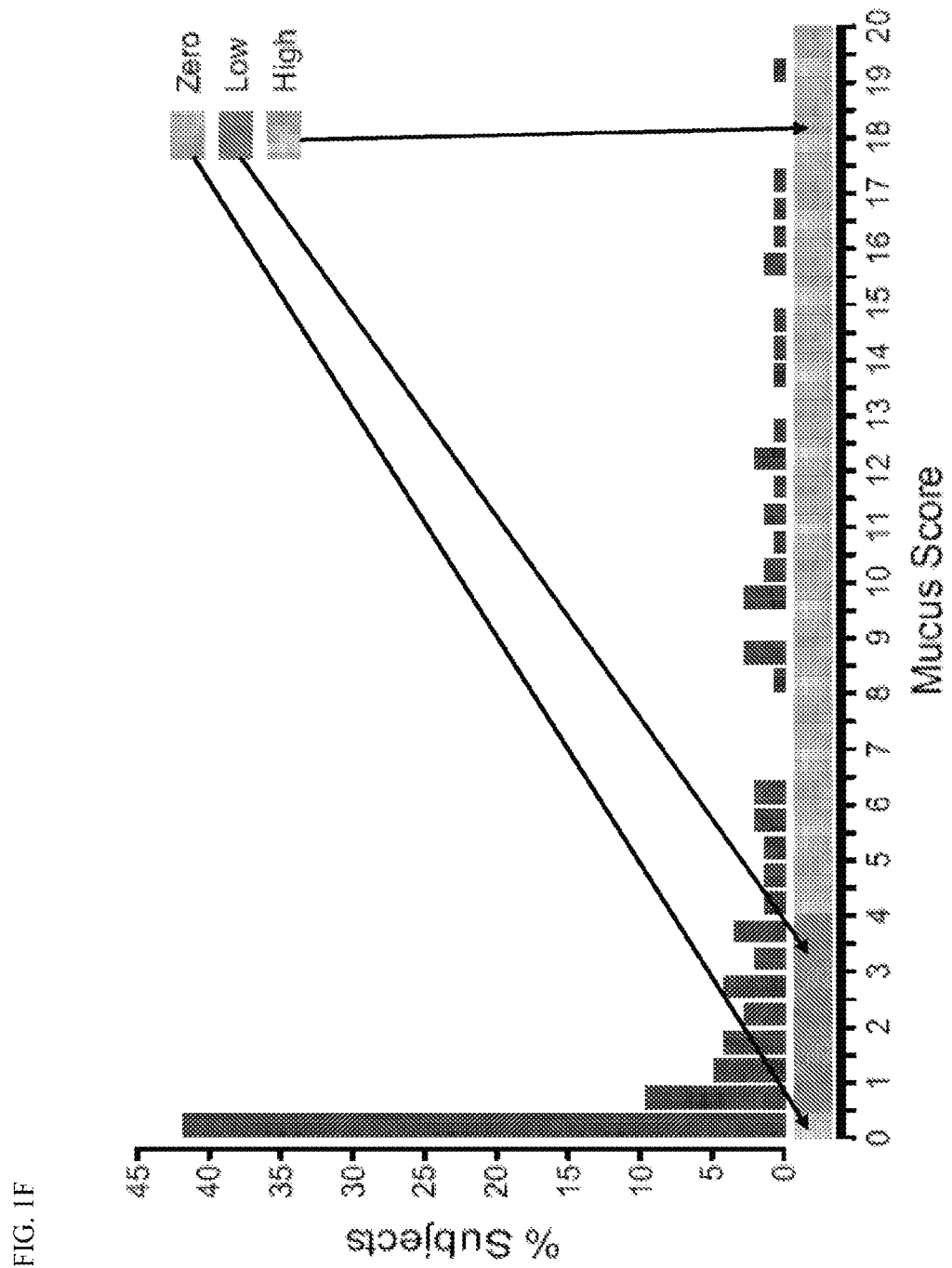
Figures 8A, 8B:
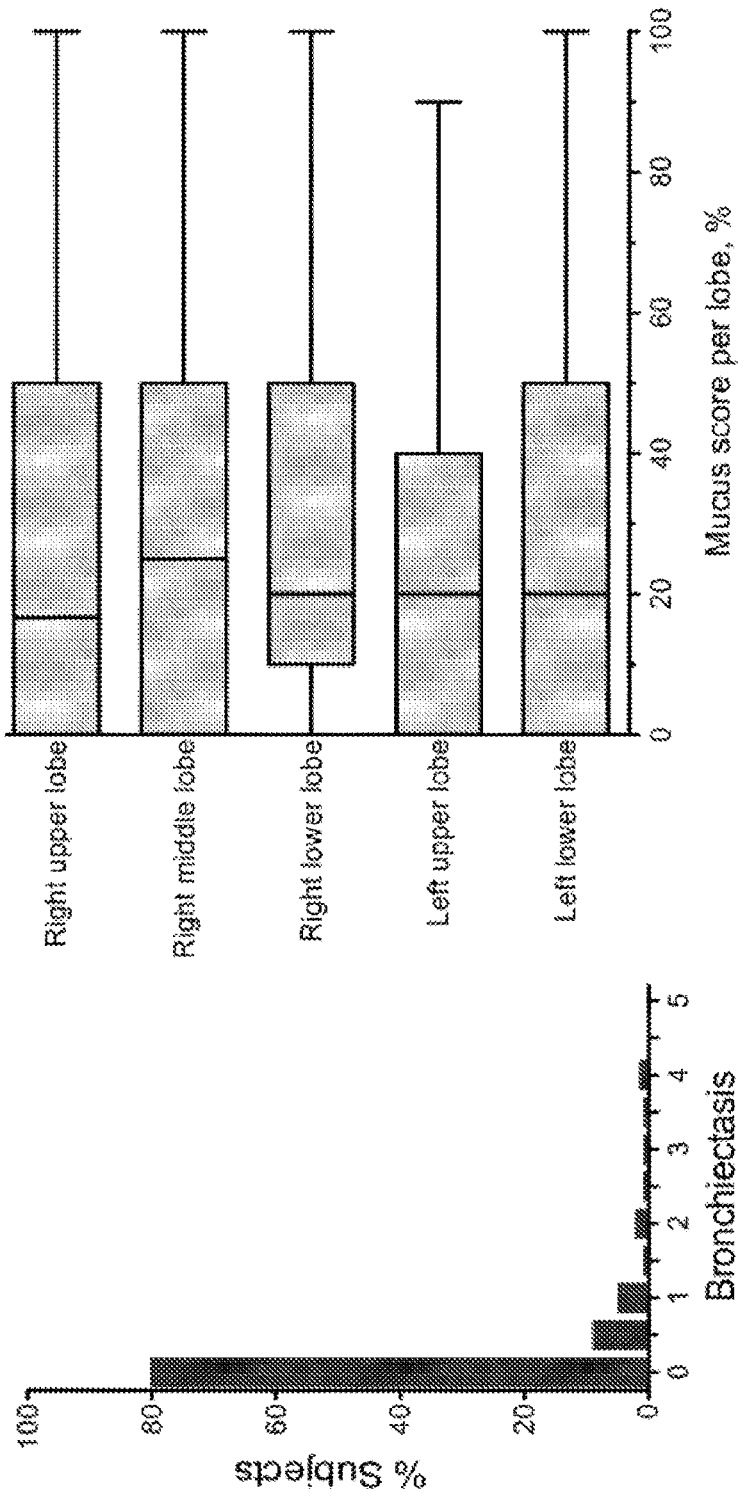
FIGS. 8A and 8B: Bronchiectasis and Mucus Score on CT.

Airway Mucus Plugs can be Identified and Quantified Using Multidetector Computed Tomography Imaging of the Lungs In preliminary studies, it was discovered that mucus plugs could be discerned in the lungs of asthmatics using MDCT scans. Specifically, mucus plugs could be identified as areas of opacification within the airway lumen, contiguous with patent airway lumen across sequential CT slices. These opacities were less radiodense than adjacent blood vessels, and occlusion of the lumen by these opacities could be partial or complete. These mucus plugs were predominantly seen in sub-segmental airways, appearing as focal or branching opacities (FIGS. 1A, 1B, and IC) and usually occurred in the absence of bronchial dilatation. Based on these findings, a visual scoring system was developed to formally quantify mucus plugs in MDCT scans (FIG. 1D). Mucus plugs were defined as complete occlusion of a bronchus, irrespective of generation or size. When parallel to the scan plane, mucus plugs were recognized as tubular densities with or without branching. When oriented obliquely or perpendicularly to the scan plane, they were identified as oval or rounded opacities seen on sequential slices and differentiated from blood vessels by their continuity with patent portions of the bronchial lumen and their position relative to adjacent blood vessels. The segments of each lobe were systematically examined for the presence or absence of mucus plugs and given a score of 1 or 0 accordingly. The segment scores of each lobe were summed to generate a total mucus score for both lungs, yielding an aggregate score ranging from 0-20. Peripheral airways within 2 cm of the diaphragmatic pleura and costal pleura were excluded from evaluation as the small caliber of these peripheral airways makes occlusion by mucus difficult to ascertain. Each of the five lung lobes was also systematically examined for the presence or absence of bronchiectasis, defined as broncho-arterial ratio >1.5. Five radiologists with sub-specialty training in thoracic radiology reviewed the MDCT scans. Two radiologists were randomly assigned to score each scan, and the scores of both raters were averaged to generate the CT mucus score of each subject. This approach generated scores ranging from 0 to 20 in increments of 0.5. In this way, mucus plugging was found to be present in at least one of 20 lung segments in 58% (85/146) of asthmatics and in only 4.5% (1/22) of healthy controls (FIG. 1E). Only 20% of the asthmatics had bronchiectasis (Table 14 and FIG. 8A). The proportion of segments with mucus plugs did not differ by lobe (FIG. 8B). The intra-class correlation coefficient for between-rater mucus score agreement was 0.80 (95% CI 0.74 to 0.85) for all 168 scans. In addition, the within-rater mucus score agreement for a random subset of 14 scans (3 healthy, 11 asthma) that was scored twice by each of the five radiologists was 0.99 (95% CI 0.99 to 1.00). Among asthmatics, the median value of the mucus score in the "mucus present" group was 3.5, and we used this value to divide the asthmatics into three mucus subgroups based on mucus score. Asthmatics with a mucus score of 0 were assigned to the zero-mucus group, while those with mucus scores between 0.5 and 3.5, and 4 and 20, were assigned to the low- and high-mucus groups, respectively (FIG. 1F).

Figure 1G:
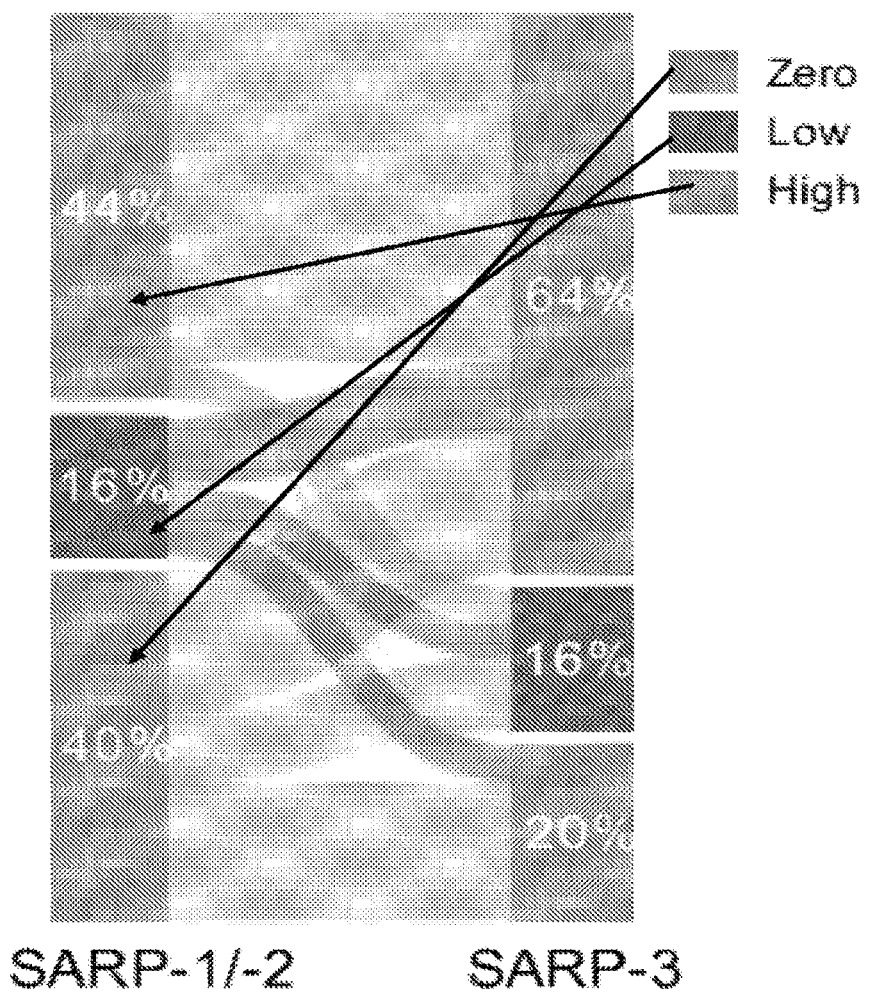
Figure 1I:
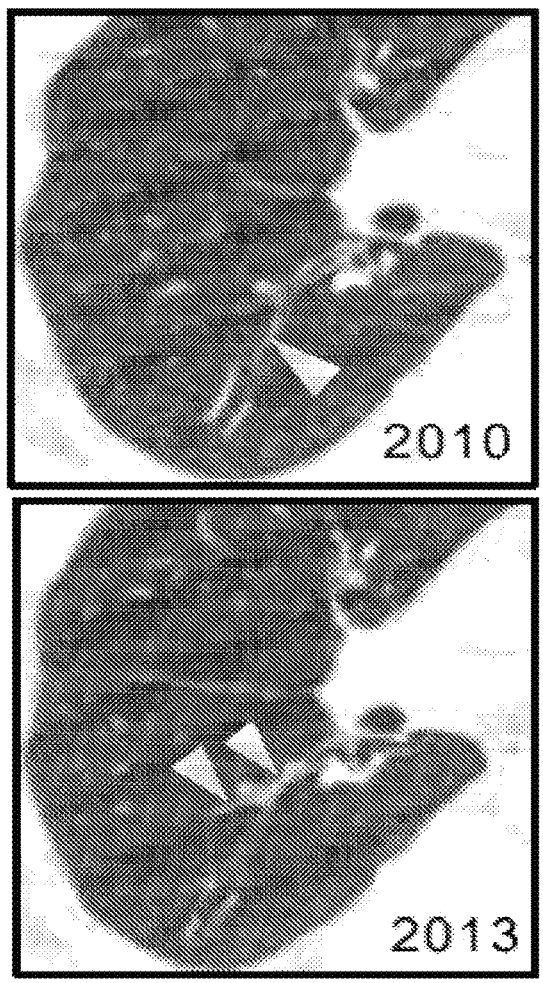
Figure 13:
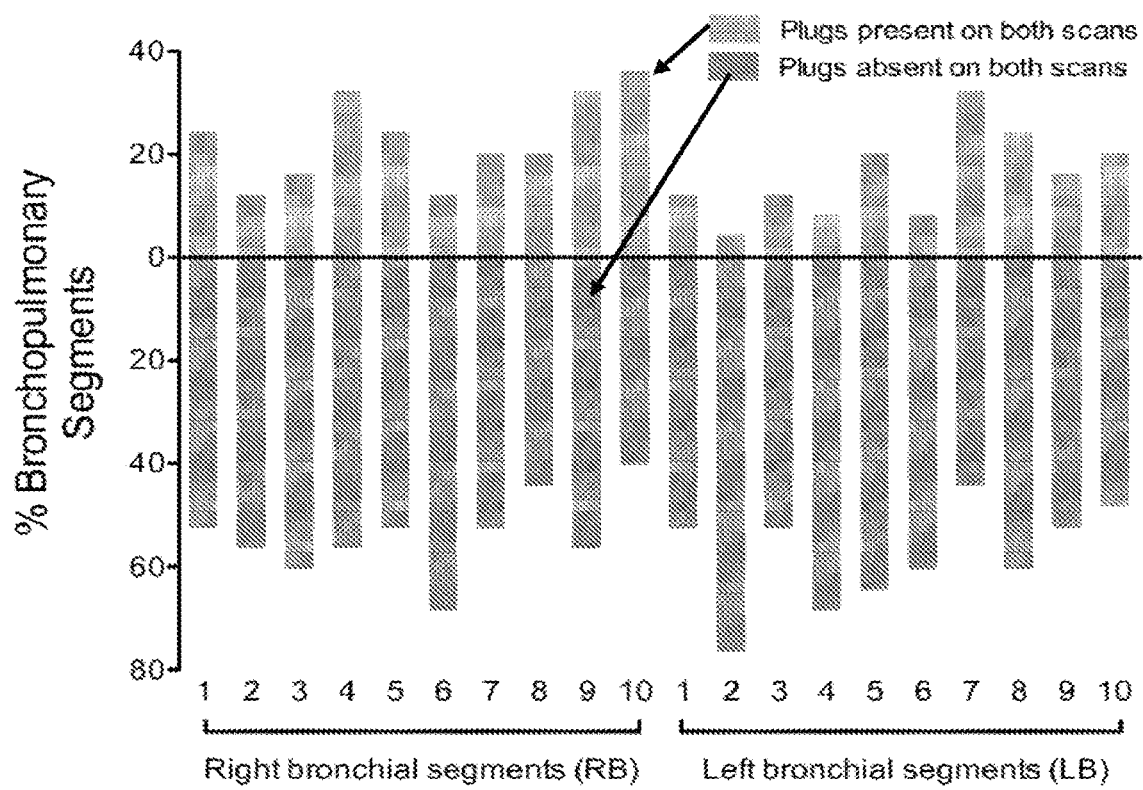
FIG. 13: Persistence of mucus phenotype by bronchopulmonary segment. Persistent presence or absence of mucus plugs from first to second scan, while very variable, were seen with similar frequency across all bronchopulmonary segments. There was no apical or basal pattern of involvement.

Twenty-five asthmatic subjects in SARP-3 also had HRCT scans performed previously as part of SARP-1 or SARP-2 (Table 9). These SARP-1 and SARP-2 scans were obtained 2-9 years prior to the SARP-3 MDCT scans. Two radiologists at the University of Wisconsin. Madison center read the 50 scans together to identify and score the mucus plugs. In a score-based analysis, a comparison was performed between mucus scores assigned to the first and second scans: mucus scores were unchanged in 7 patients (28%), increased in 10 patients (40%), and decreased in 8 patients (32%) over an average of 5.2 years (SD 2.5). 90% of subjects with a high mucus score (=4) on the first scan had a high score on the second scan (FIG. 1G). In a segment-based analysis, individual lung segments in the first and second scans were compared. Remarkably. 65% of lung segments that had a mucus plug on the first scan had a mucus plug in the same segment on the second scan. It was also found that 80% of lung segments with no mucus plug on the first scan had no mucus plug in the same segment on the second scan. (FIGS. 1H and 1I). Persistent presence or absence of mucus plugs from first to second scan were seen with similar frequency across all bronchopulmonary segments (FIG. 13).

Airway Mucus Plugs Strongly Associate with Measures of Airflow Obstruction in Asthma To test the hypothesis that mucus plugs in the airway cause airflow obstruction, the relationship between the mucus score and spirometric measures of airflow obstruction in the asthma subgroup was examined. It was found that the CT mucus scores in asthmatics were strongly and inversely correlated with pre-bronchodilator measures of FEV1% predicted (Spearman's rho=−0.52, p<0.001). FVC % predicted (Spearman's rho=−0.33, p<0.001), and FEV1/FVC predicted (Spearman's rho=−0.53, p<0.001). These associations remained significant after controlling for age, gender, and measures of airway wall thickness in regression analyses (Table 10). It was noted that the mean FEV1 was 26% lower in the high-mucus subgroup than the zero-mucus subgroup (Table 14 and FIG. 4B). Furthermore, 65.7% of patients with a pre-bronchodilator FEV1<60% predicted had a high mucus score compared to 24% of patients with FEV1 60-80% predicted and 8.2% of patients with FEV1 >80% predicted (FIG. 4E). Notably, 88% of the high mucus score subgroup had FEV1 values <80% predicted, whereas only 38% of the zero-mucus group had FEV1 values <80% predicted FIG. 4F). In addition, it was also explored if the strong association between MDCT mucus scores and FEV1 is reflected in other asthma outcomes. It was found that asthma medication requirements. Asthma Control Test (ACT) and ATS/ERS criteria for severe asthma were worse in the high-mucus group than in the zero-mucus group (Table 14). Notably, only two patients in the cohort met criteria for a diagnosis of allergic bronchopulmonary aspergillosis (ABPA) (Agarwal et al., Clin Exp Allergy 43, 850-873 (2013)), and both had mucus scores in the low (0.5-3.5) range (Table 11). Sensitivity to other molds and aeroallergens did not differ significantly among mucus groups (Table 5).

Influence of Airway Mucus Plugs on Treatment Responses to Beta Adrenergic Agonists and Systemic Corticosteroids.

To explore how airway mucus plugs may influence treatment responses to beta adrenergic agonists and systemic corticosteroids, data for maximum bronchodilator reversibility testing (MBRT) after treatment with inhaled albuterol (540-720 mcg) in the study cohort was first examined. It was found that the mean post-bronchodilator FEV1 in the high mucus group was 24% lower than in the zero-mucus group (Table 14 and FIG. 4B). Furthermore, 71% of patients with a post-bronchodilator FEV1 <60% predicted had a high mucus score compared to 40% of patients with FEV1 60-80% predicted and 12% of patients with FEV1 >80% predicted (FIG. 4E). Remarkably. 73% of patients with a high mucus score had residual abnormalities in FEV1 (FEV1 <80% predicted) following maximum bronchodilator testing, whereas only 20% of patients with a zero-mucus score had residual FEV1 abnormalities after maximum bronchodilation testing (FIG. 4F).

Figure 14:
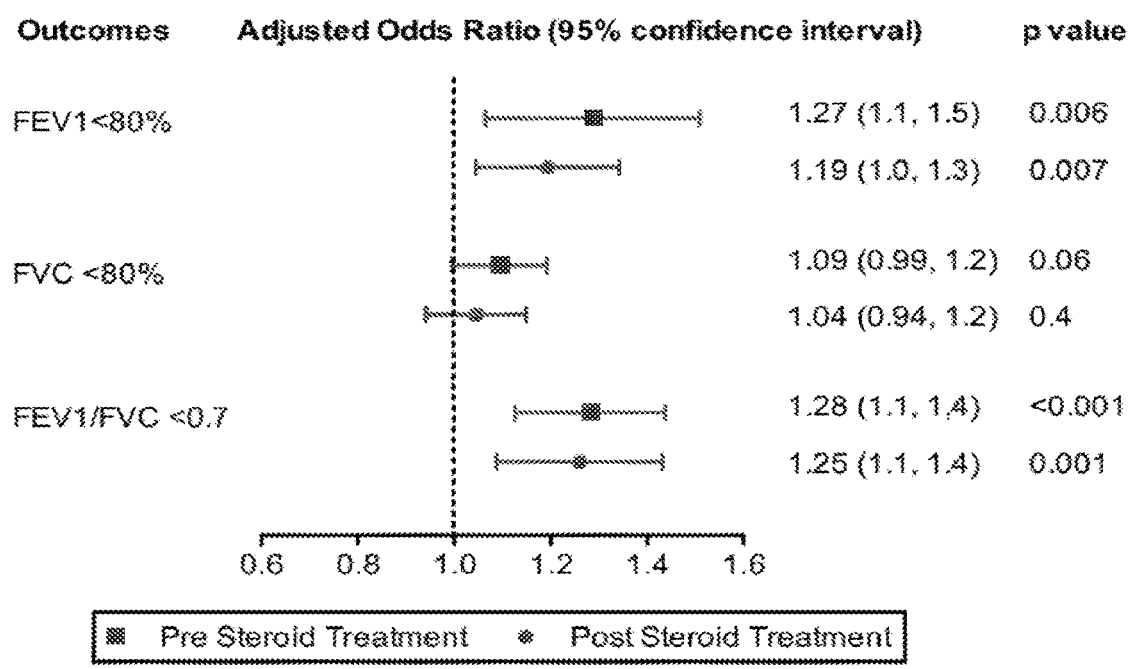
FIG. 14: Logistic regression of the effects of mucus score on lung function. Logistic regression of the effects of mucus score on lung function outcomes in asthma. Adjusted odds ratio for effects of mucus score (ranging 0-20) on lung function before and after triamcinolone therapy. The logistic models were adjusted for age, gender, and wall thickness.

Next, data was examined for systemic corticosteroid responsiveness testing (SCRT) with intramuscular triamcinolone acetonide (40 mg) in the study cohort. It was found that the mean post steroid FEV1 was 21% lower in the high-mucus group than the zero-mucus group (Table 14 and FIG. 4B). Furthermore, 58% of patients with a post-steroid FEV1 <60% predicted had high mucus scores compared to 27% of patients with FEV1 60-80% predicted and 14% of patients with FEV1 >80% predicted (FIG. 4E). Notably, 72% of patients with high mucus scores had residual abnormalities in FEV1 following the SCRT, whereas only 28% of patients with zero mucus scores had residual FEV1 abnormalities (FIG. 4F). The CT mucus score was an independent predictor of residual abnormalities in FEV1 after systemic corticosteroids in regression models (FIG. 14). Finally, when bronchodilator reversibility testing was repeated after intramuscular triamcinolone acetonide treatment in the study cohort, the FEV1 remained below 80% in half of the patients with high mucus scores (FIG. 4F).

Symptoms of Chronic Mucus Hypersecretion are Neither Sensitive Nor Specific for Mucus Plugs To determine whether asthmatics could have mucus plugs without CMH symptoms, the frequency of symptoms of CMH in the three mucus plug subgroups was examined. Among 121 patients who completed the cough and sputum questionnaire, 41 (34%) satisfied World Health Organization criteria for chronic mucus hypersecretion (CMH) (cough and sputum production on most days for at least 3 months a year for at least 2 consecutive years) (American Thoracic Society. Am Rev Respir Dis 85, 762-768 (1962)). It was found that 16 (40%) of patients in the high-mucus group did not have symptoms of CMH (Table 14). Conversely, it was found that 18 (30%) of the patients in the zero-mucus group had symptoms of CMH. Although the subgroup of patients with CMH did not have higher mucus scores than patients without CMH, the patients with CMH were characterized by other clinical differences, such as older age, higher BMI and evidence of more severe asthma (Table 12). Interestingly, patients with CMH did not differ from patients without CMH in blood or sputum cell differentials or in sputum cell gene expression of cytokines or mucin genes (Table 12).

Mucus Plugging on MDCT Scans is Associated with Airway Type 2 Inflammation

Figure 10C:
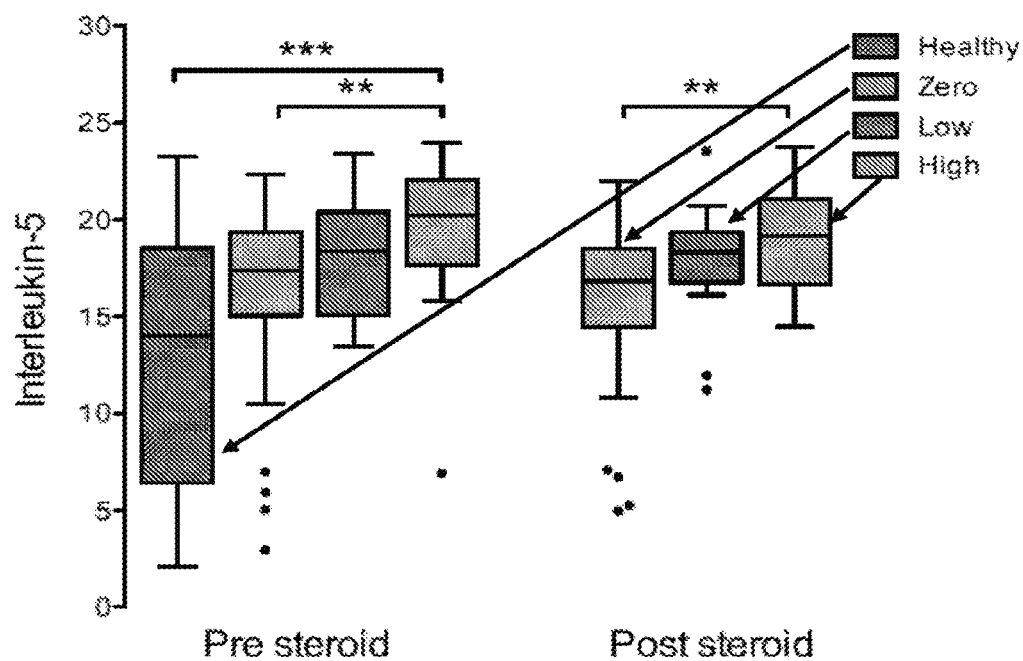
Figure 10D:
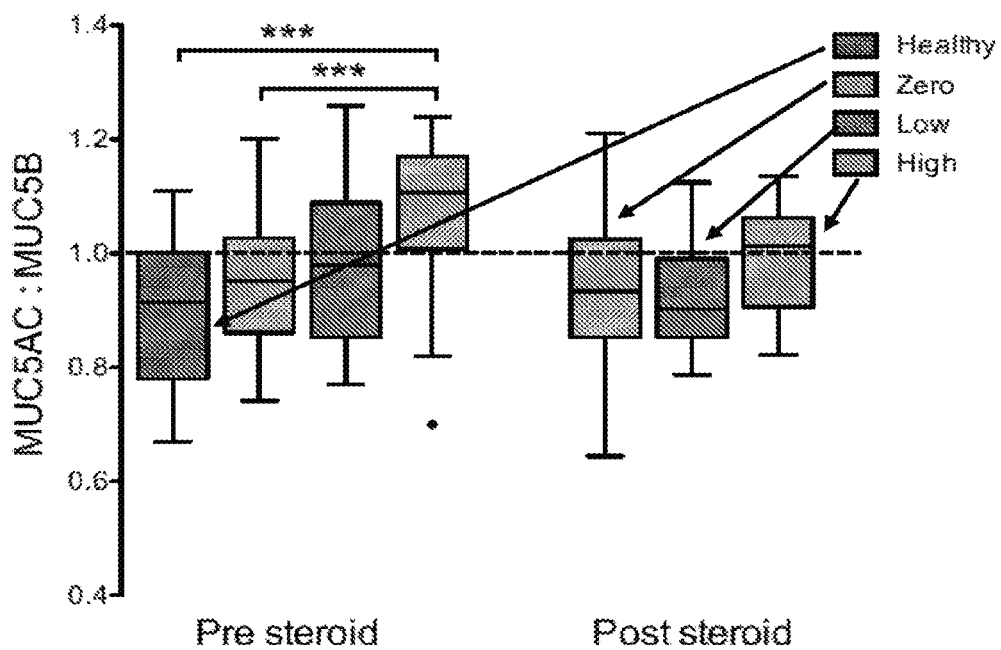
Figure 15:
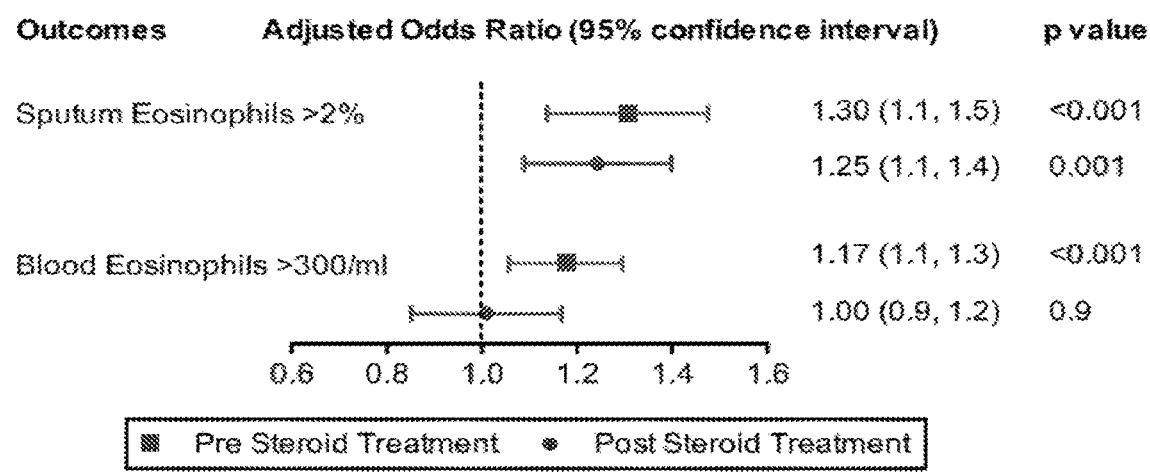
FIG. 15: Logistic regression of mucus score on markers of type 2 inflammation. Adjusted odds ratio for effects of mucus score (ranging 0-20) on type 2 markers before and after steroid (triamcinolone acetate) treatment. The logistic models were adjusted for age, gender, and wall thickness (surrogate for airway remodeling).

To test the hypothesis that type 2 inflammation promotes formation of mucus plugs in the airway, multiple outcomes of type 2 inflammation in the three mucus subgroups were analyzed. It was found that eosinophils in blood and sputum and nitric oxide levels in exhaled breath were significantly higher in the high-mucus group than in the low- and zero-groups (FIG. 10A and Table 12). Among patients with high mucus scores, 71% had sputum eosinophilia (sputum eosinophils >2%) and 66% had systemic eosinophilia (blood eosinophils >300×10-9/L). In addition, gene expression for IL-13 and IL-5 in sputum cells was significantly higher in the high mucus group than in the low- and zero-mucus groups (FIGS. 10B and 10C). The relationship between mucus scores and sputum eosinophil percentage (Spearman's rho=0.51, p<0.001) remained significant in linear regression models that controlled for age, gender and wall thickness percentage (Table 13). In addition, sputum eosinophils and sputum cell gene expression of IL-13 and IL-5 remained high in many patients with high mucus scores following systemic corticosteroid treatment (FIGS. 10A, 10B and 10C), and the CT mucus score was an independent predictor of residual sputum eosinophilia after systemic corticosteroids in regression models (FIG. 15). Finally, whether the pattern of mucin gene expression for MUC5AC and MUC5B followed a profile typical of IL-13 activation in the high mucus group was explored. Using sputum cell gene expression, it was found that the ratio of expression of MUC5AC to MUC5B was significantly higher in the high-mucus group than in the low- and zero-mucus groups (FIG. 10D).

Marked Eosinophilia in a Bronchial Subsegment with Mucus Plugs

Figure 11A:
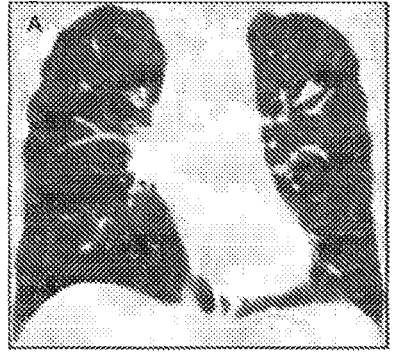
Figure 11B:
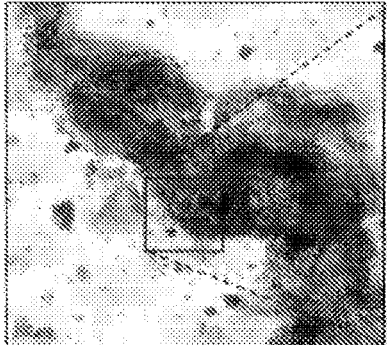
Figure 11C:
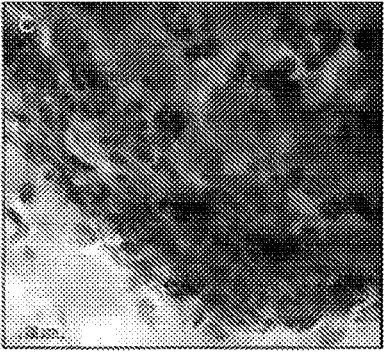

The finding that patients with mucus plugs have much higher sputum eosinophil levels than patients without mucus plugs (FIG. 10), coupled with the data showing that mucus plugs can persist in the same bronchial subsegment for many years (FIG. 1), led us to consider the possibility that regional heterogeneity in mucus plugs reflects regional heterogeneity in type 2 inflammation. This possibility was examined in an asthma patient whose MDCT scan showed a mucus plug in the anterior segment of the left upper lobe (proximally in the medial sub segment LB3b) (FIG. 11A), and no mucus in the superior segment of the right lower lobe (RB6). Bronchoscopy was performed in this subject to separately lavage the LB3b and RB6b sub-segments. It was found that the eosinophil percentage in the plugged segment was much higher than in the non-plugged segment (11.8% vs. 2.4%). Notably, staining of the lavage cell cytospin from the plugged segment showed mucus that was densely infiltrated with intact eosinophils (FIGS. 11B and 11C), despite the fact that this patient was taking high doses of inhaled corticosteroids.

IL-13 Increases Eotaxin-3 in Apical Secretions of Airway Epithelial Cells.

Figure 11D:
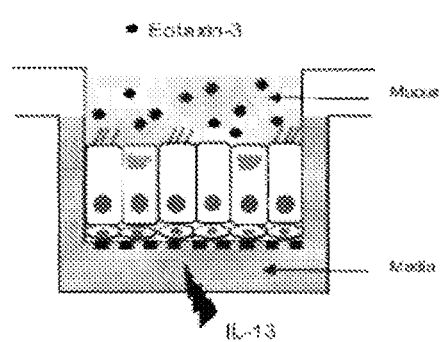
Figure 11E:
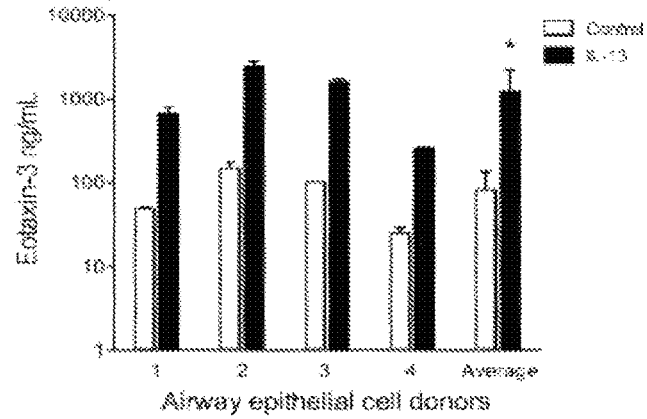

The increase in sputum eosinophils and in sputum cell IL-13 gene expression in the high mucus plug subgroup coupled with the intense infiltration of mucus by eosinophils in the lavage sample led us to consider mechanisms by which IL-13 might promote eosinophil infiltration of mucus. It was previously reported that eotaxin-3 (CCL26) is marked upregulated in the airway in type 2-high asthma (Peters et al., The Journal of allergy and clinical immunology 133, 388-394 (2014); Choy et al., J Immunol 186, 1861-1869 (2011)), and it was explored here if IL-13 causes secretion of eotaxin-3 into the mucus layer of airway epithelial cells. Using primary human airway epithelial cells cultured at air liquid interface (FIG. 11D), it was found that IL-13 causes marked increases in the concentration of eotaxin-3 in apical mucus secretions (FIG. 11E).

Activated Eosinophils Cause Cysteine Crosslinking Via Respiratory Burst Reactive Oxygen Species.

Figure 11F:
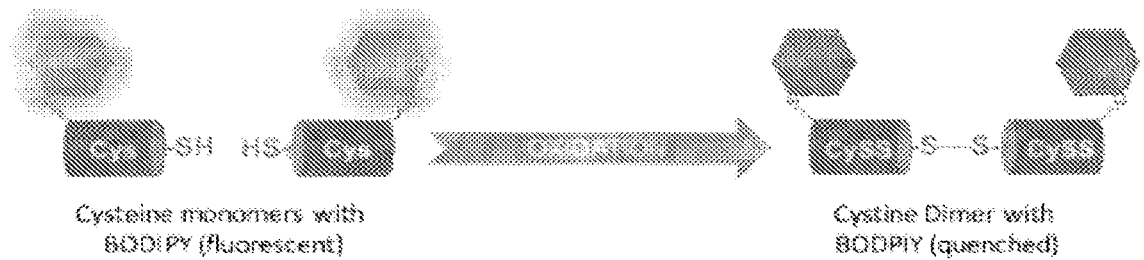

The increase in gene expression for cysteine-rich MUC5AC and the dense infiltration of mucus by eosinophils led to the consideration mechanisms by which eosinophils could promote mucus plug formation in asthma. It was recently reported that oxidation increases mucin polymer cross-links to stiffen airway mucus gels in cystic fibrosis, and the role of neutrophils as cellular sources of reactive oxygen products was emphasized (Yuan et al., Sci Transl Med 7, 276ra227 (2015)). However, it has been shown that eosinophils activated with phorbol-12-myristate-13-acetate (PMA) produce even greater amounts of reactive oxygen products than neutrophils (Petreccia, & Clark, J Leukoc Biol 41, 283-288 (1987); Lacy et al., J Immunol 170, 2670-2679 (2003)), so whether eosinophils might release hydrogen peroxide ($H_2O_2$), superoxide anion ($O_{2-}$), or hydroxide (HO) to oxidize cysteines in mucins and generate covalent disulfide bridges was considered. Prior studies have shown that reactive oxygen products are released from resting eosinophils, but that eosinophils activated with PMA produce even higher concentrations of reactive oxygen species 18. To test whether resting eosinophils or PMS-stimulated eosinophils convert cysteines to their oxidized cysteine product (cystine), BODIPY labeled cysteine was exposed to eosinophils from asthma donors. BODIPY fluoresces when cysteine is in its monomeric form, but this fluorescence quenches completely when cysteine is oxidized to form cystine dimers (FIG. 11F). A small amount of cystine dimer formation was found when BODIPY-labeled cysteine was maintained in buffer solution alone, but dimer formation was significantly increased when the BODIPY-labeled cysteine was exposed to either unstimulated or PMA-stimulated eosinophils (FIG. 11G). To explore the role of eosinophil-derived $H_2O_2$ in the mechanism of this cystine formation, catalase was used to inhibit $H_2O_2$ and showed significantly decreased cystine dimer formation in experiments using both unstimulated and stimulated eosinophils (FIG. 11H). Without being bound by any scientific theory, it is concluded that eosinophil-derived $H_2O_2$ is a mediator of eosinophil-driven cysteine oxidation and cystine dimer formation.

Link Between Eosinophilia and Mucus Plugs in the Pathogenesis of Airflow Obstruction in Severe Asthma Among the 146 asthmatics that were studied, almost 60% had physiologic evidence of airflow obstruction and 24% had severe obstruction. The data provide strong evidence here that mucus plugs are a mechanism of airflow obstruction in these patients. Using a novel method of quantifying mucus plugs based on visual assessment of MDCT scans by experienced chest radiologists, a strong inverse relationship was found between the MDCT mucus score and FEV1 values. It was also found that the majority of patients with severe obstruction had at least four bronchial sub-segments with one or more airways completely occluded with mucus. Some of these patients had mucus plugs in more than half of their bronchial subsegments. Although strong associations do not prove causality, and without being bound by any scientific theory, it is proposed that the association between mucus plugs and airflow obstruction in these asthmatics is causal, because mucus plugs that completely occlude sub-segmental airways will cause regional airflow obstruction at a minimum and more widespread airflow limitation when present in multiple bronchopulmonary segments. Airway smooth muscle contraction could be a mechanism of airflow obstruction in these patients, but many did not normalize their lung function when they were treated with high doses of inhaled bronchodilator. In addition, although airway remodeling is considered a mechanism of airflow obstruction in severe asthma (Fahy. Am J Respir Crit Care Med 164, S46-51 (2001); Hartley et al., J Allergy Clin Immunol 137, 1413-1422 e1412 (2016)), it was found that the relationship between mucus plugs and airflow obstruction remained very strong when regression models were used to control for radiographic measures of airway wall thickness. Importantly, it was also found that symptoms of chronic mucus hypersecretion (CMH) were neither sensitive or specific for the mucus plug phenotype uncovered here, perhaps because the mucus plugs occur in sub-segmental airways that lack large numbers of cough receptors (Berglund, E. Cough and Expectoration, (Munksgaard, 1980); Jackson, J Am Med Assoc 79, 1399-1403 (1922); Widdicombe, Eur Respir J 8, 1193-1202 (1995)). It is shown that the clinical and airway inflammation features of the CMH phenotype are different from the features of mucus plug phenotype. Thus, it is reveal here that not all mucus phenotypes in asthma are the same, and the unique ability of MDCT lung imaging to identify patients with a mucus plug phenotype is demonstrated.

Although the mucus plugs were heterogeneously distributed in the 20 bronchopulmonary segments among patients, the plugs tended to occur in the same bronchopulmonary segment in individual patients studied repeatedly at intervals ranging from 2-9 years. These plugs occurred in patients who had prominent airway type 2 inflammation despite use of high doses of inhaled corticosteroids and protocol-mandated intramuscular corticosteroid treatment. Indeed, in a case example, the mucus-positive bronchopulmonary segment had mucus intensely infiltrated with eosinophils, whereas the mucus-negative segment had a markedly lower eosinophil percentage in the lavage fluid. Taken together, these data indicate that mucus plugs on MDCT scans mark segments with type 2 inflammation and that type 2 inflammation is heterogeneously distributed among lung segments. The reasons for this heterogeneity are not revealed by our study, but we speculate that childhood viral airway infections—known to infect some lung segments and not others and to be a risk for lifelong asthma (Weiss et al., Am Rev Respir Dis 131, 573-578 (1985); Frick et al., J Allergy Clin Immunol 63, 228-241 (1979); Sigurs et al., Thorax 65, 1045-1052 (2010); Kusel et al., J Allergy Clin Immunol 119, 1105-1110 (2007))—may be a factor. Recent murine studies show that infectious stressors no longer present in the host can cause localized immune damage ("immunological scarring") that drive long term immune alterations leading to chronic inflammatory disease (Fonseca et al., Cell 163, 354-366 (2015); Kamdar et al., Cell Host Microbe 19, 21-31 (2016)). Thus, it may be that childhood viral infections variably damage airway epithelial cells in specific lung segments to cause persistent type 2 inflammation and long-lasting mucus pathology in these segments. In human lungs, each of the 20 bronchopulmonary segments develop and operate as discrete anatomical and functional units with little collateral communication between segments (Kaminsky, D. Netter Collection of Medical Illustrations: Respiratory System, in Netter Collection of Medical Illustrations: Respiratory System. Vol. 3 16 (Elsevier Health Sciences, 2011)). Therefore, each of these segments could emerge from childhood with its own distinct injury history and type 2-associated pathology that reflects previously sustained immunological scars.

Airway mucus in health is normally a lightly cross-linked mucus gel comprised of specific gel-forming mucins (MUC5AC and MUC5B) (Innes et al., Am J Respir Crit Care Med 180, 203-210 (2009); Fahy & Dickey, N Engl J Med 363, 2233-2247 (2010)), and it is normally easily transported by the mucociliary escalator and does not form mucus plugs. Evidence is found here that the mechanism of mucus plug formation in chronic severe asthma involves pathologic interactions between airway eosinophils and cysteine-rich mucins. For example, increased gene expression for IL-5 and IL-13 is found in asthma sputum cells, and IL-13 greatly increases secretion of eotaxin-3—a potent eosinophil chemoattractant (Kitaura et al., J Biol Chem 274, 27975-27980 (1999); Li et al., J Immunol 162, 2477-2487 (1999); Shinkai et al., J Immunol 163, 1602-1610 (1999); Yuan et al., Eur J Immunol 36, 2700-2714 (2006))—by airway epithelial cells. Without being bound by any theory, these data are interpreted to indicate that eosinophil-rich mucus occurs in these patients because of eotaxin-3-mediated accumulation of eosinophils, whose survival is prolonged in the presence of high levels of IL-5. The fact that sputum eosinophilia was a prominent feature of patients with mucus plugs despite their treatment with high doses of corticosteroids may also be attributable to IL-5, because steroid-induced eosinophil apoptosis is known to be potently inhibited by IL-5 (Pazdrak et al., Apoptosis 21, 421-431 (2016)).

Figure 12:
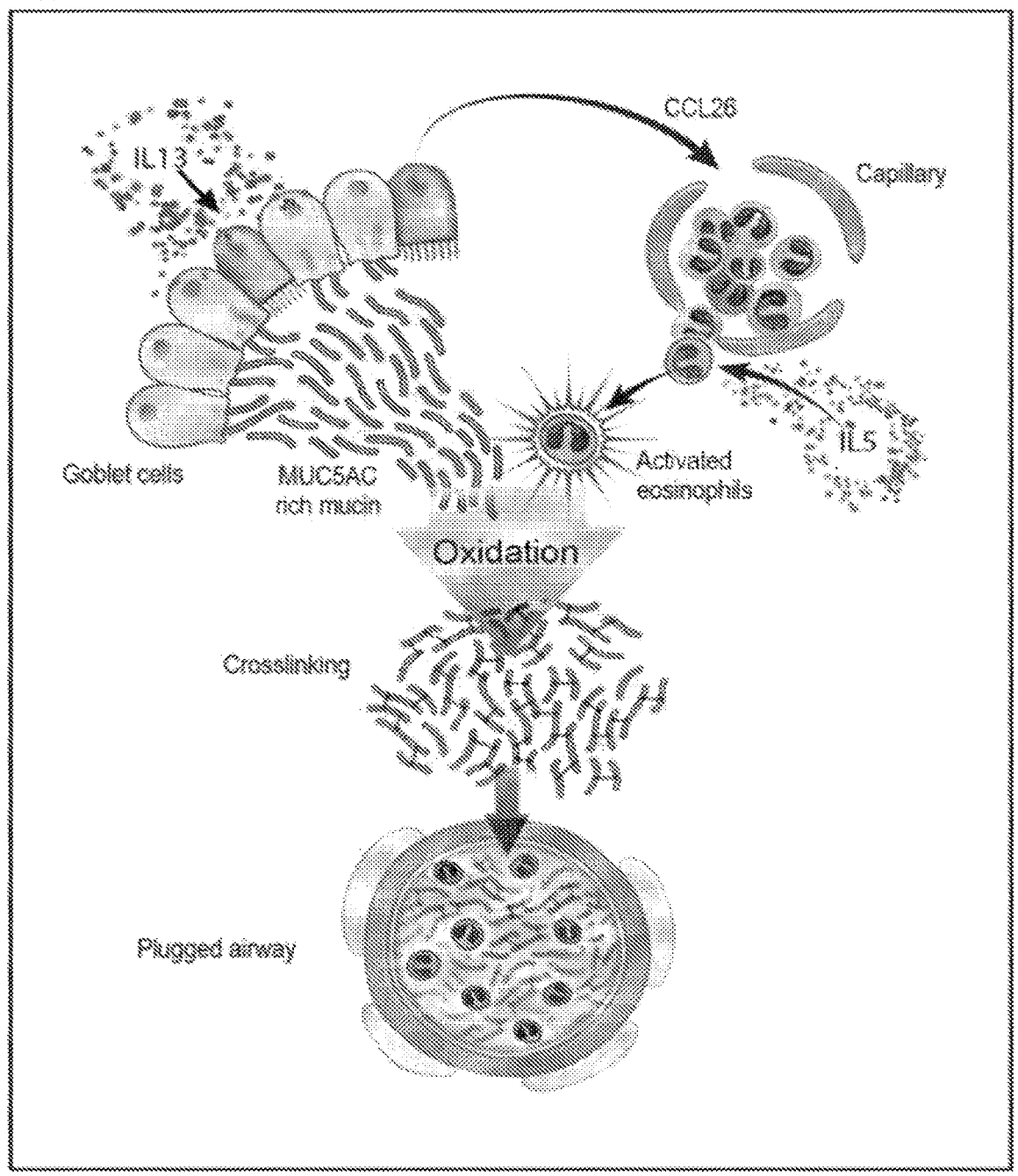
FIG. 12: Conceptual model for how type 2 inflammation promotes mucin plugs formation in asthma. IL-13 activated the airway epithelium to secrete high concentrations of cysteine-rich MUC5AC mucin and upregulates CCL26 to chemoattract eosinophils to the airway lumen: IL-5 promotes survival of airway eosinophils, which are activated to release reactive oxygen species (ROS) that promote oxidation of mucin cysteine residues and mucin disulfide crosslinking.

Cysteine (Cys) residues in mucins participate in establishing disulfide linkages within and among mucin monomers, and Cys domains are more prevalent in MUC5AC than in MUC5B (Thornton et al., Annu Rev Physiol 70, 459-486 (2008)). It is found here that MUC5AC is upregulated in sputum cells from patients with a high mucus score, and that the number of eosinophils in sputum is strongly correlated with the number of mucus plugs on MDCT scans. Eosinophils are a rich source of reactive oxygen species (Lacy et al., J Immunol 170, 2670-2679 (2003)), and it was recently reported that oxidation of mucins in healthy airway mucus promotes cysteine disulfide cross-links that stiffens the mucus gel to create pathologic mucus (Yuan et al., Sci Transl Med 7, 276ra227 (2015)). It is found here that eosinophils from asthma donors can convert cysteine to cystine, its oxidized disulfide product. The eosinophils did not need to be activated to catalyze this conversion—which was mediated at least in part by hydrogen peroxide—but activated eosinophils had larger effects. Taken together, and without being bound by any scientific theory, these data lead to the conclusion that mucus plugs in asthma form because of airway type 2 inflammation and eosinophil-mediated cross-linking of cysteine-rich mucins (FIG. 12).

In conclusion, it is shown that type 2 inflammation promotes formation of airway mucus plugs in asthma to cause airflow obstruction. It is also concluded that MDCT lung scans reveal the heterogeneity of mucus plugs and airway type 2 inflammation among bronchopulmonary segments in the lung, and that MDCT lung scans are proposed to be useful as a biomarker (e.g., in clinical trials) to test whether mucolytic treatments improve airflow in asthma.

TABLE 1

| | CT parameters: Total Lung Capacity (TLC) protocol | | | | | |
|---|---|---|---|---|---|---|
| Scanner Model | SIEMENS Definition (AS Plus) 128 slice | SIEMENS Definition (DS) 64 slice | SIEMENS Sensation 64 slice | GE VCT 64 slice/ Discovery STE | GE Discovery CT 750HD 64 slice | PHILIPS Brilliance 64 slice |
| Scan Type | Spiral | Spiral Single Source | Spiral | Helical | Helical-Standard | Spiral Helix |
| Scan FOV | No selection | No Selection | No selection | Large | Large | No selection |
| Rotation Time (s) | 0.5 | 0.5 | 0.5 | 0.5 | 0.5 | 0.5 |
| Det. Configuration | 128 × 0.6 | 64 × 0.6 | 64 × 0.6 | 64 × 0.625 | 64 × 0.625 | 64 × 0.625 |
| Pitch | 1.0 | 1.0 | 1.0 | 0.984 | 0.984 | 0.923 |
| kVp | 120 | 120 | 120 | 120 | 120 | 120 |
| Effective mAs | S-90 M-110 L-165 | S-85 M-105 L-150 | S-80 M-100 L-145 | S-145 M-180 L-270 | S-145 M-180 L-270 | S-105 M-130 L-190 |
| Dose modulation | Care Dose OFF | Care Dose OFF | Care Dose OFF | Auto mA OFF | Auto mA OFF | Dose Right (ACS) OFF |
| Std. Algorithm | B35 | B35 | B35 | Standard | Standard | B |
| Lung Algorithm | B30 | B31 | None | Detail | Detail | YB |
| Additional Image filters | No Selection | No Selection | No Selection | No Selection | IQ Enhance OFF | Adaptive Filtering OFF |
| Thickness (mm) | 0.75 | 0.75 | 0.75 | 0.625 | 0.625 | 0.67 |
| Interval (mm) | 0.5 | 0.5 | 0.5 | 0.5 | 0.5 | 0.5 |

TABLE 1-continued

CT parameters: Total Lung Capacity (TLC) protocol

| Scanner Model | SIEMENS Definition (AS Plus) 128 slice | SIEMENS Definition (DS) 64 slice | SIEMENS Sensation 64 slice | GE VCT 64 slice/ Discovery STE | GE Discovery CT 750HD 64 slice | PHILIPS Brilliance 64 slice |
|---|---|---|---|---|---|---|
| Iterative reconstruction | IRIS OFF | IRIS OFF | No Selection | ASIR OFF | ASIR OFF | iDOSE OFF |
| Scan Time (Sec) 30 cm length | <10 | <10 | <10 | <10 | <10 | <10 |
| Recon Mode | N/A | N/A | N/A | Plus | Plus | N/A |
| Smart mA | N/A | N/A | N/A | OFF | OFF | N/A |

\* Effective mAs: Siemens = Eff. mAs, GE = mA setting, Philips = mAs. S = small, M = medium, and L = large. BMI categories as defined in Table S9.

TABLE 2

CTDIvol as a function of BMI

| Body Size | BMI Range | CTDIvol (mGy) |
|---|---|---|
| Small | 15 to 19 | 11.4 |
| Medium | 20 to 30 | 7.6 |
| Large | >30 | 6.1 |

TABLE 3

Gene Primers and Probes

| Gene Primers | Sequence | SEQ ID NO: |
|---|---|---|
| PPIA-outer forward | ATGAGAACTTCATCCTAAAGCATACG | 1 |
| PPIA-outer reverse | TTGGCAGTGCAGATGAAAAACT | 2 |
| PPIA-inner forward | ACGGGTCCTGGCATCTTGT | 3 |
| PPIA-probe | ATGGCAAATGCTGGACCCAACACA | 4 |
| PPIA-inner reverse | GCAGATGAAAAACTGGGAACCA | 5 |
| GAPDH-outer forward | CAATGACCCCTTCATTGACCTC | 6 |
| GAPDH-outer reverse | CTCGCTCCTGGAAGATGGTGAT | 7 |
| GAPDH-inner forward | GATTCCACCCATGGCAAATTC | 8 |
| GAPDH-probe | CGTTCTCAGCCTTGACGGTGCCA | 9 |
| GAPDH-inner reverse | GGGATTTCCATTGATGACAAGC | 10 |
| YWHAZ-outer forward | CTTCTGTCTTGTCACCAACCATTC | 11 |
| YWHAZ-outer reverse | CAACTAAGGAGAGATTTGCTGCAG | 12 |
| YWHAZ-inner forward | TGGAAAAAGGCCGCATGAT | 13 |
| YWHAZ-probe | TGGCTCCACTCAGTGTCTAAGGCACCCT | 14 |
| YWHAZ-inner reverse | TCTGTGGGATGCAAGCAAAG | 15 |
| PSMB2-outer forward | CCATATCATGTGAACCTCCTCCT | 16 |
| PSMB2-outer reverse | GTCGAGGATACTGAGAGTCAGGAA | 17 |
| PSMB2-inner forward | TCCTCCTGGCTGGCTATGAT | 18 |
| PSMB2-probe | ACAGCGCTGGCCCTTCATGCTC | 19 |
| PSMB2-inner reverse | GGCTGCCAGGTAGTCCATGT | 20 |
| IL4-outer forward | GGGTCTCACCTCCCAACTGC | 21 |
| IL4-outer reverse | TGTCTGTTACGGTCAACTCGGT | 22 |
| IL4-inner forward | GCTTCCCCCTCTGTTCTTCCT | 23 |
| IL4-probe | TCCACGGACACAAGTGCGATATCACC | 24 |
| IL4-inner reverse | GCTCTGTGAGGCTGTTCAAAGTT | 25 |
| IL5-outer forward | GCCATGAGGATGCTTCTGCA | 26 |
| IL5-outer reverse | GAATCCTCAGAGTCTCATTGGCTATC | 27 |
| IL5-inner forward | AGCTGCCTACGTGTATGCCA | 28 |
| IL5-probe | CCCCACAGAAATTCCCACAAGTGCA | 29 |
| IL5-inner reverse | GTGCCAAGGTCTCTTTCACCA | 30 |
| IL13-outer forward | CAACCTGACAGCTGGCATGT | 31 |
| IL13-outer reverse | CCTTGTGCGGGCAGAATC | 32 |
| IL13-inner forward | GCCCTGGAATCCCTGATCA | 33 |
| IL13-probe | TCGATGGCACTGCAGCCTGACA | 34 |
| IL13-inner reverse | GCTCAGCATCCTCTGGGTCTT | 35 |
| IL17-outer forward | ACTGCTACTGCTGCTGAGCCT | 36 |
| IL17-outer reverse | GGTGAGGTGGATCGGTTGTAGT | 37 |
| IL17-inner forward | CAATCCCACGAAATCCAGGA | 38 |
| IL17-probe | CCCAAATTCTGAGGACAAGAACTTCCCC | 39 |
| IL17-inner reverse | TTCAGGTTGACCATCACAGTCC | 40 |
| MUC5B-outer forward | TACATCTTGGCCCAGGACTACTGT | 41 |
| MUC5B-outer reverse | AGGATCAGCTCGTAGCTCTCCAC | 42 |
| MUC5B-inner forward | CATCGTCACCGAGAACATCC | 43 |

TABLE 3-continued

Gene Primers and Probes

| Gene Primers | Sequence | SEQ ID NO: |
|---|---|---|
| MUC5B-probe | CTGTGGGACCACCGGCACCAC | 44 |
| MUC5B-inner reverse | AAGAGCTTGATGGCCTTGGA | 45 |
| MUC5AC-outer forward | TGTGGCGGGAAAGACAGC | 46 |
| MUC5AC-outer reverse | CCTTCCCATGGCTTAGCTTCAGC | 47 |
| MUC5AC-inner forward | CGTGTTGTCACCGAGAACGT | 48 |
| MUC5AC-probe | CTGCGGCACCACAGGGACCA | 49 |
| MUC5AC-inner reverse | ATCTTGATGGCCTTGGAGCA | 50 |

TABLE 4

Characteristics of Healthy and Asthma Subjects

| Characteristics | Healthy for MOCT analysis (n = 22) | Healthy for Sputum analysis (n = 39) | Asthma (n = 146) |
|---|---|---|---|
| Mean age (years)* | 29.5 ± 11.5 | 39.2 ± 12.6 | 46.8 ± 16.0 |
| Female sex-no. (%) | 15 (60.0) | 21 (53.9) | 91 (62.3) |
| Race, no. (%) | | | |
| American Indian or Alaska Native | 0 (0) | 0 (0) | 0 (0) |
| Asian | 1 (4) | 3 (7.7) | 10 (6.9) |
| Black or African American | 3 (12) | 6 (15.4) | 34 (23.3) |
| Caucasian | 17 (68) | 25 (64.1) | 90 (61.6) |
| Native Hawaiian or Pacific Islander | 0 (0) | 0 (0) | 0 (0) |
| Mixed race | 1 (4) | 5 (12.8) | 12 (8.2) |
| Unknown/refused to answer | 3 (12) | 0 (0) | 0 (0) |
| Spirometry data | | | |
| FEV1 (% predicted)* | 98.2 ± 9.3 | 103 ± 12.1 | 75.5 ± 21.8 |
| FVC (% predicted)* | 100.1 ± 10.3 | 105.6 ± 14.3 | 90.0 ± 19.0 |
| FEV1/FVC | 0.84 ± 0.03 | 0.98 ± 5.6 | 0.83 ± 0.13 |
| History of pulmonary disease | 0 (0) | (0) | 146 (100) |
| History of atopy* | 4 (16) | (0) | 110 (75.3) |
| History of smoking† | 0 (0) | (0) | 0 (0) |

Data reported as mean and standard deviation unless otherwise indicated. CT scans of healthy controls from SARP II and SARP III. CT scans of asthma subjects from SARP III.
*$p < 0.05$ comparing to healthy subjects
†Predicted values could not be calculated in one healthy male subject for sputum analysis (age 23 years; FEV1 4.65 L, FVC 5.81).
‡ Smoking history refers to >5 pack years

TABLE 5

Aeroallergen Sensitivity

| | | Mucus Score | | |
|---|---|---|---|---|
| Allergen | All (n = 144) | Zero (n = 61) | Low (n = 44) | High (n = 39) |
| Fungal | | | | |
| Aspergillus fumigatus, no. (%) | 30 (20.8) | 11 (18.0) | 11 (25.0) | 8 (20.5) |
| Cladosporium herbarum, no. (%) | 21 (13.9) | 8 (13.1) | 9 (20.5) | 4 (10.3) |
| Alternaria alternata, no. (%) | 37 (25.7) | 15 (24.6) | 15 (34.1) | 7 (18.0) |
| Furred animal | | | | |
| Cat dander, no. (%) | 82 (56.6) | 32 (52.5) | 28 (62.2) | 32 (56.4) |
| Dog dander, no. (%) | 78 (53.8) | 33 (54.1) | 26 (57.8) | 19 (48.7) |
| Mouse urine proteins, no. (%) | 16 (11.0) | 6 (9.84) | 7 (15.6) | 3 (7.7) |
| Rat urine proteins, no. (%) | 21 (14.5) | 10 (16.4) | 7 (15.6) | 4 (10.3) |
| Mites and insects | | | | |
| Dermatoph pteronyssinus, no. (%) | 70 (48.3) | 31 (50.8) | 23 (51.1) | 16 (41.0) |
| Dermatoph fariane, no. (%) | 71 (49) | 32 (52.5) | 24 (53.3) | 15 (38.5) |
| Cockroach, no. (%) | 29 (20.1) | 16 (26.2) | 7 (15.9) | 6 (15.4) |
| Plant | | | | |
| Ragweed, no. (%) * | 44 (30.6) | 25 (41.0) | 13 (29.6) | 6 (15.4) |
| Weed mix, no. (%) | 41 (28.5) | 23 (37.7) | 12 (27.3) | 6 (15.4) |
| Grass mix, no. (%) | 42 (29.0) | 18 (29.5) | 13 (29.0) | 11 (28.2) |
| Tree mix, no. (%) | 45 (31.3) | 20 (32.8) | 14 (31.8) | 11 (28.2) |

Aeroallergen sanitization defined as specific IgE >0.35 IU on Immunocap test (Phadia, Uppsala Sweden)
Blood measurements were not available for 2 subjects.
* $P < 0.05$

TABLE 6

Linear regression coefficients of spirometry and sputum eosinophils at baseline predicted by CT mucus score in asthmatics

| Regression models adjusted for covariates* | β coefficient (95% CI) | P value |
|---|---|---|
| Model predicting FEV1 % predicted Mucus Score | | |
| Zero (reference) | — | — |
| Low | −4.6 (−11.7, 2.4) | 0.20 |
| High | −22.4 (−29.9, −14.9) | <0.001 |
| Model predicting FVC % predicted Mucus Score | | |
| Zero (reference) | — | — |
| Low | 0.7 (−6.0, 7.5) | 0.83 |
| High | −9.8 (−16.9, −2.6) | 0.008 |
| Model predicting FEV1/ FVC predicted Mucus Score | | |
| Zero (reference) | — | — |
| Low | −6.4 (−10.5, −2.3) | 0.003 |
| High | −17.1 (−21.5, −12.7) | <0.001 |
| Model predicting percent sputum eosinophils Mucus Score | | |
| Zero (reference) | — | — |
| Low | 1.3 (−2.4, 5.0) | 0.49 |
| High | 10.8 (7.1, 14.5) | <0.001 |

*Linear regression models adjusted for age and gender. β coefficients indicate the change in dependent variables (e.g. FEV1 % predicted) for each level of segment score compared to the zero mucus score.
MBRT—maximum bronchodilator reversibility test
SCRT—Systemic corticosteroid responsiveness test Characteristics of Study Subjects One hundred and forty six adults with asthma and 22 healthy controls underwent multidetector computerized tomography (MDCT) lung scans. Compared to the healthy subjects, patients with asthma were older, had lower lung function, and had a higher prevalence of atopy (Table 4). One hundred of the 146 asthma patients (68.5%) met the ATS/ERS criteria for severe asthma[4]. Eighty five of the 146 asthmatics (58.2%) had a pre bronchodilator FEV1<80% predicted, and 35 of these 84 subjects (41.2%) had FEV1<60% predicted.

Clinical Characteristics of Asthmatics with High Mucus Scores

Patients in the high mucus subgroup were older, had significantly lower scores on the Asthma Control Test, were more likely to be on treatment with inhaled or oral corticosteroids, were more likely to be classified as having severe asthma by ATS/ERS criteria, and had much lower values for FEV1 and FVC (Table 7) than patients in the low and zero mucus subgroups. In addition, patients in the high mucus subgroup were more likely to report a history of nasal polyposis and to have undergone surgery for removal of nasal polyps or for treatment of chronic sinusitis (Table 1). Compared to patients with a zero mucus score, patients with a high score did not have more frequent symptoms of cough or sputum production and did not have a higher frequency of exacerbation in the previous 12 months (Table 7). Two patients met criteria for a diagnosis of allergic bronchopulmonary aspergillosis (ABPA)[9], and both had mucus scores in the low (0.5-3.5) range. Sensitivity to other molds and aeroallergens did not differ significantly among mucus groups (Table 5).

TABLE 7

Characteristics of Subjects with Asthma across Mucus Score Categories

| | | Mucus Score | | |
|---|---|---|---|---|
| Characteristic | All (n = 146) | Zero (n = 61) | Low (n = 45) | High (n = 40) |
| Mucus score | 0.5 (0-4.5) | 0 (0) | 1.5 (0.5-2.5) | 9.5 (6-12) |
| Mean age (years)[†] | 46.8 ± 16.0 | 43.2 ± 15.4 | 46.7 ± 15.6 | 52.3 ± 16.3 |
| Male sex-no. (%) | 55 (37.7) | 18 (29.5) | 19 (42.2) | 18 (45.0) |
| Body Mass Index (kg/m$^2$) | 32.7 ± 9.3 | 34.3 ± 9.9 | 32.5 ± 10.5 | 30.7 ± 6.3 |
| Severe Asthma-no. (%)[§†] | 100 (68.5) | 33 (54.1) | 31 (68.9) | 36 (90.0) |
| Score on Asthma Control Test[†] | 18.0 (14-21) | 19.0 (15-21) | 18.0 (14-22) | 16.5 (13-19) |
| Maintenance corticosteroid use-no. (%) | | | | |
| Inhaled—any dose | 142 (97.3) | 57 (93.4) | 45 (100.0) | 40 (100.0) |
| Inhaled—high dose[†] | 103 (70.6) | 36 (59.0) | 31 (68.9) | 36 (90.0) |
| Systemic[†] | 15 (10.3) | 3 (4.9) | 3 (6.7) | 9 (22.5) |
| Spirometry data[∥] | | | | |
| FEV1 (% predicted)[†‡] | 75.4 ± 21.7 | 85.4 ± 18.1 | 79.6 ± 21.4 | 58.7 ± 19.9 |
| FVC (% predicted)[†‡] | 90.1 ± 19.0 | 95.0 ± 15.9 | 94.7 ± 19.7 | 79.4 ± 20.8 |
| FEV1/FVC (predicted)* [†‡] | 0.83 ± 0.13 | 0.89 ± 0.11 | 0.83 ± 0.11 | 0.73 ± 0.12 |
| FEV 25-75 (% predicted)* [†‡] | 55.2 ± 30.6 | 71.1 ± 34.5 | 56.3 ± 25.9 | 34.0 ± 15.3 |
| Sputum cell counts (%)[¶] | | | | |
| Eosinophils[†*] | 0.7 (0-4.4) | 0.2 (0-0.9) | 0.5 (0.2-1.6) | 7.3 (1.5-21.4) |
| Neutrophils | 58 (35-78) | 62 (37-83) | 60 (35-79) | 47 (31-70) |
| Epithelial cells | 4.7 (2-11.5) | 4.3 (2.3-11.5) | 4.3 (2.3-5.9) | 6.9 (1.9-17) |
| FENO (ppm)** [†] | 22 (12-33) | 18 (10-27) | 24 (13-38) | 28 (19-40) |
| Blood cell counts (×10$^6$/L)[††] | | | | |
| Eosinophils[†‡] | 306 ± 276 | 209 ± 153 | 309 ± 282 | 459 ± 349 |
| Neutrophils | 4286 ± 2350 | 4569 ± 2951 | 4030 ± 1934 | 4134 ± 1592 |

TABLE 7-continued

Characteristics of Subjects with Asthma across Mucus Score Categories

| | | Mucus Score | | |
|---|---|---|---|---|
| Characteristic | All (n = 146) | Zero (n = 61) | Low (n = 45) | High (n = 40) |
| Total white blood cells | 7279 ± 2548 | 7534 ± 3149 | 6953 ± 2138 | 7255 ± 1827 |
| Total IgE (IU/mL)†† | 150 (52-363) | 126 (32-482) | 150 (74-335) | 181 (79-363) |
| Nasal polyposis-no. (%)† | 29 (19.9) | 5 (8.2) | 11 (24.5) | 13 (32.5) |
| Nasal polypectomy† | 21 (14.4) | 1 (1.6) | 8 (17.8) | 12 (30.0) |
| Chronic sinusitis-no. (%) | 46 (31.5) | 17 (27.9) | 14 (31.1) | 15 (37.5) |
| Sinus surgery† | 19 (13.0) | 3 (4.9) | 8 (17.8) | 8 (20.0) |
| Chronic Bronchitis-no. (%)‡‡ | 41 (28.1) | 18 (29.5) | 10 (22.2) | 13 (32.5) |
| Sputum expectoration-no. (%)‡‡ | 105 (71.9) | 45 (73.8) | 36 (80.0) | 24 (60.0) |
| Non-productive cough-no. (%)‡‡ | 67 (45.9) | 25 (41.0) | 24 (53.3) | 18 (45.0) |
| Exacerbations in previous 12 mths-no. (%) | 74 (50.7) | 29 (47.5) | 2 (51.1) | 22 (55.0) |
| Bronchiectasis on CT-no. (%) | 29 (19.9) | 7 (11.5) | 11 (24.4) | 11 (27.5) |
| ABPA-no. (%)§§ | 3 (2.1) | 0 (0) | 2 (1.4) | 0 (0) |

Figure 2A:
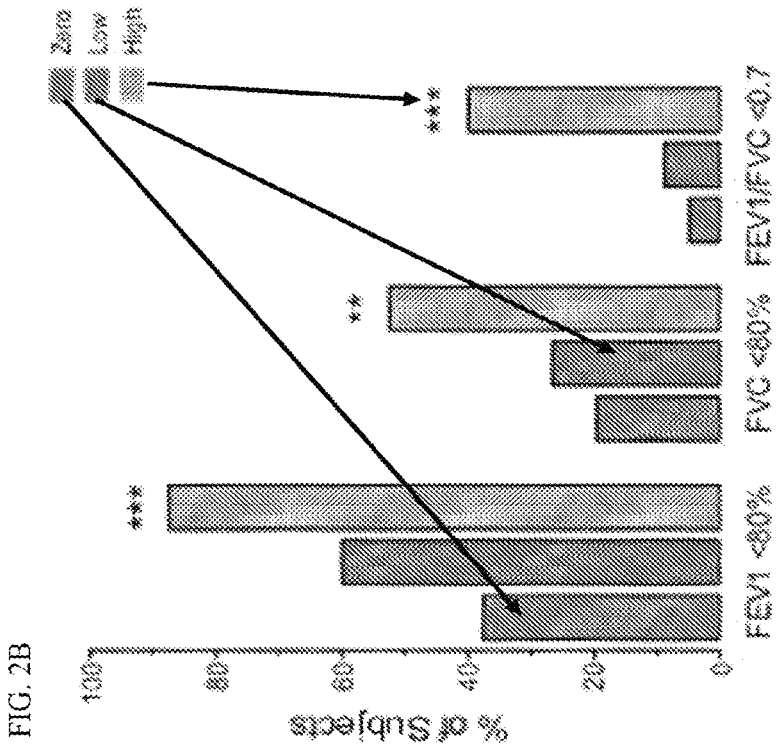
FIGS. 2A and 2B: High mucus scores in asthma patients with airflow obstruction.
Figure 2B:
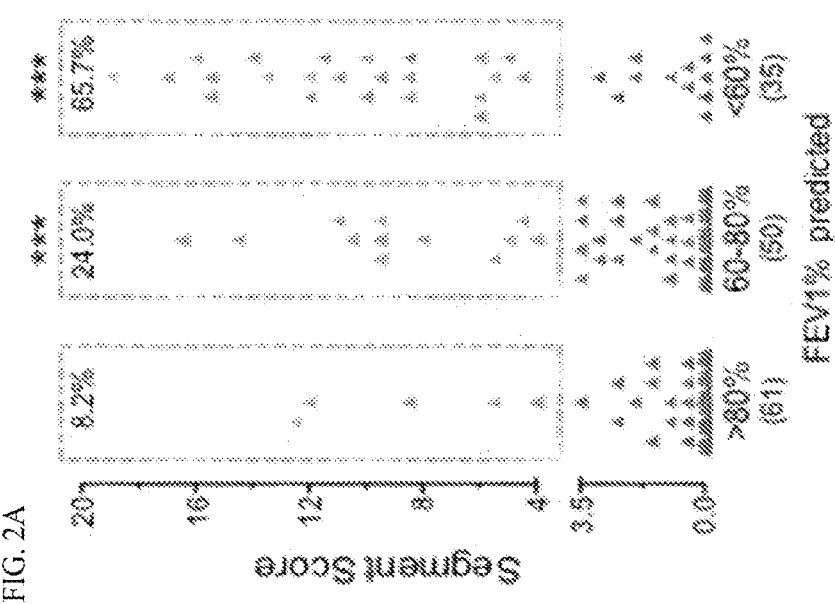

Data reported as mean ± standard deviation or median (interquartile range). Zero represents the "mucus absent" group (mucus score = 0). Low represents the group with mucus scores 0.5-3.5 and high represents the group with mucus scores >4, based on the median score of 3.5 in the "mucus present" group.
*p < 0.05 for comparison of zero and low scores
†p < 0.05 for comparison of zero and high scores
‡p < 0.05 for comparison of low and high scores
§The classification of asthma severity was determined using criteria developed by SARP (FIG. 8B)
∥Pre bronchodilator spirometry
¶Sputum cell counts were not available in 40 subjects due to ineligibility for sputum induction or because the induced sputum not meet quality metrics.
**Fraction of nitric oxide in exhaled breath (FeNO) was not measured in 4 subjects.
††Blood measurements were not available for 2 subjects.
‡‡Questionnaire data is missing in 25 patients for chronic bronchitis and sputum expectoration and in 64 patients for non-productive cough
§§Diagnosed using elevated total IgE, specific IgE to Aspergillus fumigatus, systemic eosinophilia, and radiographic changes consistent with ABPA High Mucus Scores and Airflow Obstruction In asthma patients the CT mucus scores were strongly and inversely associated with pre bronchodilator measures of FEV1% predicted (Spearman's rho=−0.52, p<0.001), FVC % predicted (Spearman's rho=−0.33, p<0.001), and FEV1/FVC predicted (Spearman's rho=−0.53, p<0.001), and these associations remained significant in linear regression models that controlled for age and gender (Table 6). Notably, 66% percent of patients with pre bronchodilator FEV1<60% had high mucus scores compared to 24% of patients with FEV1 60-80% and 8% of patients with FEV1>80% (FIG. 2A). In addition, the proportions of patients with abnormal values for FEV1% predicted, FVC % predicted and FEV1/FVC predicted were significantly higher in the high mucus group than the zero mucus group (FIG. 2B).

High Mucus Scores and Airflow Inflammation

Figure 3A:
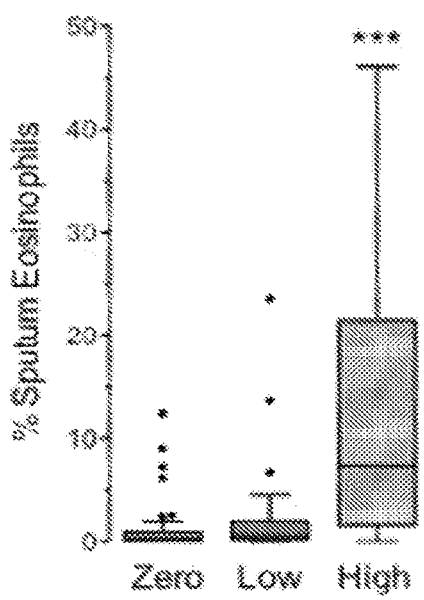
FIG. 3A-3D: High mucus score is associated with type 2 inflammation and altered airway mucin gene expression.
Figure 3B:
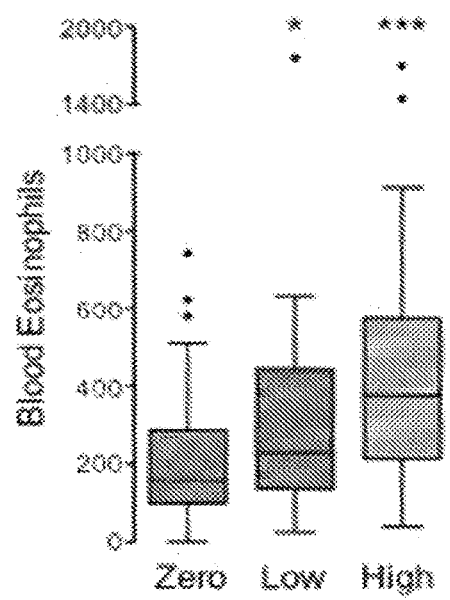
Figure 3C:
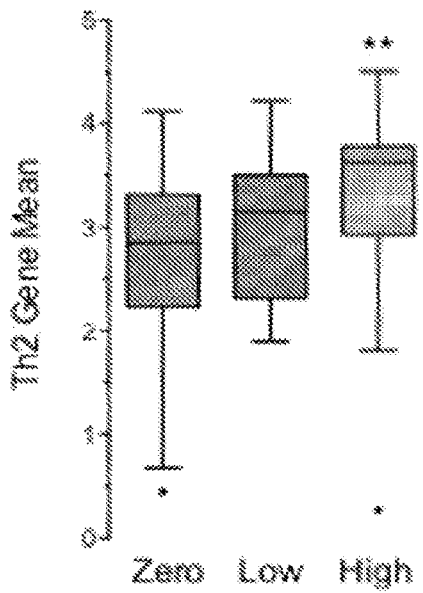
Figure 3D:
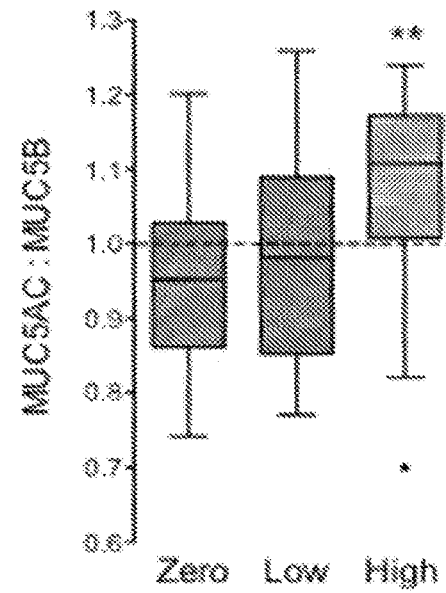

Patients in the high mucus subgroup had significantly higher eosinophil percentages in induced sputum and higher eosinophil counts in blood than patients in the low and zero mucus subgroups (Table 7, FIG. 3A, 3B). CT mucus scores were strongly associated with sputum eosinophil % (Spearman's rho=0.51, p<0.001), and this association remained significant in linear regression models that controlled for age and gender (Table 6). Among patients with a high mucus score, 71% had sputum eosinophilia (sputum eosinophils >2%) and 66% had systemic eosinophilia (blood eosinophils >300×10-9/L). In addition, exhaled nitric oxide levels in patients in the high mucus subgroup were significantly higher than in the low and zero mucus subgroups (Table 7). Furthermore, a composite metric of gene expression for Th2 cytokines (IL-4, IL-5, and IL-13) ("Th2 gene mean")[7] in sputum cells from patients in the high mucus subgroup was significantly higher than in sputum cells from patients in the low and zero mucus subgroups (FIG. 3C). Finally, the ratio of expression of MUC5AC to MUC5B in sputum cells from patients in the high mucus subgroup was significantly higher than in sputum cells from patients in the low and zero mucus subgroups (FIG. 3D).

CT Mucus Scores and Response of FEV1 to Treatment

Figure 4A:
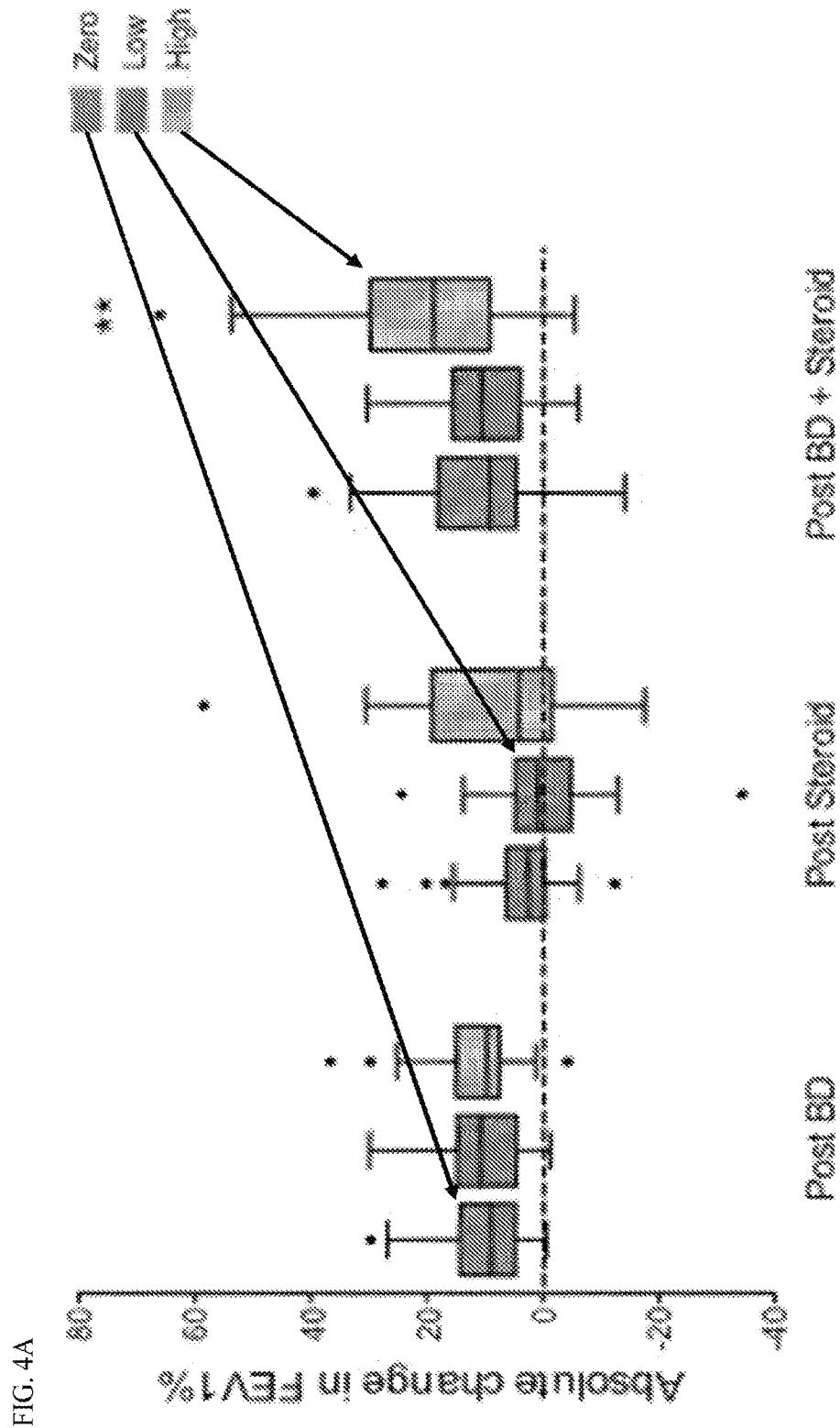
Figure 4B:
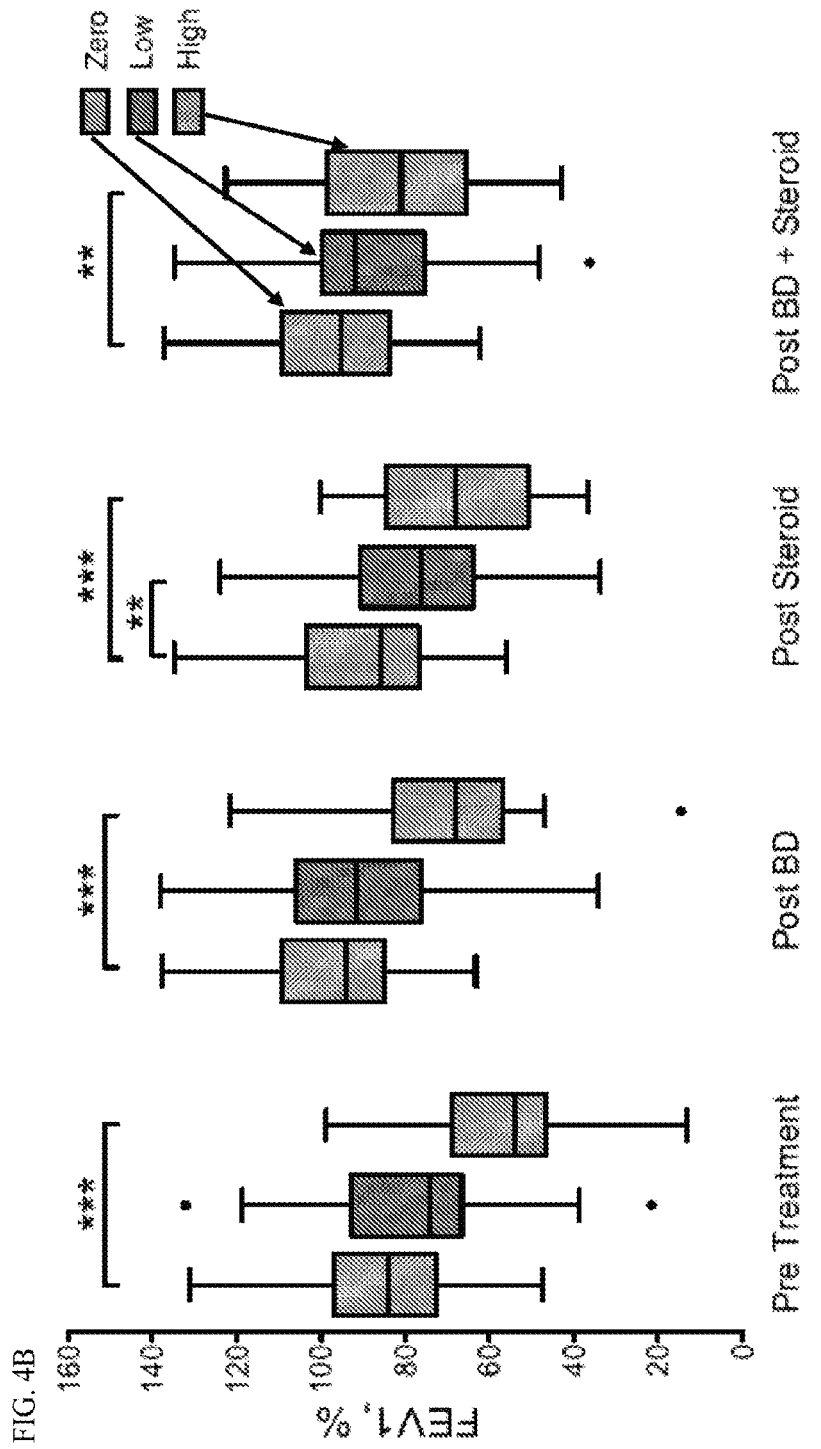
Figure 4E:
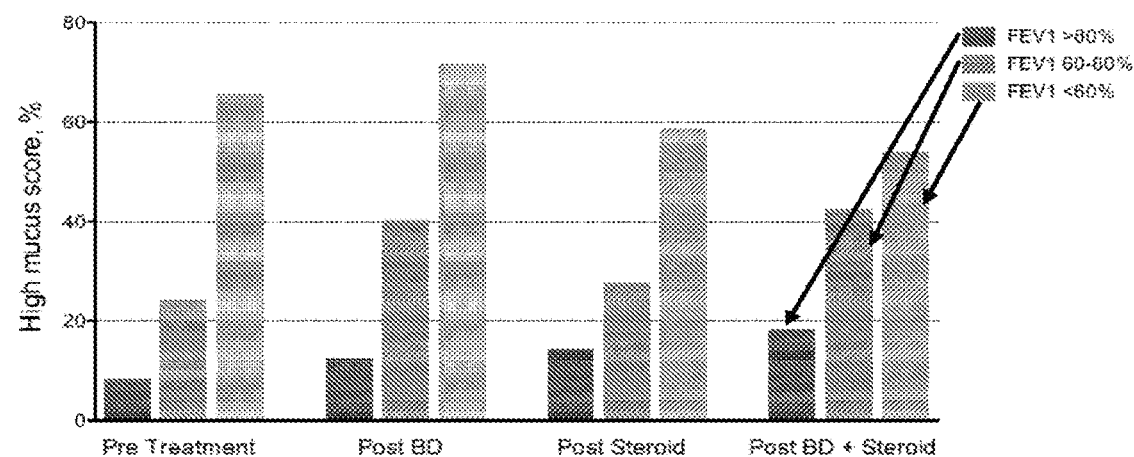
Figure 4F:
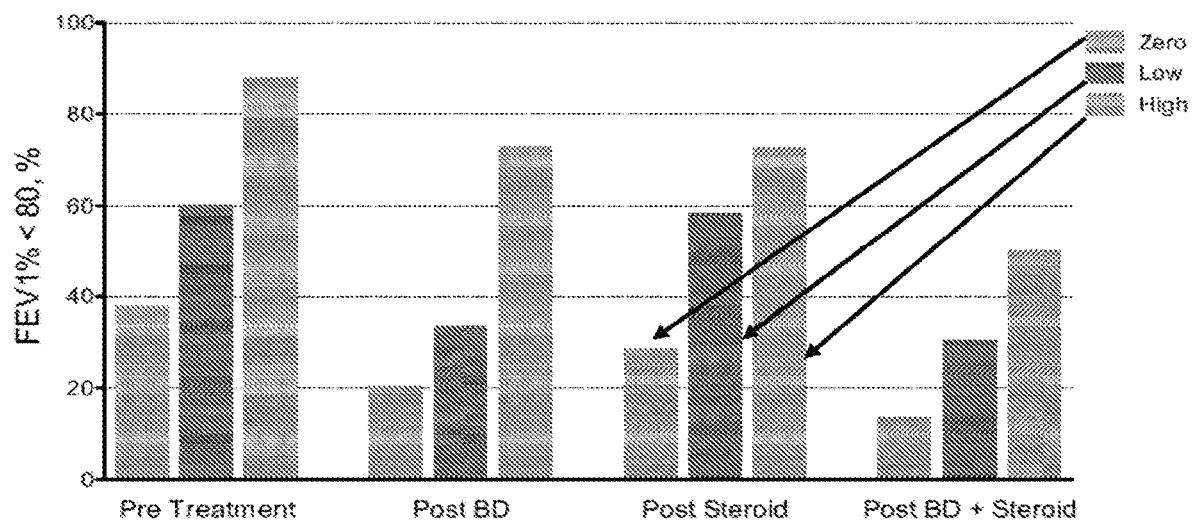

The FEV1% was markedly lower in the high mucus group than the low and zero mucus groups at baseline (Table 7), but the absolute change in FEV1% following MBRT was not significantly different across the 3 mucus groups on visit 2 (FIG. 4A). Therefore, 73% of patients with a high mucus score had residual abnormalities in FEV1 (FEV1 less than 80% predicted) following MBRT, whereas only 20% of patients with a zero mucus score had residual FEV1 defects (FIG. 4B). Notably, all patients whose FEV1 was less than 60% predicted following the MBRT had mucus plugs on CT.

The absolute change in FEV1% following SCRT was not significantly different across the 3 mucus groups on visit 3 (FIG. 4A), but 72% of patients with a high mucus score had residual abnormalities in FEV1 following the SCRT, whereas only 28% of patients with zero mucus score had residual FEV1 defects (FIG. 4B).

The absolute change in FEV1% following the combined SCRT and MBRT was significantly higher in the high mucus group than the zero group (FIG. 4A), but 50% of patients in the high mucus group had residual abnormalities in FEV1 following the SCRT and MBRT, whereas only 13% of patients with zero mucus score had residual FEV1 defects (FIG. 4B). A high mucus score CT mucus score was an independent predictor of residual reduction in FEV1 after maximal bronchodilation and systemic corticosteroids in regression models that controlled for age and gender (Table 8).

CT Mucus Scores and Response of Sputum Measures to Treatment

Sputum eosinophil % was considerably higher in the high mucus group than the low and zero mucus groups at baseline and did not decrease significantly in the high mucus group following the SCRT (FIG. 4C). Similarly, the Th2 gene mean in sputum cells was higher in the high mucus group than the low and zero mucus groups at baseline and did not decrease significantly in the high mucus group following the SCRT (FIG. 4D). The high CT mucus score was an independent predictor of residual sputum eosinophilia after systemic corticosteroids in regression models that controlled for age and gender (Table 8).

TABLE 8

Linear regression coefficients of residual abnormalities in FEV1 % predicted and percentage sputum eosinophils after treatment predicted by CT mucus score in asthmatics

| Regression models adjusted for covariates* | β coefficient (95% CI) | P value |
|---|---|---|
| Model predicting FEV1 % predicted Mucus Score | | |
| Zero (reference) | — | — |
| Low | −5.3 (−11.9, 1.4) | 0.12 |
| High | −9.5 (−16.7, −2.3) | 0.01 |
| Model predicting percentage sputum eosinophils Mucus Score | | |
| Zero (reference) | — | — |
| Low | −0.21 (−2.1, 1.7) | 0.82 |
| High | 4.7 (2.8, 6.6) | <0.001 |

*Linear regression models adjusted for age and gender. β coefficients indicate the change in dependent variables (e.g. FEV1 % predicted) for each level of segment score compared to thezero mucus score.
MBRT—maximum bronchodilator reversibility test
SCRT—Systemic corticosteroid responsiveness test Identification and Quantification of Mucus Plugging MDCT imaging of the lungs was used to explore the role of airway occlusion with mucus in the pathophysiology of lung dysfunction in chronic severe asthma. Using a simple and reproducible visual scoring system, it was found that mucus plugs frequently occlude subsegmental airways in patients with severe asthma. The patients with airway mucus occlusion in four or more bronchopulmonary segments had poor asthma control and much lower FEV1 and FVC values than patients with no airway mucus occlusion. Reductions in FEV1 and FVC are known physiologic characteristics of severe asthma that result from air trapping at all levels of airflow limitation[10]. The mechanisms of air trapping in severe asthma include airway smooth muscle contraction[11], airway remodeling[12-15], or loss of lung elastic recoil[16,17], but the data reveal and highlight the importance of airway occlusion with mucus. Importantly, it was shown not only that airway mucus occlusion is strongly associated with reductions in FEV1, but also that high mucus scores are an independent predictor of residual reductions in FEV1 after maximal brochodilation with albuterol and systemic corticosteroids. These data provide a strong rationale to use mucolytics as a strategy to improve FEV1 abnormalities that are not fully responsive to current mainstay asthma treatments.

Asthmatics with high mucus scores were found to have had marked sputum eosinophilia[14] and abnormal sputum cell gene expression of type 2 cytokines (IL-4, IL-5, and IL-13) and mucins (MUC5AC and MUC5B). Thus, mucus occlusion of the airways in severe asthma occurs in the context of prominent type 2 inflammation. This is plausible because interleukin 13 is a known regulator of mucin genes and goblet cells[18][19,20], and type 2 inflammation could also promote mucus plug formation by reducing mucus clearance, either through stiffening the mucus gel[21] or by decreasing the function of cilia on airway epithelial cells[22,23]. Notably, prominent type 2 inflammation was found in asthmatic patients with mucus plugs, because these patients were being treated with high doses of inhaled steroids, and corticosteroids usually suppress airway type 2 inflammation[24]. The airway type 2 inflammation even persisted following protocol-directed treatment with systemic corticosteroids, and it may be that patients with airway mucus occlusion require adjunctive treatment with more specific inhibitors of type 2 inflammation, such as the inhibitors of type 2 cytokines that are currently becoming available.

The data presented here show that MDCT identifies mucus plugs in the lungs of a sizeable subgroup of patients with severe asthma who have poor asthma control and persistent lung dysfunction despite maximal treatment with bronchodilators and corticosteroids. MDCT could be used to identify patients with mucus plugging and that this patient subgroup could be enrolled in clinical trials to test whether mucolytics and/or specific inhibitors of type 2 inflammation improve lung function and optimize disease control.

TABLE 9

Characteristics of Asthma Subjects with repeat CT scans across SARP studies

| Characteristics | Time points | |
|---|---|---|
| | SARP-1/ SARP-2 | SARP-3 |
| Mean age (years)* | 44.3 ± 10.3 | 49.5 ± 11.7 |
| Female sex-no. (%) | 13 (52) | 13 (52) |
| Spirometry data* | | |
| FEV1 (% predicted) | 67.7 ± 19.5 | 67.8 ± 20.8 |
| FVC (% predicted) | 80.4 ± 16.1 | 80.6 ± 17.5 |
| FEV1/FVC | 0.67 ± 0.11 | 0.82 ± 0.12 |
| Max FEV (% predicted) | 81.4 ± 21.1 | 78.3 ± 20.8 |
| Max FVC (% predicted) | 91.7 ± 15.5 | 88.5 ± 15.4 |
| Sputum cell counts (%) | | |
| Eosinophils | 0.3 (0.001, 3.2) | 0.6 (0.2, 2.4) |
| Neutrophils | 62 (32.2, 76.3) | 68.9 (42.9, 77.8) |
| FeNO (ppm)‡ | 22 (10.3, 39.6) | 22 (14, 46) |

TABLE 9-continued

Characteristics of Asthma Subjects
with repeat CT scans across SARP studies

| Characteristics | Time points | |
|---|---|---|
| | SARP-1/SARP-2 | SARP-3 |
| Blood cell counts (×10$^6$/L) [†] | | |
| Eosinophils | 259 ± 232 | 313.5 ± 409.6 |
| Neutrophils | 4782 ± 2819 | 4599 ± 2106 |
| Mucus Score, segments | 2 (0.9) | 6 (1.12) |
| Mucus Score, categories | | |
| Zero | 10 (40) | 5 (20.0) |
| Low | 4 (16) | 4 (16.0) |
| High | 11 (44) | 16 (64.0) |

Data reported as mean and standard deviation unless otherwise indicated.
*Age and spirometry data for SARP1-2 missing in 1 patient
[†] Spirometry data for SARP1-2 missing in 3 patients
[‡] FeNO data for SARP1-2 missing in 8 patients
[§] Sputum cell count data for SARP1-2 missing in 15 patients and for SARP-3 in 5 patents.

TABLE 10

Mucus score and spirometry adjusted for covariates

| Asthma outcome* | Unadjusted | Model 1 | Model 2 | Model 3 | Model 4 |
|---|---|---|---|---|---|
| FEV1, % predicted | -2.3 (-2.9, -1.6) $R^2$ = 0.24, p < 0.001 | -2.1 (-2.8, -1.4) $R^2$ = 0.28, p < 0.001 | -2 (-2.7, -1.3) $R^2$ = 0.33, p < 0.001 | -1.6 (-2.3,0.9) $R^2$ = 0.37, p < 0.001 | -14 (-23.7, -6.0) $R^2$ = 0.41, p = 0.001 |
| FVC, % predicted | -1.3 (-2 to -0.7) $R^2$ = 0.11, p < 0.001 | -1.1 (-1.7, -0.5) $R^2$ = 0.24, p = 0.001 | -1 (-1.6, -0.4) $R^2$ = 0.25, p = 0.001 | -0.8 (-1.5, -0.1) $R^2$ = 0.27, p = 0.02 | -8.6 (-17.1, -0.2) $R^2$ = 0.29, p = 0.045 |
| FEV1/FVC | -1.4 (-1.8 -1.0) $R^2$ = 0.26, p < 0.001 | -1.4 (-1.9, -1.0) $R^2$ = 0.29, p < 0.001 | -1.4 (-1.8, -1.0) $R^2$ = 0.34, p < 0.001 | -1.2 (1.7, -0.8) $R^2$ = 0.38, p < 0.001 | -7.8 (-12, -2.6) $R^2$ = 0.41, p = 0.004 |

* Linear Regression model reports β coefficient (95% confidence interval) for asthma outcome.
Model 1 adjusts for the covariate of age at screening
Model 2 adjusts for the covariates of age and gender
Model 3 adjusts for the covariates of age, gender and wall thickness %
Model 4 adjusts for the covariates of age, gender and a mucus score-wall thickness interaction term

TABLE 11

Characteristics of Subjects with Asthma across Mucus Score Categories

| Characteristic | All (n = 148) | Mucus Score | | |
|---|---|---|---|---|
| | | Zero (n = 61) | Low (n = 45) | High (n = 40) |
| Mucus score | 0.5 (0-4.5) | 0 (0) | 1.5 (0.5-2.5) | 9.5 (6-12) |
| Spirometry—pre bronchodilator | | | | |
| FEV1 (% predicted)[†‡] | 75.4 ± 21.7 | 84.8 ± 17.1 | 77.9 ± 21.8 | 58.5 ± 18.0 |
| FVC (% predicted)[†‡] | 90.1 ± 19.0 | 94.3 ± 15.3 | 93.0 ± 20.2 | 80.4 ± 19.5 |
| FEV1/FVC (predicted)*[†‡] | 0.83 ± 0.13 | 0.89 ± 0.10 | 0.83 ± 0.11 | 0.72 ± 0.11 |
| Spirometry—post bronchodilator | | | | |
| FEV1 (% predicted)[†‡] | 86.4 ± 22.0 | 94.9 ± 16.9 | 89.1 ± 22.5 | 70.5 ± 20.0 |
| FVC (% predicted)[†‡] | 97.6 ± 19.5 | 100.2 ± 14.9 | 100.3 ± 18.7 | 90.7 ± 19.5 |
| FEV1/FVC (predicted)[†‡] | 88.2 ± 12.1 | 95.1 ± 9.0 | 88.3 ± 10.3 | 77.9 ± 10.9 |
| Sputum cell counts (%)[∥] | | | | |
| Neutrophils | 58 (35, 78) | 62 (37, 83) | 60 (35,79) | 47 (31, 70) |
| Epithelial cells | 4.7 (2, 11.5) | 4.3 (2.3, 11.5) | 4.3 (2.3, 5.9) | 6.9 (1.8, 17) |

TABLE 11-continued

Characteristics of Subjects with Asthma across Mucus Score Categories

| Characteristic | All (n = 148) | Mucus Score Zero (n = 61) | Mucus Score Low (n = 45) | Mucus Score High (n = 40) |
|---|---|---|---|---|
| Blood cell counts (×10⁶)¶ | | | | |
| Neutrophils | 4286 ± 2350 | 4569 ± 2951 | 4030 ± 1934 | 4134 ± 1592 |
| Total white blood cells | 7279 ± 2548 | 7534 ± 3149 | 6953 ± 2138 | 7255 ± 1827 |
| Total IgE (IU/mL)¶ | 150 (52, 363) | 126 (32, 482) | 150 (74, 335) | 181 (79, 363) |
| Exacerbations in last 12 months-no. (%) | 74 (50.7) | 29 (47.5) | 23 (51.1) | 22 (55.0) |
| Nasal polypectomy-no. (%)† | 21 (14.4) | 1 (1.6) | 8 (17.8) | 12 (30.0) |
| Sinus surgery-no. (%)† | 19 (13.0) | 3 (4.9) | 8 (17.8) | 8 (20.0) |
| ABPA-no. (%)** | 3 (2.1) | 0 (0) | 2 (1.4) | 0 (0) |

Data reported as mean ± standard deviation or median (interquartile range). Zero represents the "mucus absent" group (ucus score = 0). Low represents the group with mucus scores 0.5-3.5 and high represents the group with mucus scores ≥4, based on the median score of 3.5 in the "mucus present" group.
*$p < 0.05$ for comparison of zero and low scores
†$p < 0.05$ for comparison of zero and high scores
‡$p < 0.05$ for comparison of low and high scores
∥Sputum cell counts were not available in 40 subjects due to ineligibility for sputum induction or because the induced sputum not meet quality metrics.
¶Blood measurements were not available for 2 subjects.
**Diagnosed using elevated total IgE, specific to IgE to Aspergillus fumigatus, systemic eosinophilia, and radiographic changes consistent with ABPA.

TABLE 12

Characteristics stratified by chronic mucus hypersecretion and mucus plugging

| Characteristic | Chronic mucus hypersecretion* Absent (n = 80) | Chronic mucus hypersecretion* Present (n = 41) | Mucus plugging Zero (n = 61) | Mucus plugging High (n = 40) |
|---|---|---|---|---|
| Anthropometrics | | | | |
| Mean age (years) | 44.3 ± 16.5 | 52.4 ± 15.3† | 43.3 ± 15.4 | 62.2 ± 16.5† |
| Female sex-no. (%) | 53 (66.3) | 27 (65.9) | 43 (70.5) | 22 (55.0) |
| Body Mass Index (kg/m²) | 31.2 ± 8.7 | 34.5 ± 9.4 | 34.3 ± 9.9 | 30.7 ± 6.3 |
| Asthma control and Exacerbations | | | | |
| Asthma Control Test score | 20 (16, 21) | 15 (10, 19)‡ | 19 (15, 21) | 16.5 (13, 19)‡ |
| High dose inhaled steroids use-no. (%) | 53 (66.3) | 31 (75.6) | 36 (59.0) | 36 (90.0)‡ |
| Chronic systemic steroids use-no. (%) | 6 (7.5) | 5 (12.2) | 3 (4.9) | 8 (20.0)† |
| Exacerbations in last 12 months-no. (%)¶ | 28 (35.0) | 29 (70.7)§ | 28 (45.9) | 40 (47.1) |
| Spirometry∥ | | | | |
| FEV1 (% predicted) | 81.3 ± 19.8 | 2.72 ± 22.7‡ | 84.8 ± 17.1 | 58.5 ± 18.0§ |
| FVC (% predicted) | 95.1 ± 17.1 | 86.0 ± 19.2‡ | 94.3 ± 15.3 | 80.4 ± 19.5‡ |
| FEV1/FVC (predicted) | 0.84 ± 0.12 | 0.80 ± 0.14 | 0.89 ± 0.10 | 0.72 ± 0.11§ |
| Inflammation | | | | |
| Airway measures | | | | |
| FeNO (ppm)** | 20 (12, 35) | 20 (11, 29) | 18 (10, 27) | 28 (19, 40)‡ |
| Sputum eosinophil count (×10⁶/L)†† | 0.7 (0.2, 3.5) | 0.6 (0, 4.5) | 0.2 (0, 0.9) | 7.3 (1.5, 21.4)§ |
| Sputum neutrophil count (×10⁵/L)†† | 59 (33, 77) | 66 (42, 83) | 62 (37, 83) | 47 (31, 70) |
| Blood measures‡‡ | | | | |
| Blood eosinophil count (×10⁶/L) | 284 ± 202 | 338 ± 347 | 209 ± 153 | 459 ± 349§ |
| Blood neutrophil count (×10⁵/L) | 4278 ± 2541 | 4450 ± 2258 | 4569 ± 2951 | 4134 ± 1592 |
| Total IgE (IU/mL) | 138 (46, 306) | 129 (35, 406) | 125 (32, 482) | 181 (79, 363) |
| Sputum cell gene expression | | | | |
| IL-4 | 15 (13, 17) | 15 (12, 17) | 15 (14, 17) | 17 (15, 18) |
| IL-5 | 18 (16, 21) | 18 (17, 20) | 17 (15, 19) | 20 (18, 22) ‡ |
| IL-13 | 20 (17, 21) | 20 (18, 21) | 19 (17, 21) | 22 (20, 22) † |

TABLE 12-continued

Characteristics stratified by chronic mucus hypersecretion and mucus plugging

| Characteristic | Chronic mucus hypersecretion* | | Mucus plugging | |
| --- | --- | --- | --- | --- |
| | Absent (n = 80) | Present (n = 41) | Zero (n = 61) | High (n = 40) |
| IL-17 | 18 (18, 20) | 19 (17, 20) | 18 (17, 20) | 18 (17, 19) |
| MUC5AC/MUC5B | 0.99 (0.9, 1.1) | 0.99 (0.9, 1.1) | 0.95 (0.86, 1) | 1.1 (1.0, 1.2) ‡ |
| CT Findings | | | | |
| Bronchiectasis on CT-no. (%) | 15 (18.8) | 9 (22.0) | 7 (11.5) | 11 (27.5) |

Data reported as mean ± standard deviation or median (interquartile range).
*Questionnaire data for chronic bronchitis are available for 121 patients (ses supplementary appendix)
†$p < 0.05$ for comparison between absent and present or zero and high groups
‡$p < 0.01$ for comparison between absent and present or zero and high groups
§$p < 0.001$ for comparison between absent and present or zero and high groups
∥Pre bronchodilator
¶Exacerbations defined as taking a short course of oral corticosteroids for asthma (min. 3 days) in the last year
**Fraction of nitric oxide in exhaled breath (FeNO) was not measured in 4 subjects.
††Sputum cell counts were not available in 26 subjects due to ineligibility for sputum induction or because the induced sputum not meet quality metrics.
‡‡Blood measurements were not available for 1 subject

TABLE 13

Mucus score and eosinophilia adjusted for covariates

| Asthma outcome* | Unadjusted | Model 1 | Model 2 | Model 3 |
| --- | --- | --- | --- | --- |
| Sputum Eosinophils %‡ | 0.96 (0.66, 1.3) $R^2 = 0.28$, $p < 0.001$ | 0.93 (0.61, 1.3) $R^2 = 0.29$, $p < 0.001$ | 0.94 (0.62, 1.3) $R^2 = 0.30$, $p < 0.001$ | 0.80 (0.45, 1.2) $R^2 = 0.32$, $p < 0.001$ |
| Blood Eosinophils count | 24.5 (15.5, 33.4) $R^2 = 0.17$, $p < 0.001$ | 24.8, (15.2, 34.4) $R^2 = 0.17$, $p < 0.001$ | 24.6, (15.0, 34.2) $R^2 = 0.18$, $p < 0.001$ | 17.6 (7.3, 27.7) $R^2 = 0.25$, $p = 0.001$ |

*Linear Regression model reports β coefficient (95% confidence interval) for asthma outcome.
‡Sputum cell counts were not measured in 40 subjects.
Model one adjusts for the covariate of age at screening
Model two adjusts for the covariates of age and gender
Model three adjusts for the covariates age, gender and wall thickness (%)

TABLE 14

Characteristics of Subjects with Asthma across Mucus Score Categories

| Characteristic | (n = 146) | Mucus Score | | |
| --- | --- | --- | --- | --- |
| | | Zero (n = 61) | Low (n = 45) | High (n = 40) |
| Mucus score | 0.5 (0-4.5) | 0 (0) | 1.5 (0.5-2.5) | 9.5 (6-12) |
| Mean age (years)† | 46.8 ± 16.0 | 43.2 ± 15.4 | 46.7 ± 15.6 | 52.3 ± 16.3 |
| Female sex-no (%) | 91 (62.3) | 43 (70.5) | 26 (57.8) | 22 (55.0) |
| Body Mass Index (kg/m$^2$) | 32.7 ± 9.3 | 34.3 ± 9.9 | 32.5 ± 10.5 | 30.7 ± 6.3 |
| Maintenance corticosteroid use-no. (%) | | | | |
| Inhaled—any dose | 142 (97.3) | 57 (93.4) | 45 (100.0) | 40 (100.0) |
| Inhaled—high dose† | 103 (70.6) | 36 (59.0) | 31 (68.9) | 38 (90.0) |
| Systemic† | 15 (10.3) | 3 (4.9) | 3 (6.7) | 9 (22.5) |
| Asthma Control Test† | 18 (14-21) | 19 (15-21) | 18 (14-22) | 16.5 (13-19) |
| Severe Asthma-no. (%)§† | 100 (68.5) | 33 (54.1) | 31 (68.9) | 36 (90.0) |
| Spirometry | | | | |
| FEV1 (% predicted) †‡ | 75.4 ± 21.7 | 84.8 ± 17.1 | 77.9 ± 21.8 | 38.5 ± 18.0 |
| Sputum eosinophil count (%)¶†‡ | 0.7 (0, 4.4) | 0.2 (0, 0.9) | 0.5 (0.2, 1.6) | 7.3 (1.5, 21.4) |
| Blood eosinophil count (×10$^6$/L) ∥†‡ | 306 ± 276 | 209 ± 153 | 309 ± 282 | 459 ± 349 |
| FeNO (ppm)**† | 22 (12, 33) | 18 (10, 27) | 24 (13, 38) | 28 (19, 40) |

TABLE 14-continued

Characteristics of Subjects with Asthma across Mucus Score Categories

| | | Mucus Score | | |
| --- | --- | --- | --- | --- |
| Characteristic | (n = 146) | Zero (n = 61) | Low (n = 45) | High (n = 40) |
| Chronic mucus hypersecretion-no. (%)[††] | 41 (34.0) | 18 (29.5) | 10 (22.2) | 13 (32.5) |
| Bronchiectasis on CT-no. (%) | 29 (19.9) | 7 (11.5) | 11 (24.4) | 11 (27.5) |

Data reported as mean ± standard deviation or median (interquartile range). Zero represents the "mucus absent" group (mucus score = 0). Low represents the group with mucus scores 0.5-3.5 and high represents the group with mucus scores ≥4, based on the median score 3.5 in the "mucus present" group.
*$p < 0.05$ for comparison of zero and low scores
[†]$p < 0.05$ for comparison of zero and high scores
[‡]$p < 0.05$ for comparison of low and high scores
[§]The classification of asthma severity was determined using ATS/ERS criteria
[¶]Sputum cell counts were not available in 40 subjects due to ineligibility for sputum induction or because the induced sputum not meet quality metrics.
[∥]Blood measurements were not available for 2 subjects.
**Fraction of nitric oxide in exhaled breath (FeNO) was not measured in 4 subjects.
[††]Defined by WHO. Questionnaire data is missing in 25 patients (see supplementary appendix)

Example 11: App for Utilizing Scoring Method

An novel application (app) was designed to facilitate the scoring method described herein. The app has a variety of utilities including:
  (i) Use in clinical setting to stratify patients as those who have or do not have mucus impaction of their airways
  (ii) The score could be used to identify patient who would benefit from specific treatments e.g. mucolytics or protein therapeutics.
  (iii) The score could be used as a companion diagnostic for use with muco-active drugs (e.g. mucolytics) or anti-inflammatory drugs.

The (app) was designed to perform four coordinated functions to allow a user to generate a mucus from images captured in a multidetector computed tomography (MDCT) scan of the lungs:
  (i) Provides the user with Mucus Score criteria. ("Criteria tab").
  (ii). Provides the user with examples of mucus plugs in a range of different MDCT images of the lungs. ("Examples tab").
  (iii) Provides the user with a training set of MDCT images, which the user scores to obtain certification in proper and accurate Dunican mucus scoring. The app provides feedback on incorrect scores to aid in education and training for correct mucus plug identification and scoring. ("Training and Certification tab").
  (iv) Provides the user with a scoring tool to generate a Dunican Mucus core for an individual patient's MDCT lung scan. (Scoring Tool Tab").

REFERENCES

1. Huber H C, Koessler K K. The pathology of bronchial asthma. 1922; 30:689-760.
2. Cardell, B. S., Bruce Pearson, R. S. Death in Asthmatics. Thorax 1959; 14:341-52.
3. Dunnill M S. The pathology of asthma, with special reference to changes in the bronchial mucosa. 1960; 13:27-33.
4. Chung K F, Wenzel S E, Brozek J L, et al. International ERS/ATS guidelines on definition, evaluation and treatment of severe asthma. Eur Respir J 2014; 43:343-73.
5. Gershman N H, Wong H H, Liu J T, Mahlmeister M J, Fahy J V. Comparison of two methods of collecting induced sputum in asthmatic subjects. Eur Respir J 1996; 9:2448-53.
6. Hastie A T, Moore W C, Li H, et al. Biomarker surrogates do not accurately predict sputum eosinophil and neutrophil percentages in asthmatic subjects. J Allergy Clin Immunol 2013; 132:72-80.
7. Peters M C, Mekonnen Z K, Yuan S, Bhakta N R, Woodruff P G, Fahy J V. Measures of gene expression in sputum cells can identify TH2-high and TH2-low subtypes of asthma. J Allergy Clin Immunol 2014; 133:388-94.
8. American Thoracic Society (1962): Definitions and classification of chronic bronchitis, asthma and pulmonary emphysema. Am Rev Respir Dis 1962; 85:762-8.
9. Agarwal R, Chakrabarti A, Shah A, et al. Allergic bronchopulmonary aspergillosis: review of literature and proposal of new diagnostic and classification criteria. Clin Exp Allergy 2013; 43:850-73.
10. Sorkness R L, Bleecker E R, Busse W W, et al. Lung function in adults with stable but severe asthma: air trapping and incomplete reversal of obstruction with bronchodilation. J Appl Physiol (1985) 2008; 104:394-403.
11. Fredberg J J, Inouye D, Miller B, et al. Airway smooth muscle, tidal stretches, and dynamically determined contractile states. Am J Respir Crit Care Med 1997; 156: 1752-9.
12. Aysola R, de Lange E E, Castro M, Altes T A. Demonstration of the heterogeneous distribution of asthma in the lungs using CT and hyperpolarized helium-3 MRI. J Magn Reson Imaging 2010; 32: 1379-87.
13. Cohen L, E X, Tarsi J, et al. Epithelial cell proliferation contributes to airway remodeling in severe asthma. Am J Respir Crit Care Med 2007; 176:138-45.
14. Roche W R, Beasley R. Williams J H, Holgate S T. Subepithelial fibrosis in the bronchi of asthmatics. Lancet 1989; 1:520-4.
15. Heard B E HS. Hyperplasia of bronchial muscle in asthma. J Pathol 1973; 110:319-31.
16. Gold W M, Kaufman H S, Nadel J A. Elastic recoil of the lungs in chronic asthmatic patients before and after therapy. J Appl Physiol 1967; 23:433-8.
17. Gelb A F, Licuanan J, Shinar C M, Zamel N. Unsuspected loss of lung elastic recoil in chronic persistent asthma. Chest 2002; 121:715-21.
18. Fahy J V, Dickey B F. Airway mucus function and dysfunction. N Engl J Med 2010:363:2233-47.
19. Roy M G, Livraghi-Butrico A, Fletcher A A, et al. Muc5b is required for airway defence. Nature 2014; 505:412-6.

20. Evans C M, Raclawska D S, Ttofali F, et al. The polymeric mucin Muc5ac is required for allergic airway hyperreactivity. Nat Commun 2015; 6:6281.
21. Yuan S, Hollinger M, Lachowicz-Scroggins M E, et al. Oxidation increases mucin polymer cross-links to stiffen airway mucus gels. 2015; 7:276ra27.
22. Erle D J, Sheppard D. The cell biology of asthma. J Cell Biol 2014; 205:621-31.
23. Laoukili J, Perret E, Willems T, et al. IL-13 alters mucociliary differentiation and ciliary beating of human respiratory epithelial cells. J Clin Invest 2001; 108: 1817-24.
24. Fahy J V. Type 2 inflammation in asthma—present in most, absent in many. Nat Rev Immunol 2015; 15:57-65.
25. Fleige S, Walf V, Huch S, Prgomet C, Sehm J, Pfaffl M W. Comparison of relative mRNA quantification models and the impact of RNA integrity in quantitative real-time RT-PCR. Biotechnol Lett 2006; 28:1601-13.
26. Fleige S, Pfaffl M W. RNA integrity and the effect on the real-time qRT-PCR performance. Mol Aspects Med 2006; 27:126-39.
27. Chung K F, Wenzel S E, Brozek J L, et al. International ERS/ATS guidelines on definition, evaluation and treatment of severe asthma. Eur Respir J 2014; 43:343-73.
28. Gershman N H, Wong H H, Liu J T, Mahlmeister M J, Fahy J V. Comparison of two methods of collecting induced sputum in asthmatic subjects. Eur Respir J 1996; 9:2448-53.
29. Hastie A T, Moore W C, Li H, et al. Biomarker surrogates do not accurately predict sputum eosinophil and neutrophil percentages in asthmatic subjects. J Allergy Clin Immunol 2013; 132:72-80.
30. Peters M C, Mekonnen Z K, Yuan S, Bhakta N R, Woodruff P G, Fahy J V. Measures of gene expression in sputum cells can identify TH2-high and TH2-low subtypes of asthma. J Allergy Clin Immunol 2014; 133:388-94.
31. Fleige S, Walf V, Huch S, Promet C, Sehm J, Pfaffl M W. Comparison of relative mRNA quantification models and the impact of RNA integrity in quantitative real-time RT-PCR. Biotechnol Lett 2006; 28:1601-13.
31. Fleige S, Pfaffl M W. RNA integrity and the effect on the real-time qRT-PCR performance. Mol Aspects Med 2006; 27:126-39.
32. American Thoracic Society (1962); Definitions and classification of chronic bronchitis, asthma and pulmonary emphysema. Am Rev Respir Dis 1962; 85:762-8.
33. Nathan R A, Sorkness C A, Kosinski M, et al. Development of the asthma control test: a survey for assessing asthma control. J Allergy Clin Immunol 2004; 113:59-65.
34. Schatz M. Sorkness C A. Li J T, et al. Asthma Control Test: reliability, validity, and responsiveness in patients not previously followed by asthma specialists. J Allergy Clin Immunol 2006; 117:549-56.

What is claimed is:

1. A method of treating asthma or chronic obstructive pulmonary disease in a human subject in need thereof, the method comprising:
   (a) scanning twenty lung segments of the human subject for airway mucus plugs with multidetector computed tomography, thereby obtaining multidetector computed tomography scans; wherein:
      (i) the airway mucus plugs are each a complete occlusion of a bronchus;
      (ii) the human subject has been identified as having asthma or chronic obstructive pulmonary disease, and does not have a chronic mucus hypersecretion symptom; and
   (iii) the twenty lung segments are;
      (1) apical segment of upper lobe of right lung,
      (2) posterior segment of upper lobe of right lung,
      (3) anterior segment of upper lobe of right lung,
      (4) lateral segment of middle lobe of right lung,
      (5) medial segment of middle lobe of right lung,
      (6) superior segment of lower lobe of right lung,
      (7) medial segment of lower lobe of right lung,
      (8) anterior segment of lower lobe of right lung,
      (9) lateral segment of lower lobe of right lung,
      (10) posterior segment of lower lobe of right lung,
      (11) apical segment of upper lobe of left lung,
      (12) posterior segment of upper lobe of left lung,

(13) anterior segment of upper lobe of left lung,
(14) superior lingular segment of upper lobe of left lung,
(15) inferior lingular segment of upper lobe of left lung,
(16) superior segment of lower lobe of left lung,
(17) anterior segment of lower lobe of left lung,
(18) medial segment of lower lobe of left lung,
(19) lateral segment of lower lobe of left lung, and
(20) posterior segment of lower lobe of left lung;

(b) detecting the airway mucus plugs with the multidetector computed tomography scans;

(c) calculating a mucus score of the human subject based on the multidetector computed tomography scans, the mucus score comprising a number of the twenty lung segments that have a detected airway mucus plug, wherein the mucus score of the human subject is 1-20; and (d) administering to the human subject identified as having the mucus score of 1-20 an effective amount of a composition comprising n-acetylcysteine, carbocisteine, erdosteine, mecysteine, thioacetyl saccharide, methyl 6-thio-6-deoxy-α-D-galactopyranoside, 5-thiopentyl β-D-galactopyranoside, hypertonic saline, ambroxol, recombinant human Dnase, ivacaftor, lumacaftor, omalizumab, mepolizumab, benralizumab, reslizumab, lebrikizumab, tralokinumab, dupilumab, or fevipiprant.

2. The method of claim 1, wherein the multidetector computed tomography is a low dose radiation multidetector computed tomography.

3. The method of claim 1, wherein the airway mucus plugs are not within 2 cm of the diaphragmatic pleura and costal pleura.

4. The method of claim 1 for treating asthma, wherein the subject has been identified as having asthma.

5. The method of claim 1 for treating chronic obstructive pulmonary disease, wherein the subject has been identified as having chronic obstructive pulmonary disease.

6. The method of claim 1, wherein the mucus score is at least 3.

7. The method of claim 1, wherein the mucus score is at least 4.

8. A method of treating asthma or chronic obstructive pulmonary disease in a human subject in need thereof, the method comprising:
(a) scanning twenty lung segments of the human subject for airway mucus occlusions with multidetector computed tomography, thereby obtaining multidetector computed tomography scans;
wherein the human subject has been identified as having asthma or chronic obstructive pulmonary disease;
wherein the twenty lung segments are;
(1) apical segment of upper lobe of right lung,
(2) posterior segment of upper lobe of right lung,
(3) anterior segment of upper lobe of right lung,
(4) lateral segment of middle lobe of right lung,
(5) medial segment of middle lobe of right lung,
(6) superior segment of lower lobe of right lung,
(7) medial segment of lower lobe of right lung,
(8) anterior segment of lower lobe of right lung,
(9) lateral segment of lower lobe of right lung,
(10) posterior segment of lower lobe of right lung,
(11) apical segment of upper lobe of left lung,
(12) posterior segment of upper lobe of left lung,
(13) anterior segment of upper lobe of left lung,
(14) superior lingular segment of upper lobe of left lung,
(15) inferior lingular segment of upper lobe of left lung,
(16) superior segment of lower lobe of left lung,
(17) anterior segment of lower lobe of left lung,
(18) medial segment of lower lobe of left lung,
(19) lateral segment of lower lobe of left lung, and
(20) posterior segment of lower lobe of left lung;

(b) detecting the airway mucus occlusions with the multidetector computed tomography scans in a number of the twenty lung segments, wherein the number is greater than an identified threshold value;

(c) identifying the human subject as having mucus-high asthma or mucus-high chronic obstructive pulmonary disease based on the number being greater than the threshold value; and (d) administering to the human subject identified as having mucus-high asthma or mucus-high chronic obstructive pulmonary disease a therapeutically effective amount of a mucolytic agent or a type 2 inflammation inhibitor.

9. The method of claim 8, wherein the subject does not have chronic mucus hypersecretion symptoms.

10. The method of claim 8, wherein the airway mucus occlusions are not within 2 cm of the diaphragmatic pleura and costal pleura.

11. The method of claim 8, wherein the mucolytic agent is a thiol-based drug, a thiosaccharide, a recombinant human DNAse, hypertonic saline, ambroxol, or an airway epithelial cell ion channel modulator.

12. The method of claim 8, wherein the mucolytic agent is n-acetylcysteine, carbocisteine, erdosteine, mecysteine, methyl 6-thio-6-deoxy-α-D-galactopyranoside, or 5-thiopentyl β-D-galactopyranoside.

13. The method of claim 8, wherein the type 2 inflammation inhibitor is omalizumab, mepolizumab, benralizumab, reslizumab, lebrikizumab, tralokinumab, dupilumab, or fevipiprant.

14. The method of claim 8, wherein the multidetector computed tomography is a low dose radiation multidetector computed tomography.

15. The method of claim 8 for treating asthma, wherein the subject has been identified as having asthma.

16. The method of claim 8 for treating chronic obstructive pulmonary disease, wherein the subject has been identified as having chronic obstructive pulmonary disease.

17. The method of claim 8, wherein the threshold value is 3.

18. A method of treating asthma or chronic obstructive pulmonary disease in a human subject in need thereof, the method comprising:
(a) scanning eighteen lung segments or nineteen lung segments of the human subject for airway mucus occlusions with multidetector computed tomography, thereby obtaining multidetector computed tomography scans; wherein;
(1) the eighteen lung segments are apical segment of upper lobe of right lung, posterior segment of upper lobe of right lung, anterior segment of upper lobe of right lung, lateral segment of middle lobe of right lung, medial segment of middle lobe of right lung, superior segment of lower lobe of right lung, medial segment of lower lobe of right lung, anterior segment of lower lobe of right lung, lateral segment of lower lobe of right lung, posterior segment of lower lobe of right lung, apicoposterior segment of upper lobe of left lung, anterior segment of upper lobe of left lung, superior lingular segment of upper lobe of left lung, inferior lingular segment of upper lobe of left lung, superior segment of lower lobe of left lung, anteromedial segment of lower lobe of left lung, lateral segment of lower lobe of left lung, and posterior segment of lower lobe of left lung; and (2) the nineteen lung segments are apical segment of upper lobe of right lung, posterior segment of upper lobe of right lung, anterior segment of upper lobe of right lung, lateral segment of middle lobe of right lung, medial segment of middle lobe of right lung, superior segment of lower lobe of right lung, medial segment of lower lobe of right lung, anterior segment of lower lobe of right lung, lateral segment of lower lobe of right lung, posterior segment of lower lobe of right lung, apicoposterior segment of upper lobe of left lung, anterior segment of upper lobe of left lung, superior lingular segment of upper lobe of left lung, inferior lingular segment of upper lobe of left lung, superior segment of lower lobe of left lung, anterior segment of lower lobe of left lung, medial segment of lower lobe of left lung, lateral segment of lower lobe of left lung, and posterior segment of lower lobe of left lung;

(b) detecting the airway mucus occlusions with the multidetector computed tomography scans;

(c) determining a number of the eighteen or nineteen lung segments that have a detected airway mucus occlusion, wherein the number is greater than an identified threshold value; and (d) based on the number being greater than the threshold value, administering to the human subject a therapeutically effective amount of a mucolytic agent or a type 2 inflammation inhibitor.

19. The method of claim 18, wherein the subject does not have chronic mucus hypersecretion symptoms.

20. The method of claim 18, wherein the threshold value is 3.

* * * * *